Feb. 17, 1953    H. C. KENDALL    2,629,088
CENTRALIZED TRAFFIC CONTROLLING SYSTEM FOR RAILROADS
Filed Sept. 30, 1950    31 Sheets-Sheet 5

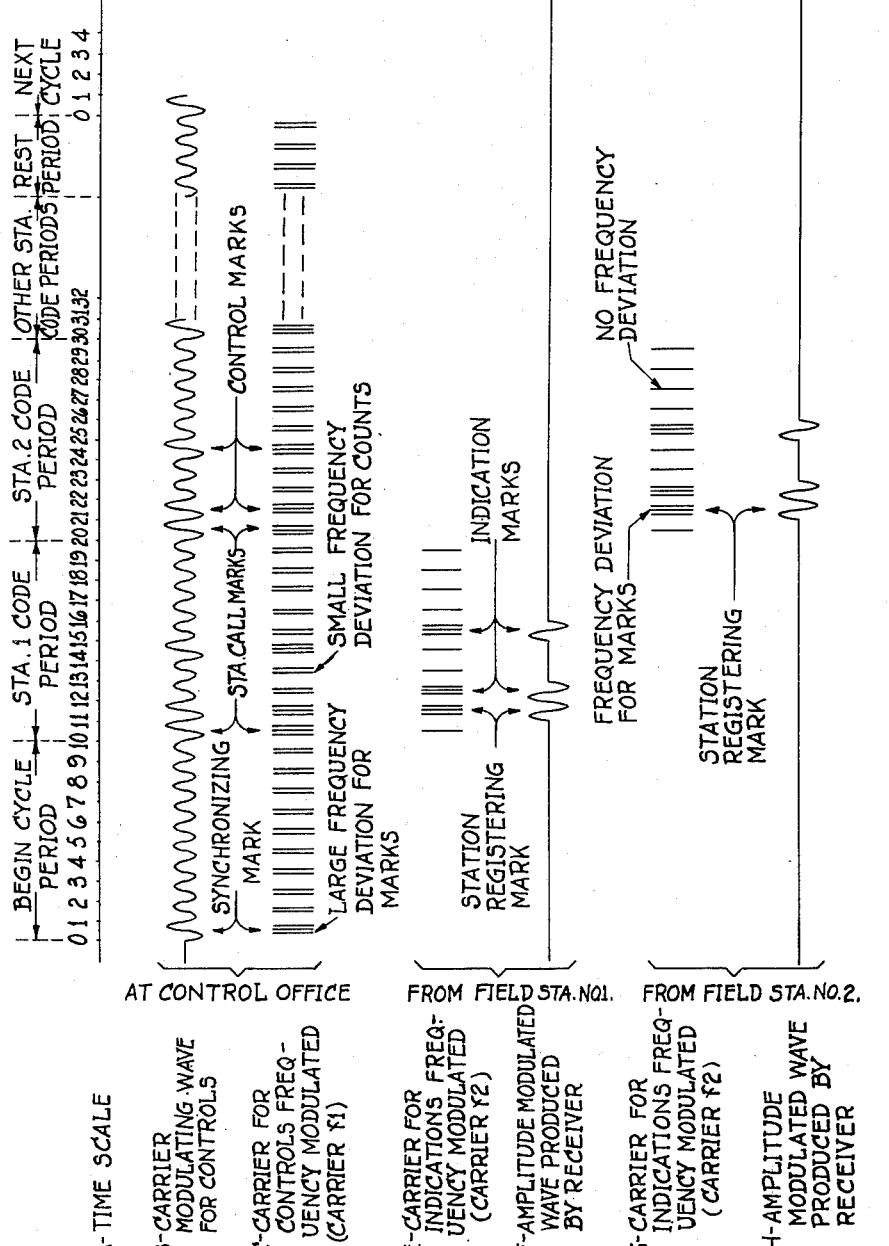

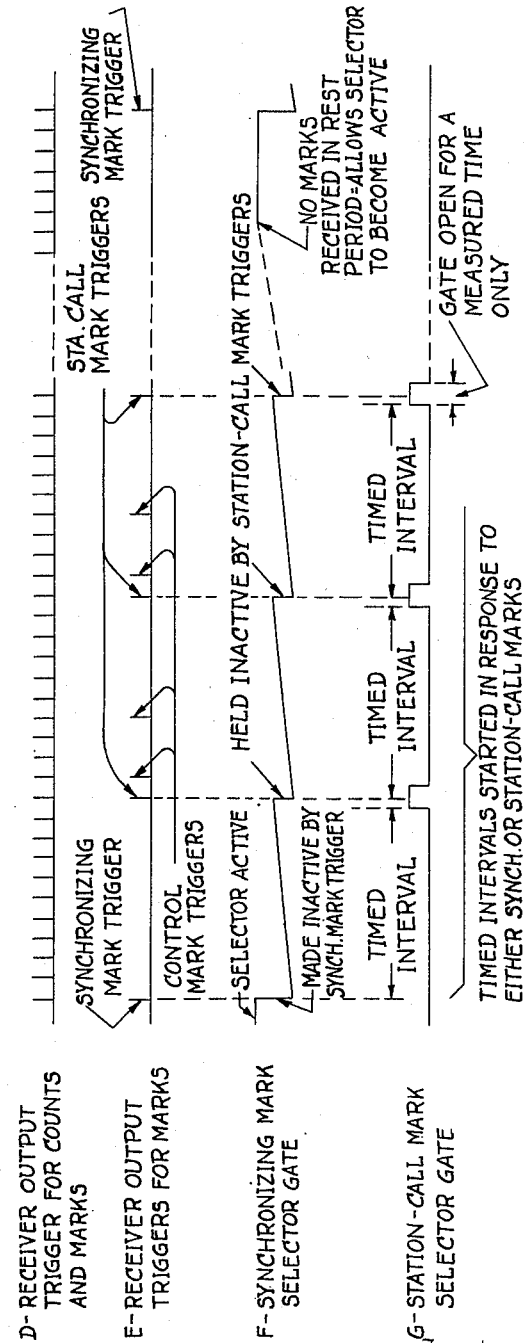
Fig. 1B.

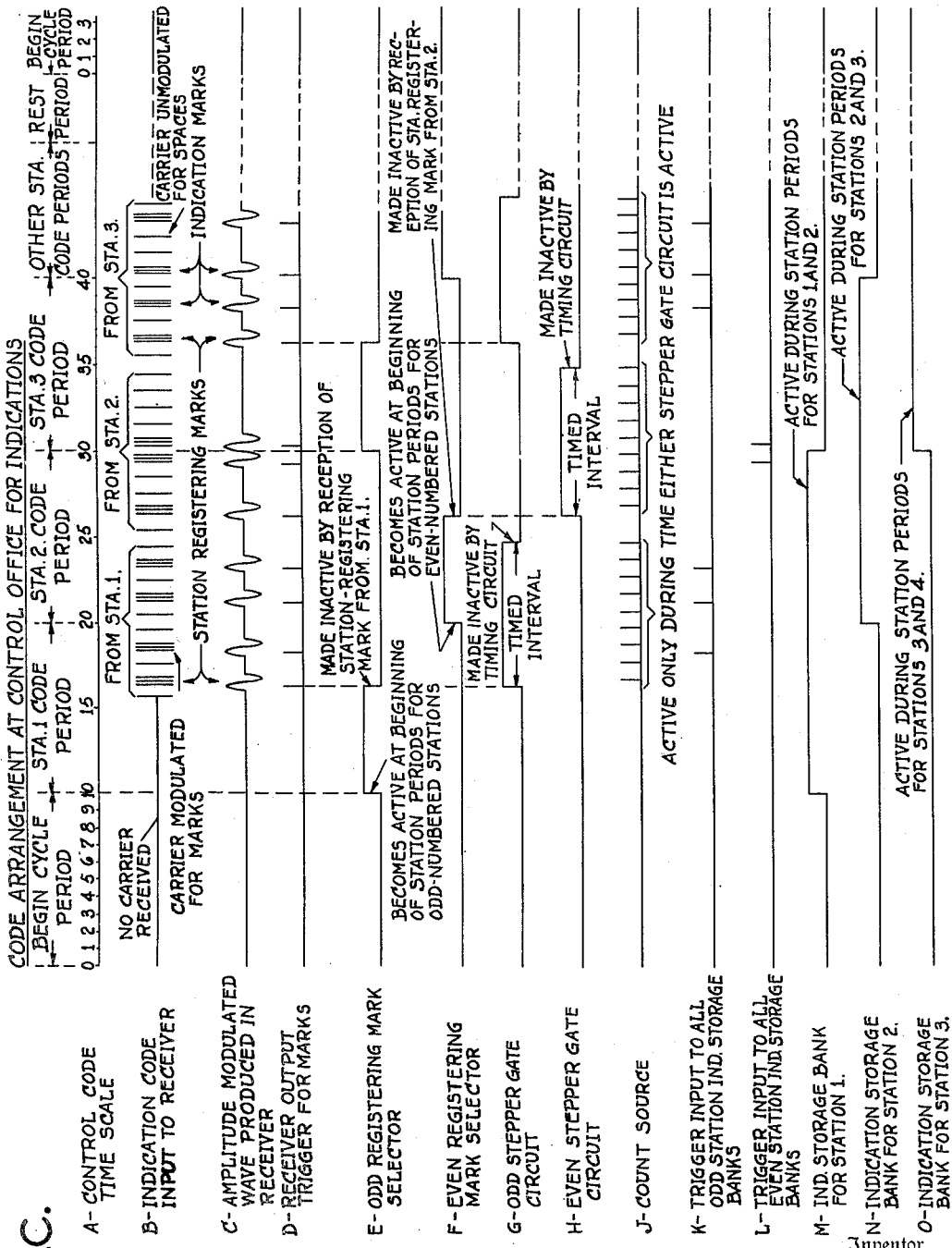

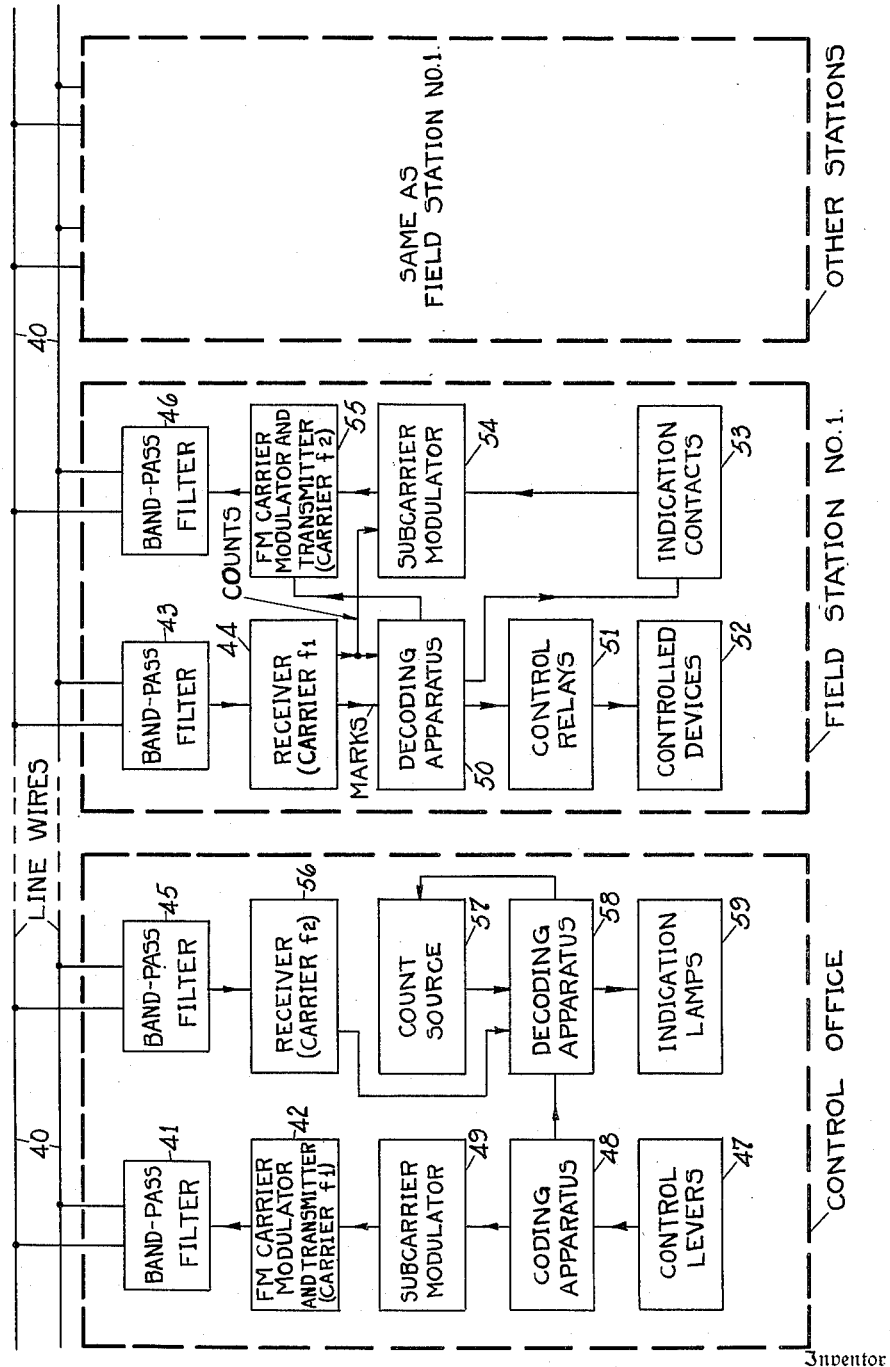

Inventor
H. C. Kendall,
Neil D. Preston,
his Attorney

Feb. 17, 1953  H. C. KENDALL  2,629,088
CENTRALIZED TRAFFIC CONTROLLING SYSTEM FOR RAILROADS
Filed Sept. 30, 1950  31 Sheets-Sheet 6

Inventor
H. C. Kendall,
Neil W. Preston,
his Attorney

Feb. 17, 1953     H. C. KENDALL     2,629,088
CENTRALIZED TRAFFIC CONTROLLING SYSTEM FOR RAILROADS
Filed Sept. 30, 1950     31 Sheets-Sheet 7
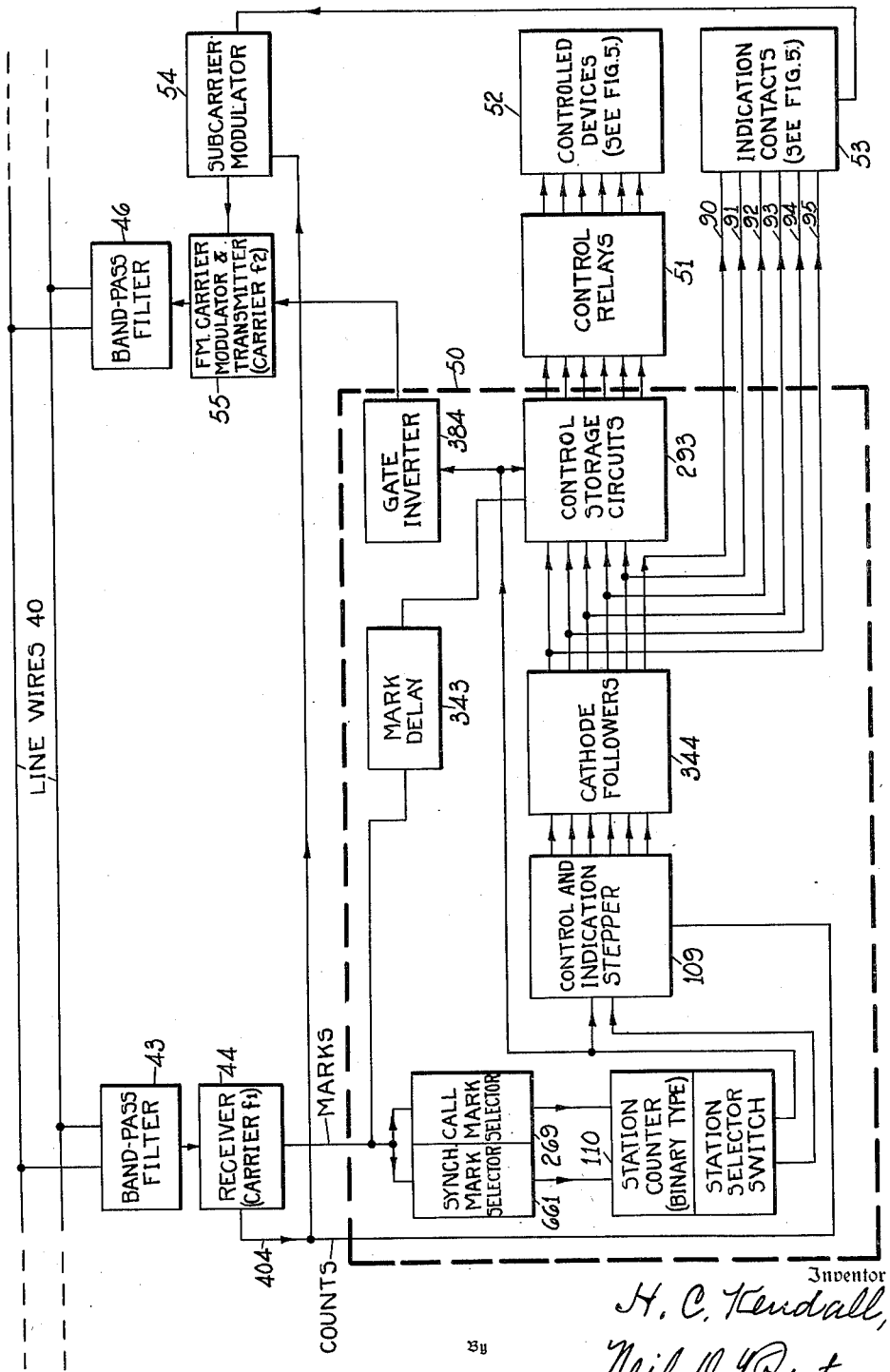

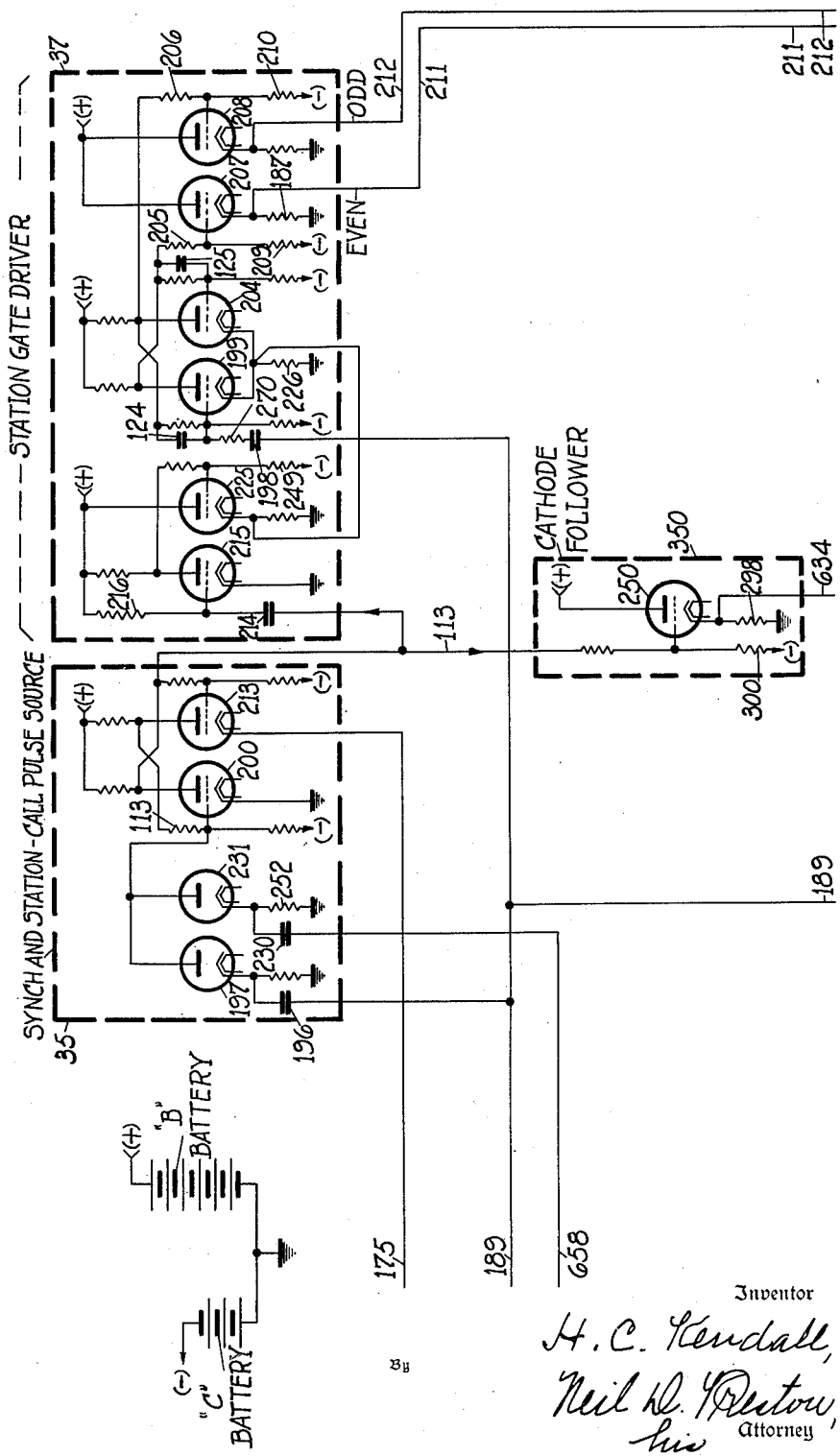

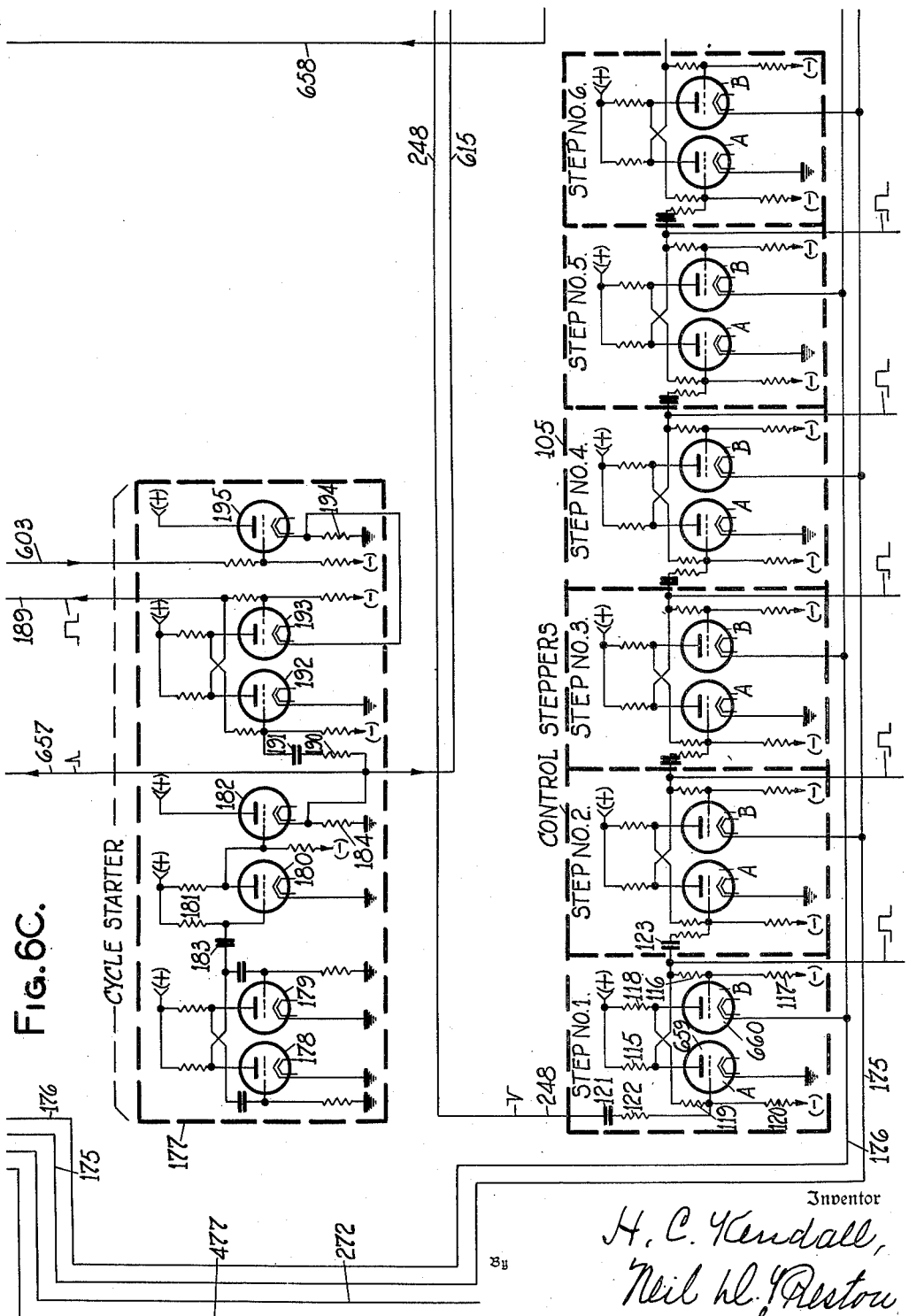

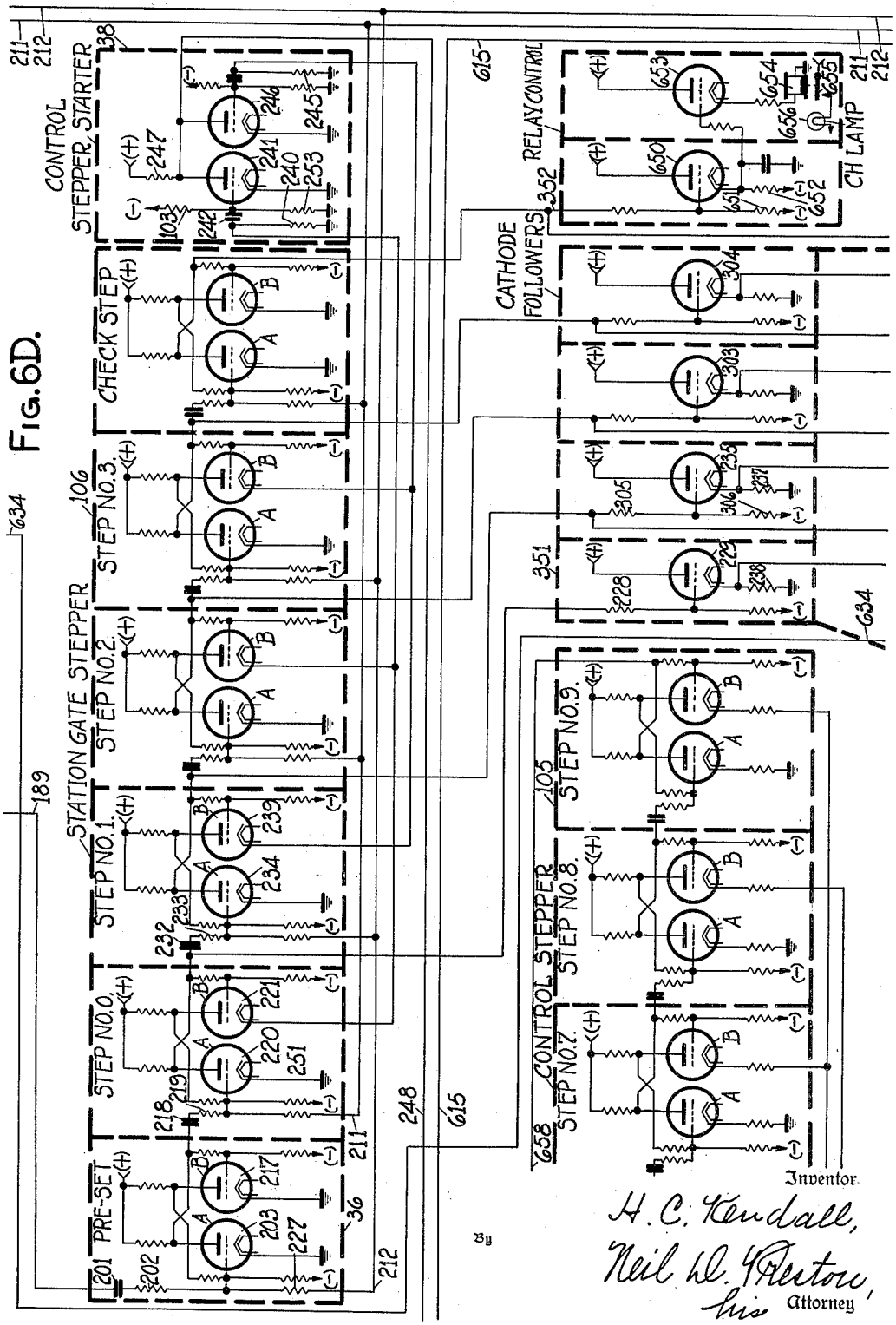

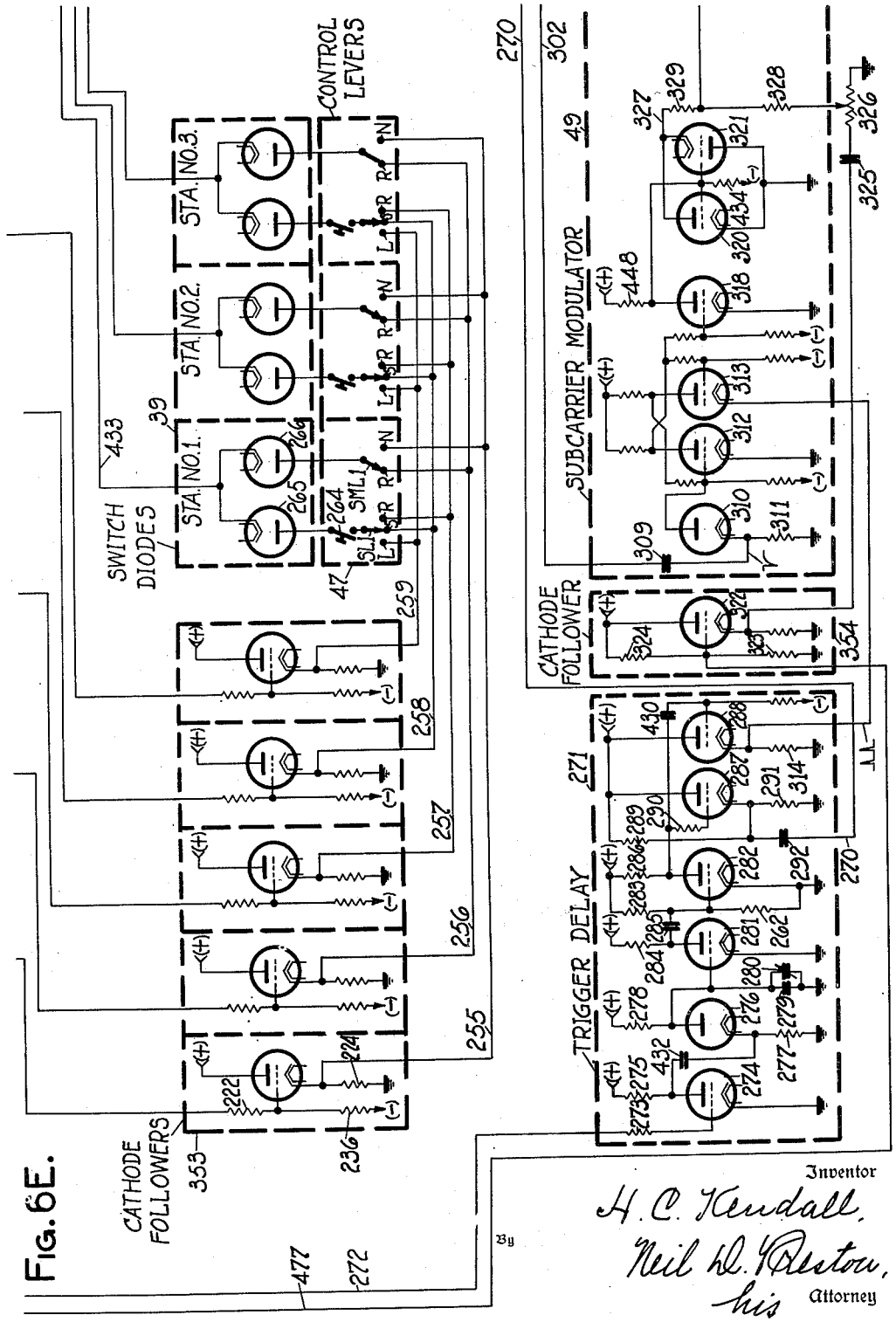

Feb. 17, 1953 H. C. KENDALL 2,629,088
CENTRALIZED TRAFFIC CONTROLLING SYSTEM FOR RAILROADS
Filed Sept. 30, 1950 31 Sheets-Sheet 14
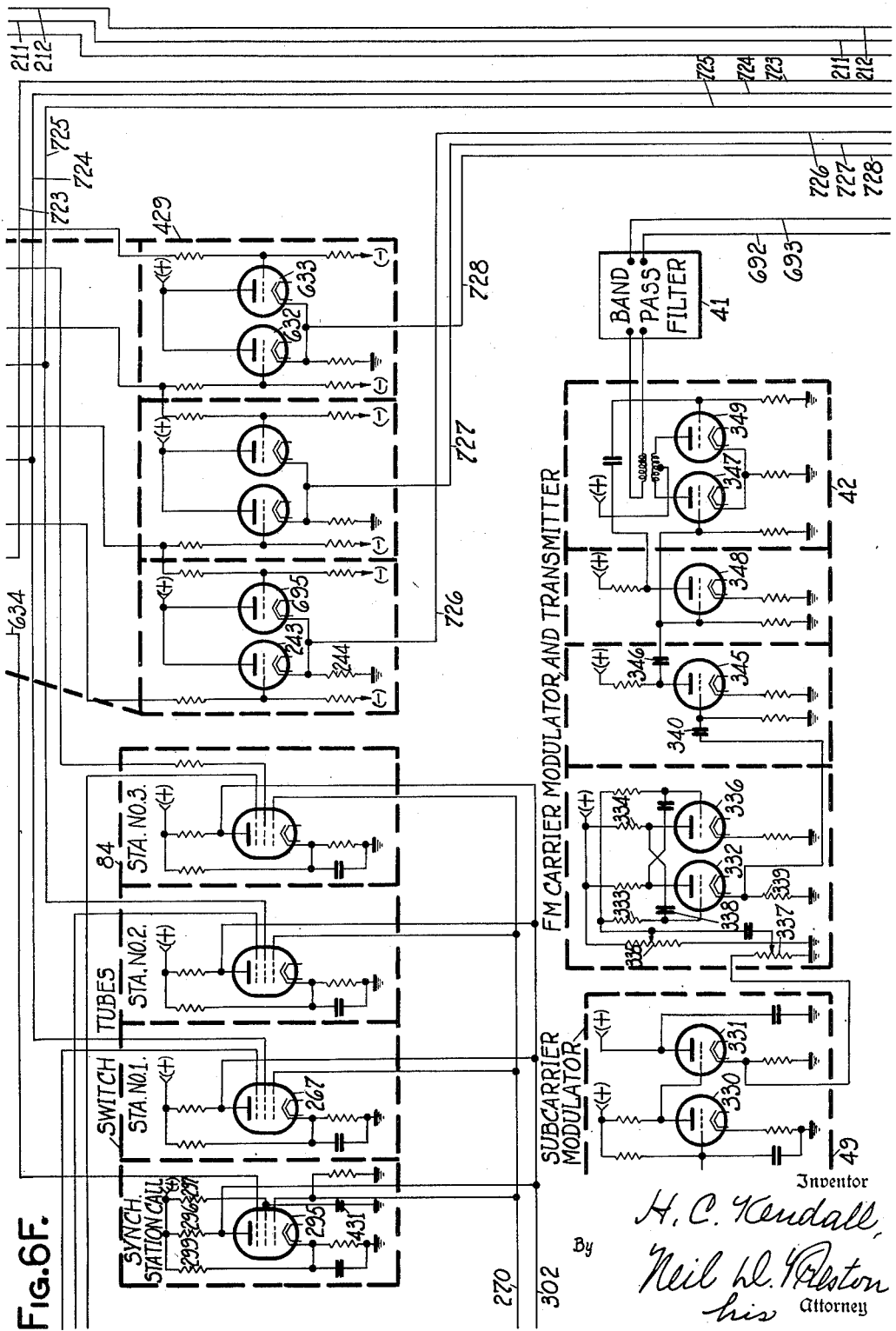

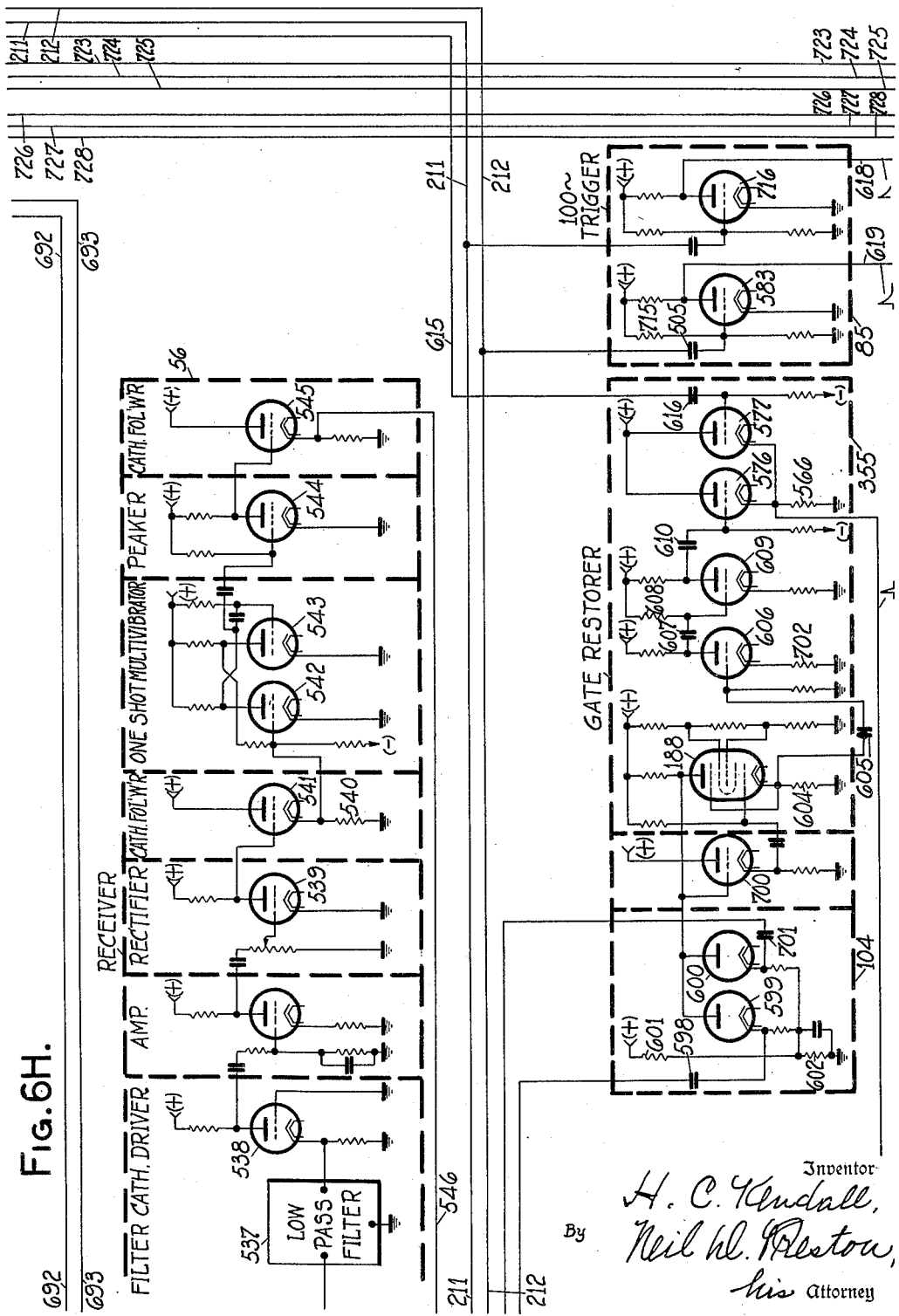

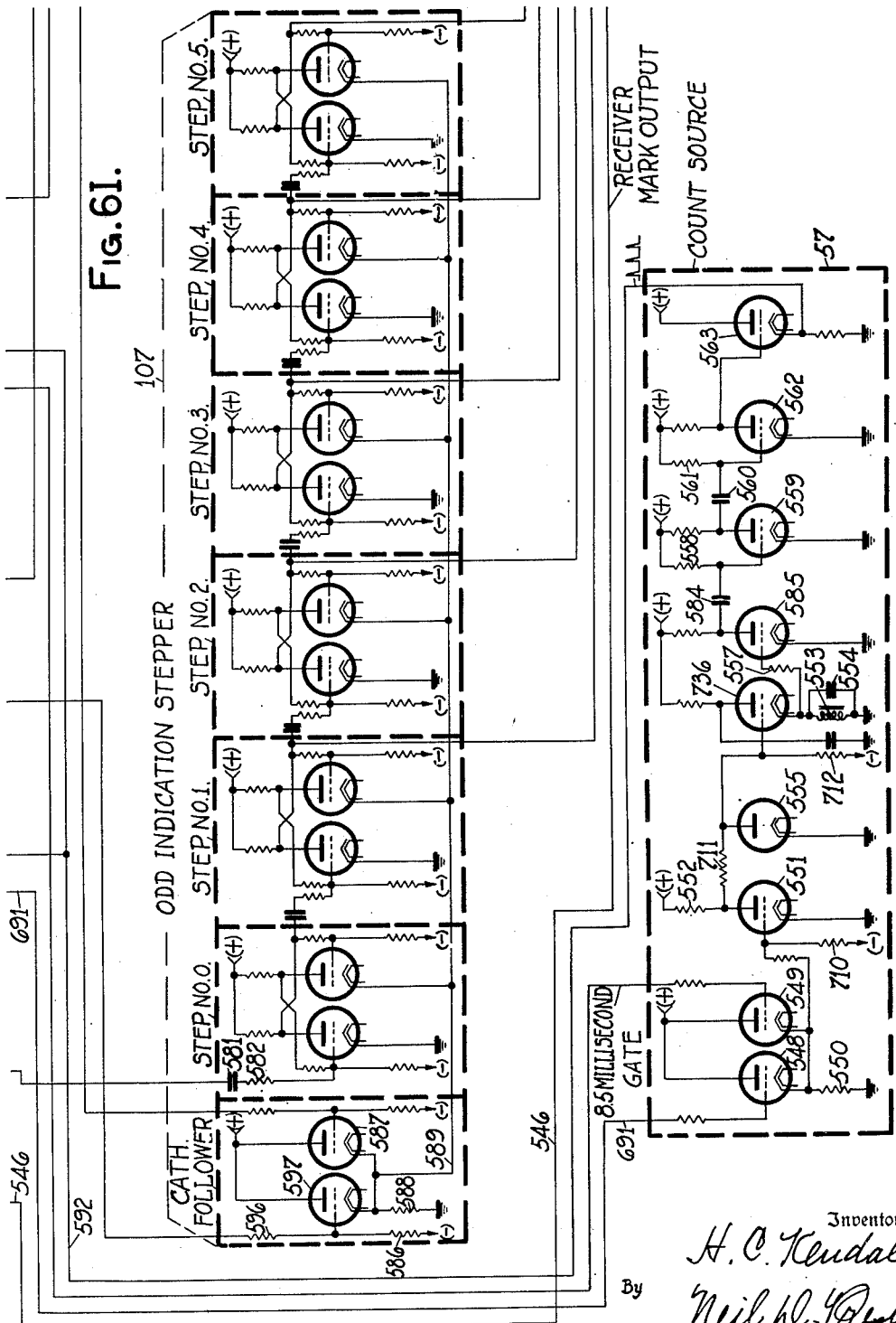

Feb. 17, 1953 — H. C. KENDALL — 2,629,088
CENTRALIZED TRAFFIC CONTROLLING SYSTEM FOR RAILROADS
Filed Sept. 30, 1950 — 31 Sheets-Sheet 19

Inventor
H. C. Kendall,
By Neil W. Preston
his Attorney

Feb. 17, 1953   H. C. KENDALL   2,629,088
CENTRALIZED TRAFFIC CONTROLLING SYSTEM FOR RAILROADS
Filed Sept. 30, 1950   31 Sheets-Sheet 21
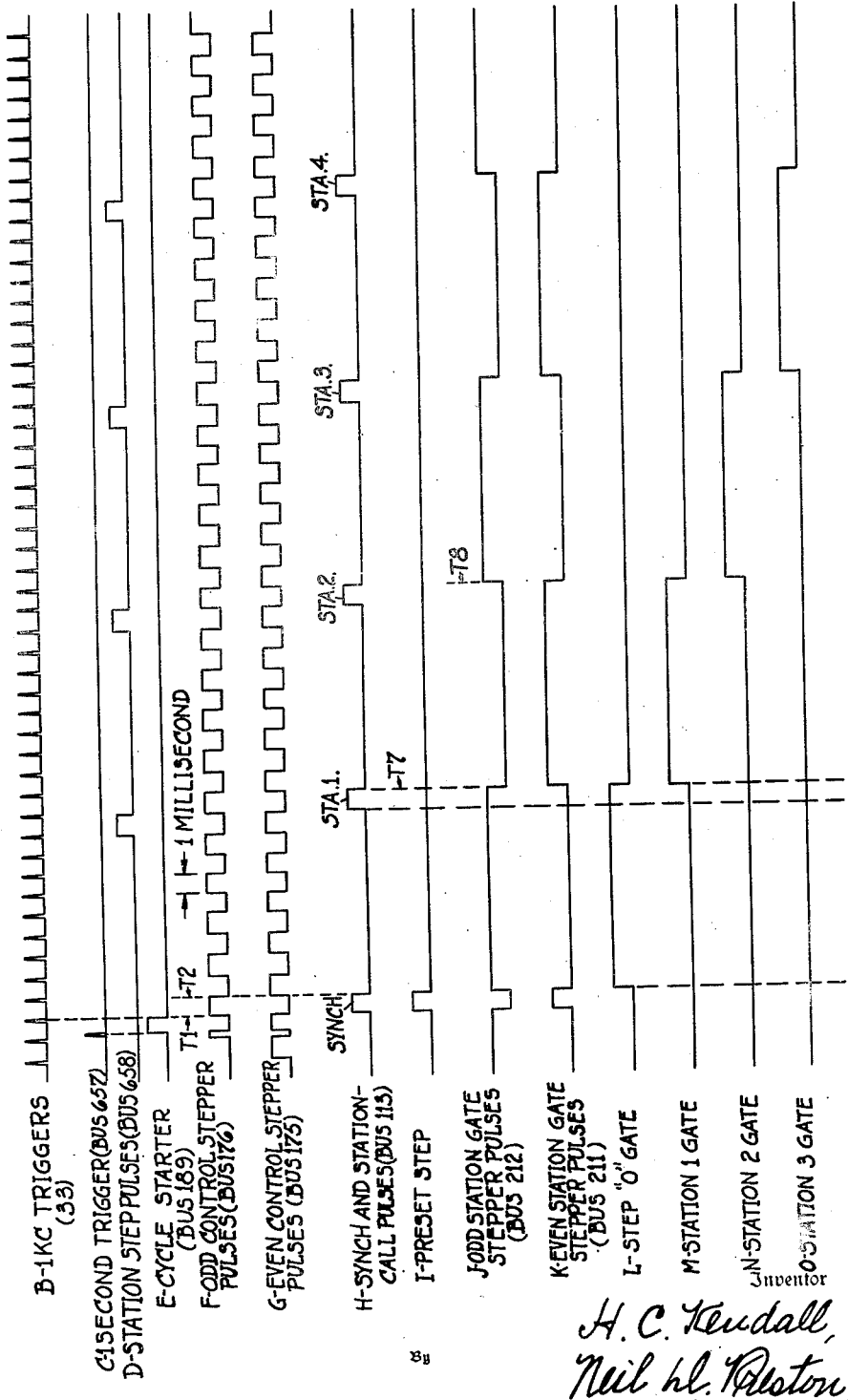

Feb. 17, 1953          H. C. KENDALL          2,629,088
CENTRALIZED TRAFFIC CONTROLLING SYSTEM FOR RAILROADS
Filed Sept. 30, 1950                                  31 Sheets-Sheet 22

Inventor
H. C. Kendall,
Neil W. Preston,
his Attorney

Feb. 17, 1953           H. C. KENDALL           2,629,088

CENTRALIZED TRAFFIC CONTROLLING SYSTEM FOR RAILROADS

Filed Sept. 30, 1950                         31 Sheets-Sheet 23

Inventor
H. C. Kendall,
Neil W. Preston,
his Attorney

Feb. 17, 1953 H. C. KENDALL 2,629,088
CENTRALIZED TRAFFIC CONTROLLING SYSTEM FOR RAILROADS
Filed Sept. 30, 1950 31 Sheets-Sheet 24

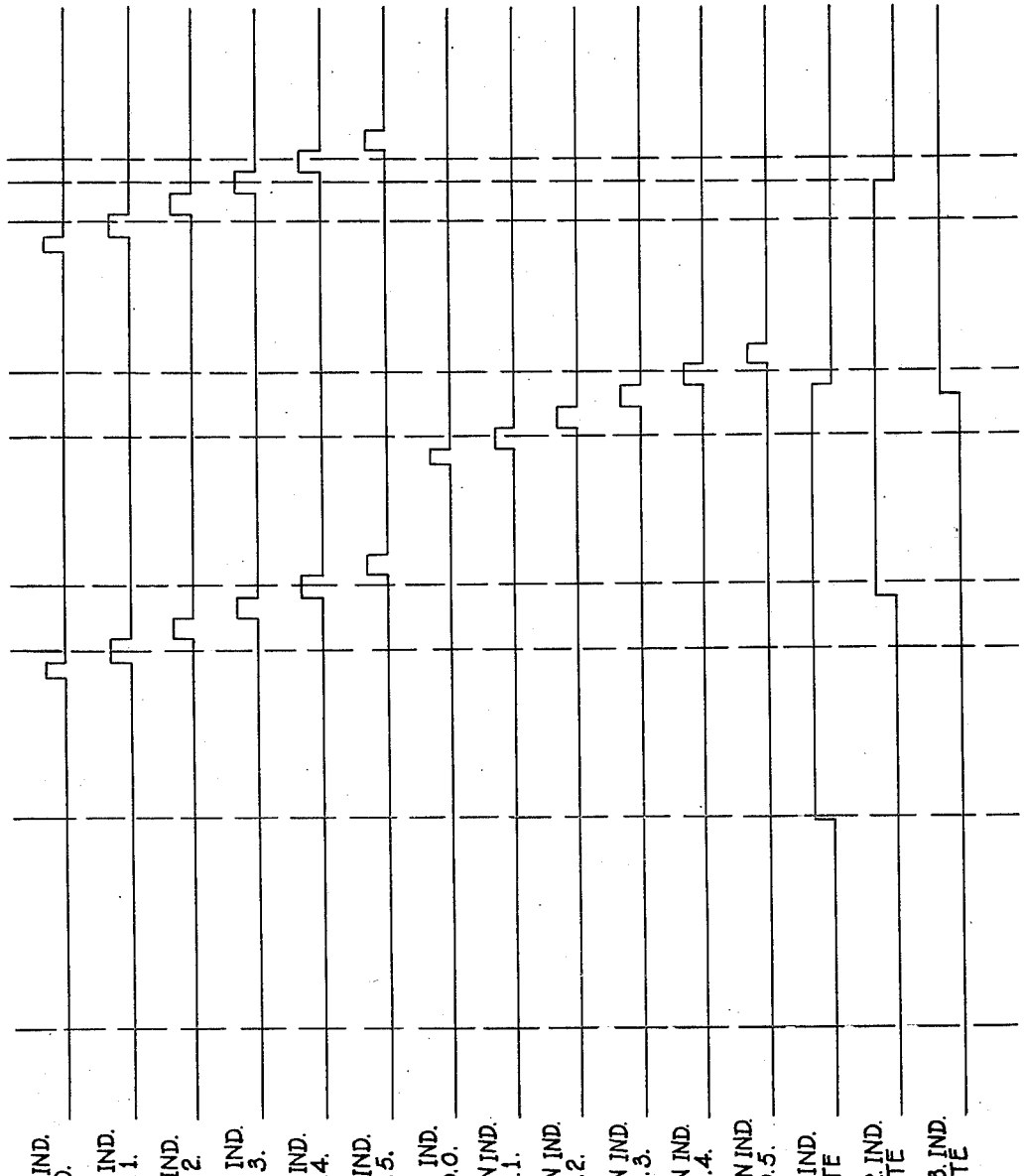

FIG.7D.

A-ODD STATION IND. STEPPER NO.0.
B-ODD STATION IND. STEPPER NO.1.
C-ODD STATION IND. STEPPER NO.2.
D-ODD STATION IND. STEPPER NO.3.
E-ODD STATION IND. STEPPER NO.4.
F-ODD STATION IND. STEPPER NO.5.
G-EVEN STATION IND. STEPPER NO.0.
H-EVEN STATION IND. STEPPER NO.1.
I-EVEN STATION IND. STEPPER NO.2.
J-EVEN STATION IND. STEPPER NO.3.
K-EVEN STATION IND. STEPPER NO.4.
L-EVEN STATION IND. STEPPER NO.5.
M-STATION NO.1. IND. STORAGE GATE
N-STATION NO.2. IND. STORAGE GATE
O-STATION NO.3. IND. STORAGE GATE

Inventor
H. C. Kendall,
Neil W. Preston,
his Attorney

Feb. 17, 1953  H. C. KENDALL  2,629,088
CENTRALIZED TRAFFIC CONTROLLING SYSTEM FOR RAILROADS
Filed Sept. 30, 1950  31 Sheets-Sheet 25

Inventor
H. C. Kendall,
By Neil W. Preston,
his Attorney

Feb. 17, 1953  H. C. KENDALL  2,629,088
CENTRALIZED TRAFFIC CONTROLLING SYSTEM FOR RAILROADS
Filed Sept. 30, 1950  31 Sheets-Sheet 26
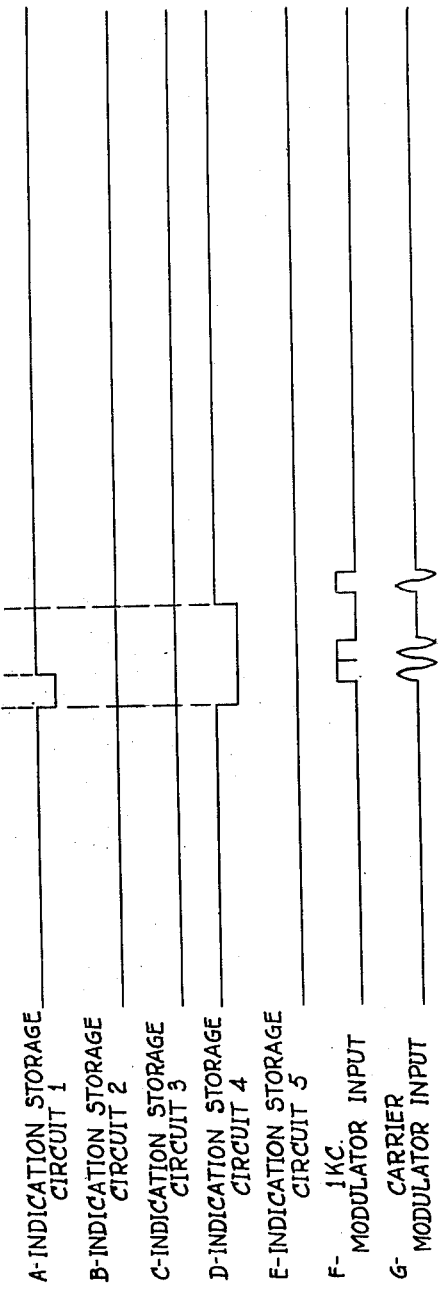
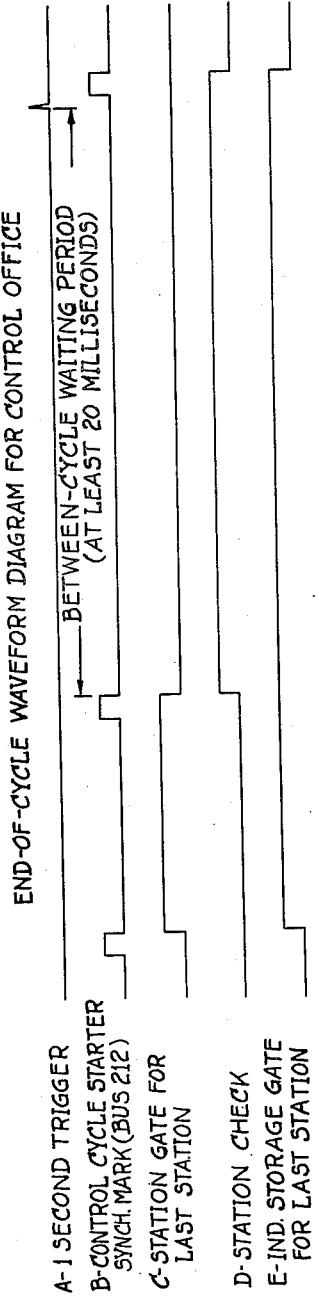
Inventor
H. C. Kendall,
Neil W. Preston,
his Attorney

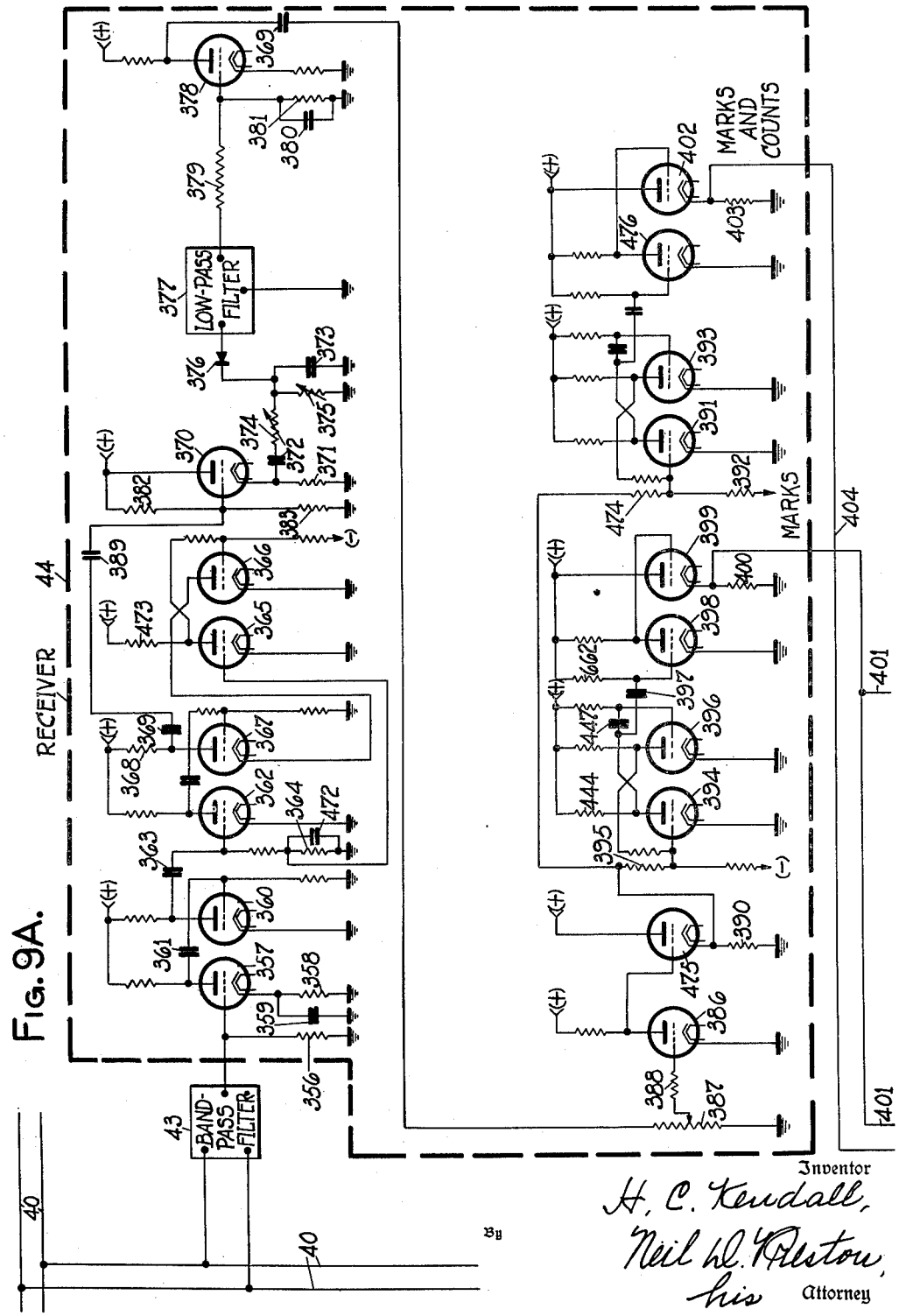

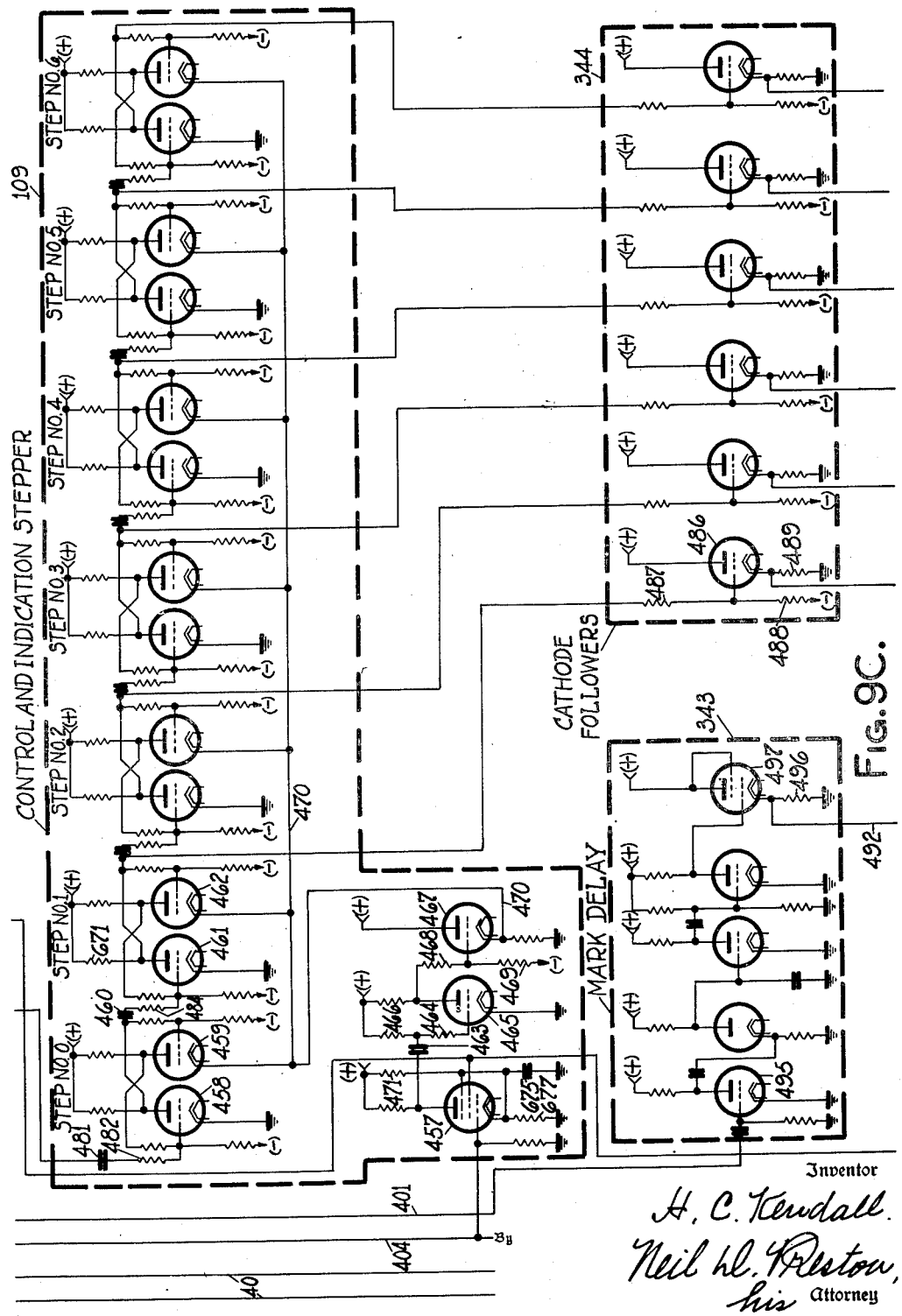

Feb. 17, 1953     H. C. KENDALL     2,629,088
CENTRALIZED TRAFFIC CONTROLLING SYSTEM FOR RAILROADS
Filed Sept. 30, 1950     31 Sheets-Sheet 30
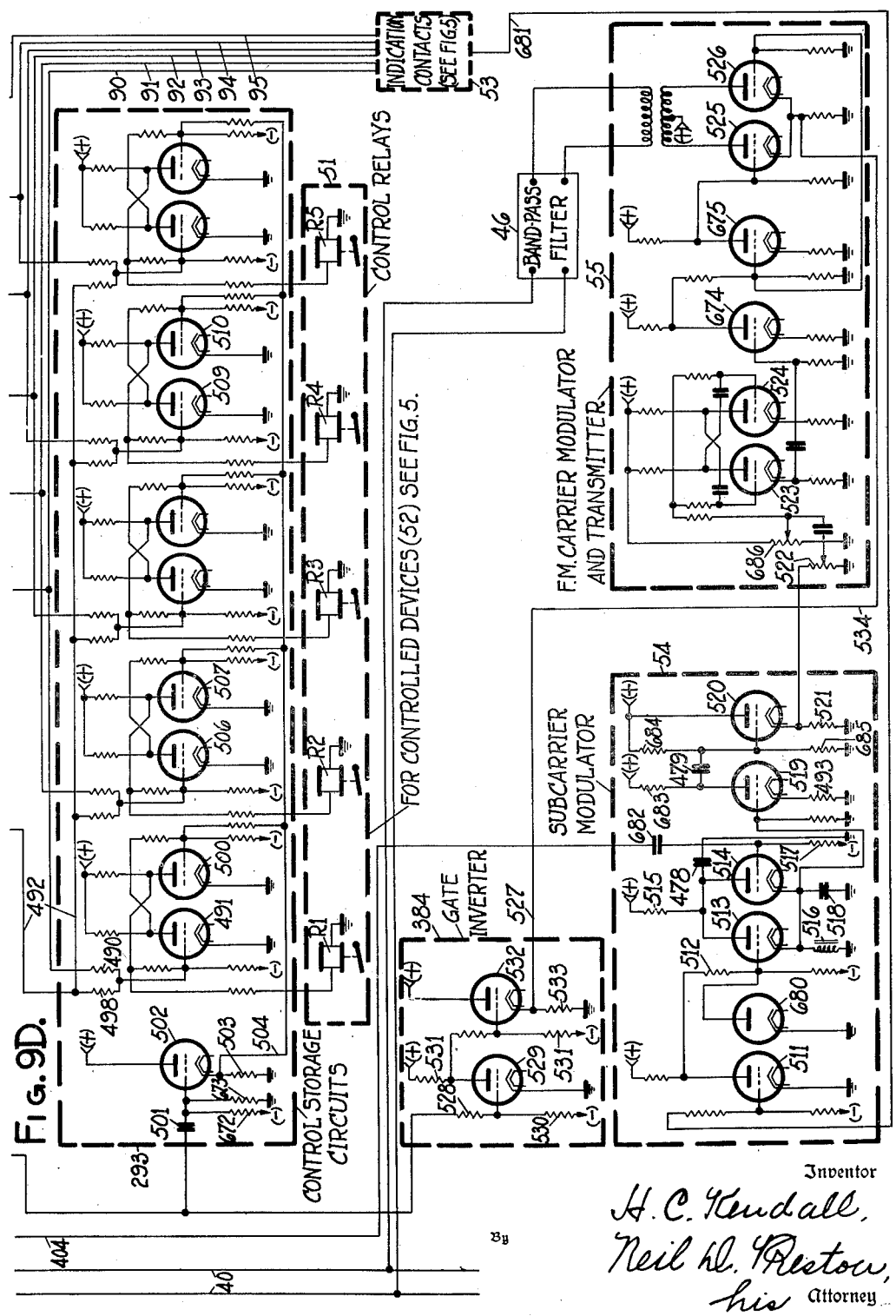
Inventor
H. C. Kendall,
Neil D. Preston,
his Attorney

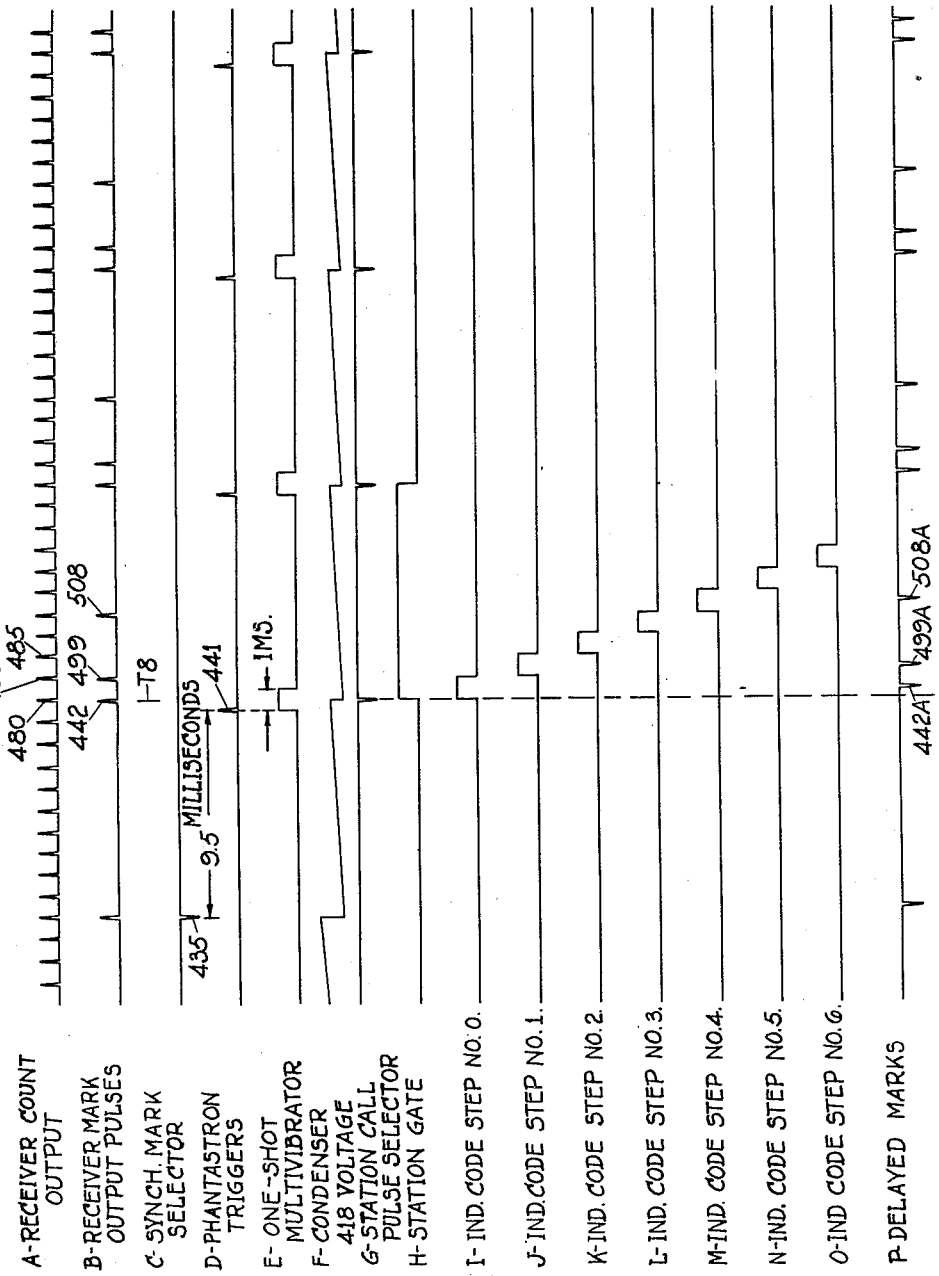

Patented Feb. 17, 1953

2,629,088

UNITED STATES PATENT OFFICE 2,629,088

CENTRALIZED TRAFFIC CONTROLLING SYSTEM FOR RAILROADS

Hugh C. Kendall, Rochester, N. Y., assignor to General Railway Signal Company, Rochester, N. Y.

Application September 30, 1950, Serial No. 187,728

20 Claims. (Cl. 340—147)

This invention relates to an electronic communication system in which controls are transmitted from a control office to a number of remote locations in rapid succession and contemporaneously with the return transmission of indications and other information from such remote locations to the control office. More particularly, this invention pertains to an electronic pulse communications system adapted to be used as part of a centralized traffice control system for the purpose of governing railroad traffic.

In modern railway practice, the desirability of controlling the switches and signals at various remote locations or field stations, along a railway from a single control office has long been evident. A system of this type, namely, a centralized traffic control system (conveniently abbreviated C. T. C. system) has advantages that lie not only in its inherent safety features but particularly in the more expeditious movement of traffic it permits. In using a system of this type, the operator at the control office can remotely control the operation of track switches and signals along the territory governed by that particular control office merely by the manipulation of an array of switches or levers mounted upon a panel. Such control of the switches and signals by the operator is subject to the regulation of automatic safety circuits which prevent the occurrence of an unsafe condition with respect to the operation of any switch or signal. In addition, a C. T. C. system provides for the transmission from each field station to the central control office of information which not only informs the operator at the control office of the actual operated position of each signal and switch in the territory governed by that control office, but also informs him of the location of all trains in that territory. Additional information, as required, may be transmitted from the various field stations to the control office.

The operation of prior types of C. T. C. systems has been dependent mainly upon the use of electromagnetic relays in code type communications systems. Such communications systems, although highly satisfactory in many respects, have the inherent disadvantage of being somewhat slow in operation. Also, to minimize equipment wear, communications systems of this kind are normally at rest which means that the system is set into operation only when a new control or indication is to be transmitted. At times it becomes desirable to transmit a large number of such controls or messages to a number of field stations; but communication may be had with only one field station at a time during a cycle of operation, and it is necessary, therefore, that some means be provided for establishing a priority between the field stations. In some cases, the most desirable priority in the transmission of messages is not brought about and an unavoidable delay in traffic can then occur.

The communication system of the present invention is electronic in nature, and is capable of extremely rapid operation. Since there is practically no mechanical movement of parts involved, the feasibility of having a system which continually transmits both controls and indications becomes apparent. In this system, controls and indications are transmitted between the control office and all field stations during each cycle of operation which may be of very short duration. Obviously, the particular cycle operating time required for such a system depends upon the number of stations involved and the time allotted for the transmission of controls to each of such stations. For convenience in disclosing the present invention, a cycle of one second duration has been selected, providing nine steps for the transmission of controls in addition to a single step included for station-call purposes for each of a maximum of 96 stations. Since the duration of each pulse is one millisecond, a total of ten milliseconds is allotted to the transmission of controls to each station. The one second cycle time also includes a rest period at the end of each cycle after all stations have been transmitted to. For the transmission of indications, eight steps are provided for each station in addition to a single step included for station-registering purposes. Since, in this system, new cycles of operation are initiated in rapid succession, the transmission of controls and indications is practically instantaneous and no backlog of controls or indications can accumulate. An added advantage is that any distortion in the transmission of a control or indication during one cycle of operation because of transient disturbances is quickly corrected in the next succeeding cycle.

In the communication system of this invention, the intelligence transmitted between the control office and the field stations appears as frequency modulation of a carrier wave. This carrier wave can be of any desired frequency and transmitted either over line wires or by means of radio. In the particular embodiment here shown, the system has been adapted to the transmission of information over a single pair of line wires. Since both controls and indications are transmitted simultaneously, the need for two different carrier frequencies is apparent. Accordingly, the transmission of controls takes place in this embodiment by the frequency modulation of a carrier wave $f1$, assumed as 15 kc.; whereas, indications are transmitted as frequency modulation of a carrier wave $f2$, assumed as 8.5 kc. Although these frequencies have here been mentioned for the purpose of making this disclosure definite, obviously, other frequencies could as well be employed. Furthermore, the features of this system are not limited to the transmission of information by frequency modulation of a carrier wave since phase modulation or amplitude modulation might also readily be used.

In the transmission of controls from the control office to the various field stations, only two different characters or deviations of the carrier are used, and for convenience these are termed "marks" and "counts." In the frequency modulated carrier wave which is transmitted from control office to field stations, a mark is characterized by a maximum deviation in frequency of the carrier wave by plus and minus 2 kc.; whereas, a count is characterized by a maximum frequency deviation of the carier wave of plus and minus 1 kc. Both marks and counts have a time duration of one millisecond. In the transmission of indications from the various field stations to the control office, use is made of only one character. This character, a mark, produces a frequency deviations of the 8.5 kc. carrier wave plus and minus 1 kc. and also has a time duration of one millisecond.

The control office is provided with a panel upon which is indicated in minature the track layout for the territory governed by the C. T. C. system and also the various track switches and signals associated with the railway. A control lever is mounted on the panel corresponding to each track switch, and another control lever is provided for the signals associated with that switch location. By manipulation of these levers, the operator at the control office is able to select the makeup of the control codes transmitted to the field stations during successive cycles of the system and, in this way, remotely control the operation of the switches and signals along the railway.

Each complete cycle of operation for the transmission of controls from the control office to the field stations includes a synchronizing mark followed, after a definite time interval, by groups of marks following one another in a definite time sequence. Each such group of marks begins with a mark shown as a station-call mark to which certain apparatus at each field station is distinctly responsive. Each field station also includes means for counting these marks so that out of the entire code cycle the particular control code intended for that station can be selected. The times of occurrence of the remaining marks in each group with respect to the initial station-call mark determine the particular controls being sent to that station.

Either counts or marks are transmitted continuously from the control office, one each millisecond, while the system is in operation. In other words, wherever the control code does not require the occurrence of a mark on any one millisecond period, a count is transmitted. The regular occurrence of either a mark or a count each millisecond permits a stepping operation at each field station during that portion of the control cycle allotted to that station. This stepping operation permits determination of the time-position of the control marks with respect to the station-call mark, thereby determining the controls intended for that station.

The entire code cycle is received at each field station and acts upon the electronic receiving circuits which produce two separate outputs. One of these outputs provides a pulse corresponding to each mark in the received code and the other provides a pulse corresponding to both marks and counts and thus produces a pulse once each millisecond. The synchronizing mark at the beginning of each code cycle is identified as such because it is the first mark to occur following the rest period at the end of the preceding cycle during which, as has been explained, no marks are transmitted. Certain apparatus at each field station, normally held inactive during most of each control cycle by the reception of the synch mark and station-call marks, finally becomes active during this waiting period when no marks are received. Being thus active, this timing apparatus is then effective to identify the next received mark, i. e., the synch mark, as such. The reception of the synch mark initiates the operation of timing apparatus that permits the next mark received after the timed interval, i. e., the station No. 1 call, to be properly identified as a station-call mark. The reception of this station call mark then again initiates the operation of the same timing apparatus so that at the end of the timed interval the next received mark, which is the station No. 2 call mark, is also properly identified as the station-call mark. To permit repeated use of this same timing apparatus which repeatedly measures the same time interval, the time between the synch mark and the call mark for station No. 1 is chosen to be equal to the time between all other consecutive station-call marks. The result then is that separate outputs are provided, one including a pulse corresponding to each synch mark and the other a pulse corresponding to each station-call mark. Neither the synchronizing mark nor the station-call marks are distinctive as such from the other marks; their identity is determined only by their time of occurrence as measured by the timing means at each field station.

An electronic counting circuit included at each field station counts the station-call marks. A function of the synchronizing mark occurring at the beginning of each cycle is to reset this counting circuit at the beginning of each cycle to ensure a correct count. When the counting circuit at any field station has counted a predetermined number of station-call marks to identify that station as the one then to receive controls, an electronic stepping circuit at the selected station is operated in response to that particular output of the receiving circuits which, as described, produces a pulse once each millisecond corresponding to each received count and mark. It is for the purpose of this field station stepping that the counts are included in the control cycle. The occurrence of control marks at various steps of the control cycle for each station selectively controls the electromagnetic relays at that station and they, in turn, actuate controlled devices as in prior types of C. T. C. systems.

Since the controlled apparatus at a field station generally includes a power operated switch machine and signals governing the movement of trains in both directions, the controls transmitted from the control office may cause the switch machine to be operated to either the normal or reverse position and cause the energization of the proper signal at that location to permit the desired train movement. As already mentioned, such operation of the apparatus at a field station is subject to the control of additional safety circuits. Other controls, either in lieu of or in addition to those mentioned, may also be transmitted to any of the field stations, as, for example, a maintainer's call.

A number of contacts are included in the apparatus at each field station and are selectively closed either by manual operation or by the energization of corresponding relays. The selective closure of these contacts determines the nature of the code transmitted from that field station to the control office. The indication code of a station is similar to the control code already described in that it includes a station-registering mark followed by a group of indication marks. The information contained in such indication code depends upon the time of occurrence of the indication marks with respect to the station-registering mark. The indication code differs, however, to the extent that no counts are included, i. e., only marks are used. The required timing function is performed by counts generated at the control office as will be explained.

Each of the field stations transmits its indication code to the control office contemporaneously with its reception of that portion of the control code cycle containing the group of characters intended specifically for that station. The receiving equipment at the control office allows for the variation in transmission time which occurs because of the different distances between the control office and the various field stations. The proper amount of time to be allotted as compensation for wave propagation time must, of course, be based upon the distance of the field station most remote from the control office. In this particular system, an indication code is properly received as long as the first mark of the group for a station, which is the station-registering mark, is received at the control office within the time allotted for the transmission of controls to that particular station, and if the last indication mark from that station is received before the end of that portion of the control code cycle allotted to the next field station in sequence. In this way, sufficient time is allotted to provide for the propagation time from the most remote field station.

More specifically, two separate receiving circuits are provided at the control office. One of these receiving circuits is so gated that it responds only to station-registering marks arriving at the control office during those portions of the control cycle allotted to the transmission of controls to the first, third, fifth, etc., stations. The other receiving circuit is so gated that it responds only to station-registering marks arriving at the control office during those portions of the control cycle allotted to transmission of controls to the second, fourth, sixth, etc. stations. Thus, these receiving circuits are designated as the odd registering mark selector and the even registering mark selector, respectively. During the station period demarcating the time interval for the transmission of controls to an odd-numbered field station, for example, the first portion of the indication code, including the station-registering mark, is received from such station. The registering mark selector circuit for the odd-numbered field stations is active at that time, and as it responds to this station-registering mark several actions result. One of these actions is that a count source is actuated to provide the required time-spaced pulses for indication stepping because, as has been mentioned, counts represented by frequency deviations of the carrier are not included in the indications transmitted to the control office from the various field stations. Output pulses corresponding to each occurrence of either a mark or count cannot, therefore, be provided by the receiver on successive pulse periods.

Separate indication steppers are provided at the control office for the odd and even-numbered field stations and, thus, another result of the response of either selector circuit is to select the proper one of these indication steppers to be actuated by the counts provided by the count source. Still another result of the selector circuit's response is to render itself inactive so that it cannot respond to the indication marks that follow the station-registering mark. Another result is the initiation of operation of a timing circuit to provide a suitable time interval having a duration substantially equal to the length of time allotted to the reception of an indication code from each field station. At the end of this time interval measured by the timing circuit, the count source is then rendered inactive and the stepping circuit which was then operating in response to the counts becomes inactive.

The next indication mark received in the indication code originates at an even-numbered field station and occurs at a time when the registering mark selector for the even-numbered field stations is active as such station-registering mark must arrive at the control office during the time allotted to the transmission of controls to this even-numbered field station. A series of events similar to that just described then occurs with respect to the apparatus associated with this even registering mark selector. In this way, the indication steppers are alternately made responsive to the counts supplied by the count source.

The occurrence of an indication mark on any step of an indication stepper provides a distinctive output which is then supplied to a corresponding step of a plurality of indication storage banks. The indication stepper that is actuated in response to the indication codes from the even-numbered stations has associated therewith an indication storage bank for each even-numbered station included in the communication system. The indication stepper that is actuated by the indication codes originating from the odd-numbered field stations similarly has associated therewith an indication storage bank for each odd-numbered station. During that portion of the control cycle allotted to the transmission of controls to station No. 1, the indication storage bank for station No. 1 is rendered active. However, the indication code from any field station may be delayed to such an extent that a portion of it falls within the time allotted to the transmission of controls to the next field station in sequence. Therefore, the indication storage bank for station No. 1 is also rendered active during the time allotted for the transmission of controls to station No. 2. Thus, of all the indication storage banks for odd-numbered field stations simultaneously being supplied with an input from the associated stepper, only the storage bank for station No. 1 will respond to the indication code from station No. 1.

During the station period for station No. 2, at least part of the indication code from station No. 2 is received at the control office. This indication code cannot produce an improper display of indications on the then active indication storage bank for station No. 1 because the station No. 2 code, coming from an even-numbered station, will be supplied from a different electronic stepper to the storage banks for the corresponding even-numbered stations only. Thus, the occurrence of a mark on any step of the indication code will actuate the corresponding step of the proper indication storage bank to give a visual display of the received indications.

A feature of this invention is, therefore, that only two electronic indication steppers are required at the control office in addition to the electronic station stepper and the control stepper already mentioned in order to demarcate the indication code periods and effect the proper registration of the indication codes.

The above description has pointed out that an electronic station stepper is included at the control office. This station stepper successively conditions the control apparatus at the control office for the several field stations. Also, a single electronic control stepper is employed at the control office to successively demarcate the control code pulse periods during each step of the station stepper. In other words, each time that the station stepper takes an additional step, thereby demarcating a portion of the control cycle to correspond to a particular field station, the control stepper is operated through all its steps. In effect, the control stepper divides the control cycle time allotted to each station into evenly spaced pulse periods. When the control stepper has operated through all its steps, the station stepper is again advanced one step, following which the control stepper is once again operated through all its steps. Thus, one of the more specific objects of the present invention is to provide a single electronic control stepper at the control office which is used in common for all of the field stations.

The station stepper at the control office also conditions the indication receiving apparatus for the several field stations one at a time in turn. Thus, a further object of the present invention lies in the use of a single field station stepper at the control office to condition appropriate electronic circuits both for the transmissions of controls to the field stations successively and for the reception of indications from the various field stations in turn.

Another object of the present invention is to provide an electronic station mark counter of the binary type at each field station to render that field station effective only during its proper portion of the operating cycle and thus effect this function of the system by use of a minimum amount of apparatus.

Also, an object of this invention is to provide a single electronic stepper at each field station for demarcating the successive pulse periods of a cycle allotted to that station for both control reception and indication transmission.

Another object is to provide a pulse generator at the control office responsive to the reception of indication codes from each field station for operation of an electronic stepping circuit conditioned to its successive steps in synchronism with the received indication codes.

Still another object is to provide an electronic stepper having improved characteristics which ensure against its missing a step.

Other objects, purposes, and characteristic features of the present invention will be in part obvious from the accompanying drawings and in part pointed out as the description of the invention progresses.

In describing this invention in detail, reference will be made to the accompanying drawings in which those parts having similar features and functions are designated throughout the several views by like reference characters, and in which:

Fig. 1A illustrates the general code arrangement at the control office of this communication system;

Fig. 1B shows the general code arrangement at a typical field station and also diagrammatically illustrates the operation of several selector circuits at a field station;

Fig. 1C shows the general indication code arrangement at the control office particularly showing how interference between successive indication code is avoided;

Fig. 2 shows in block form the general system organization;

Figure 3A:
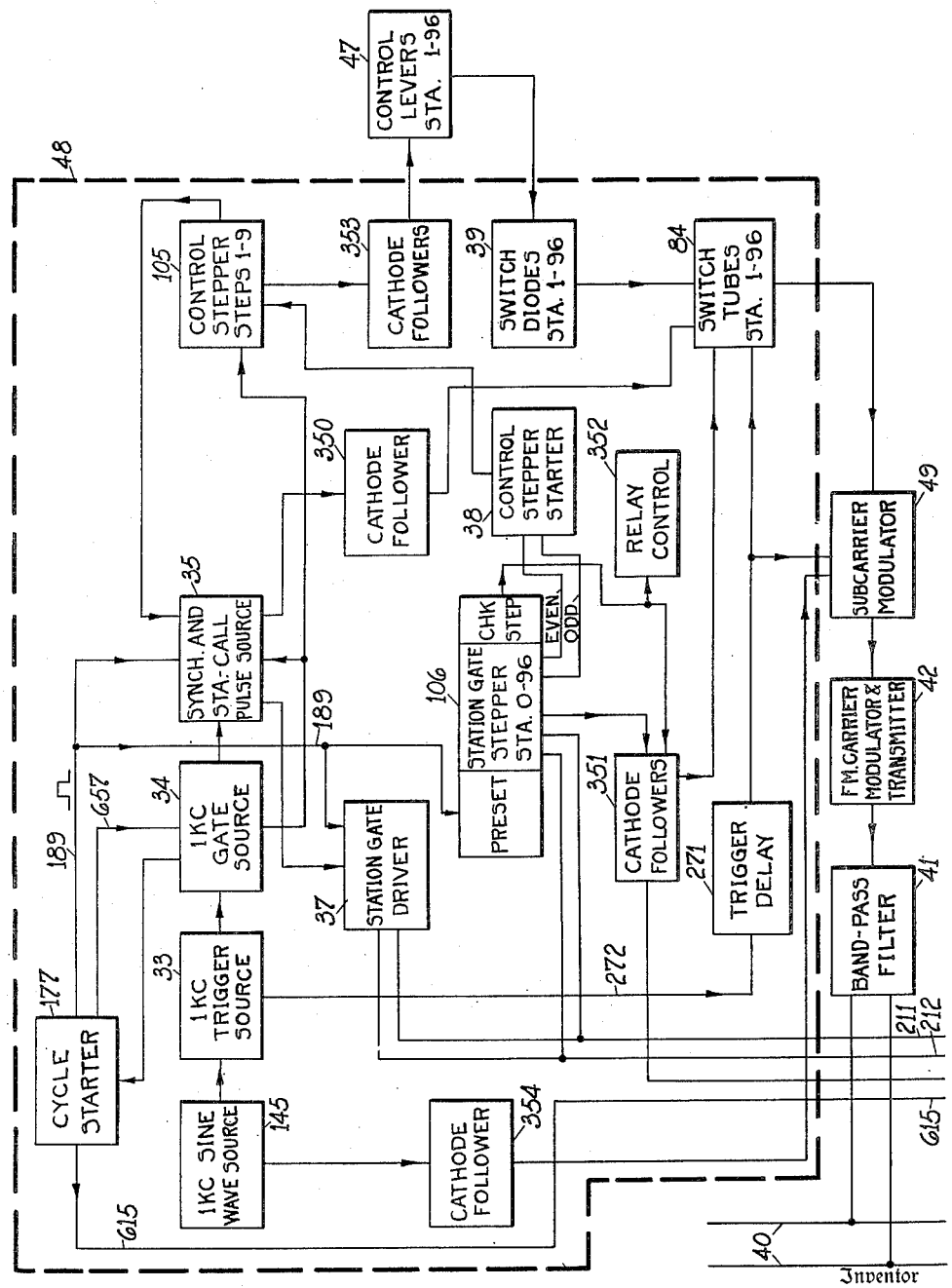
Figure 3B:
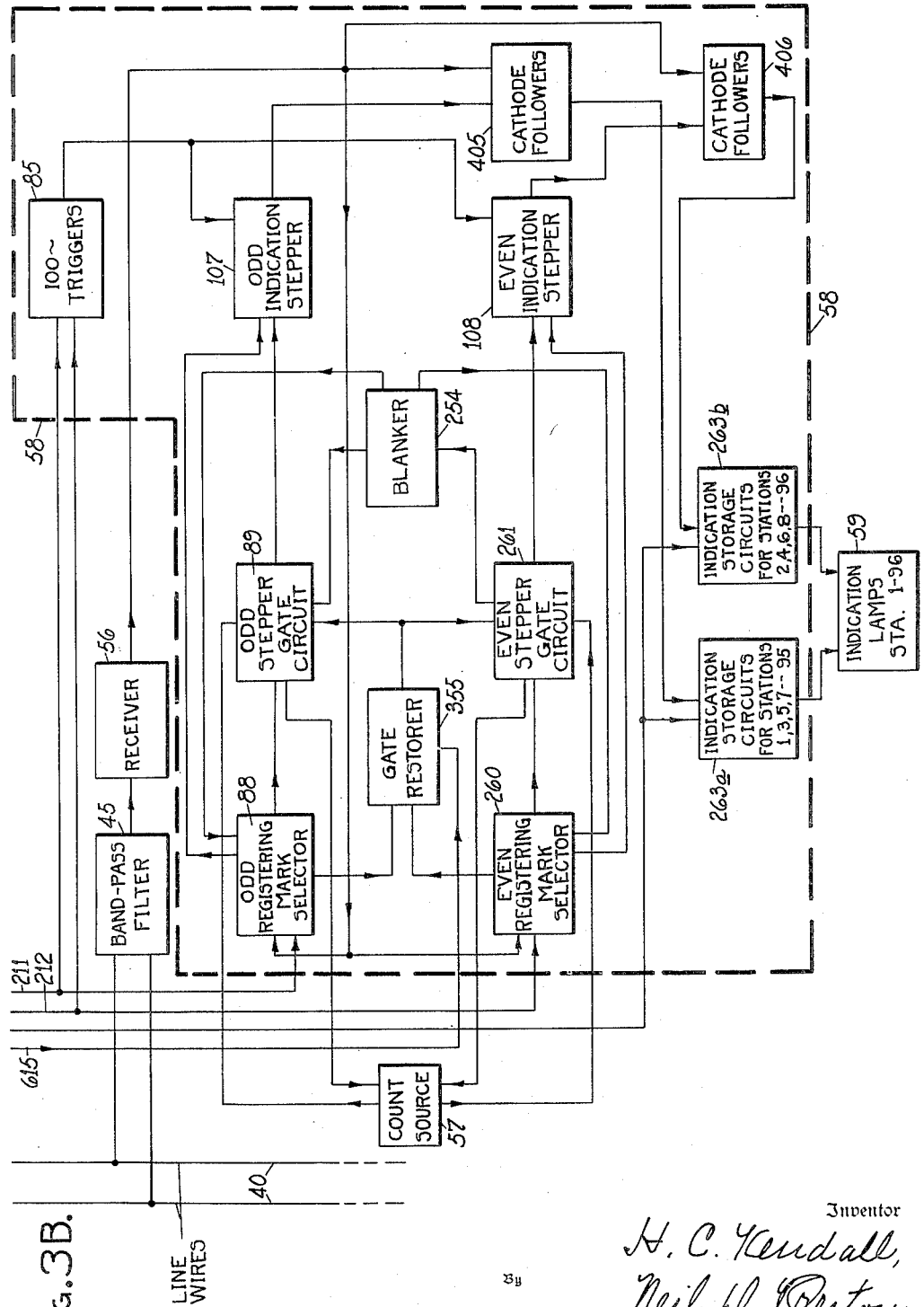
Figure 5:
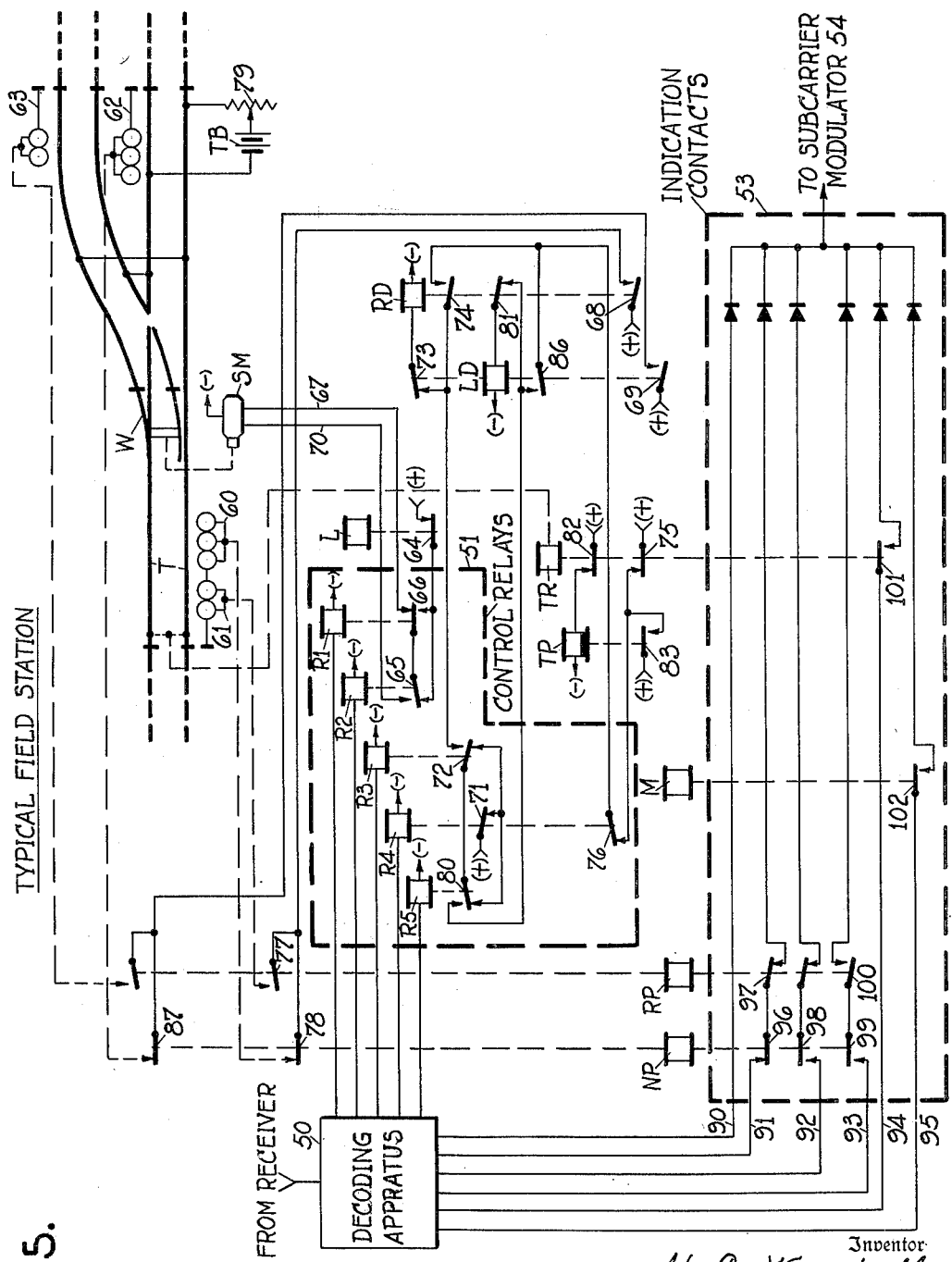

Figs. 3A and 3B, when placed one above the other, illustrate in block form the general layout and functions of the control office apparatus;

Fig. 4 is a block diagram showing the general layout and functions of the apparatus at a typical field station;

Fig. 5 is a circuit diagram illustrating the application of the apparatus at a typical field station to the control of switches and signals at such field station and including the operation of indication contacts for transmitting indications back to the control office.

Figure 6A:
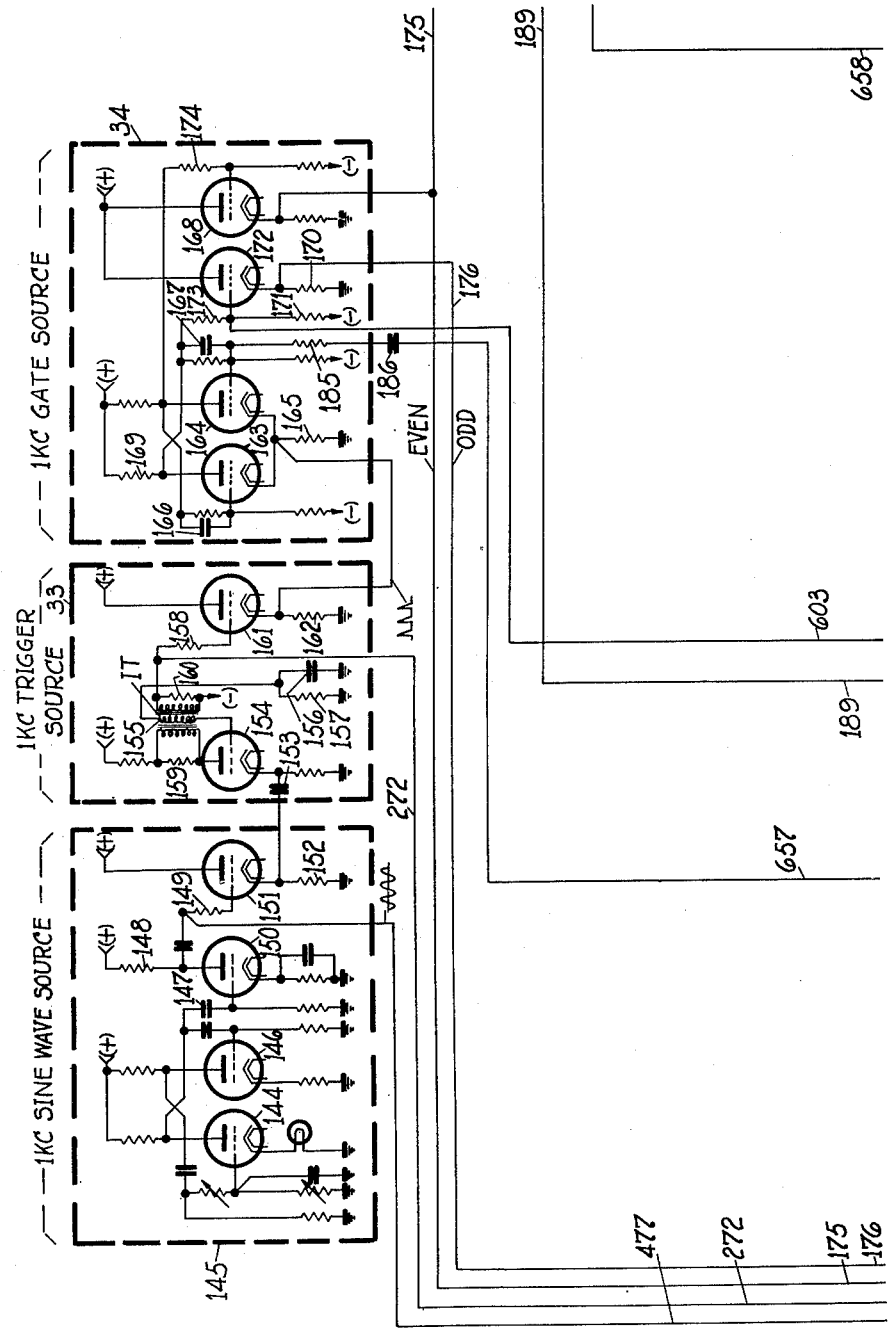
Figure 6G:
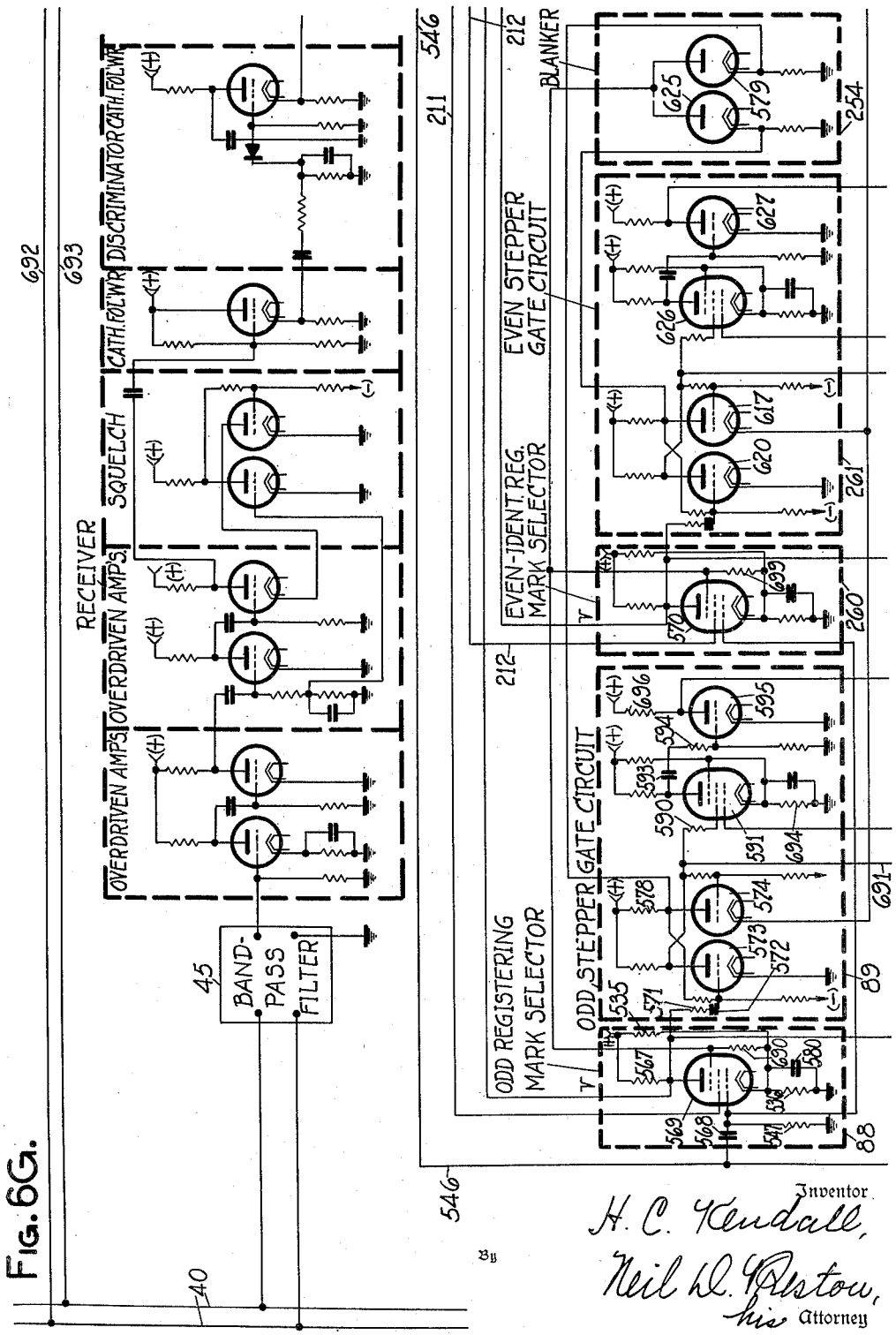
Figure 6J:
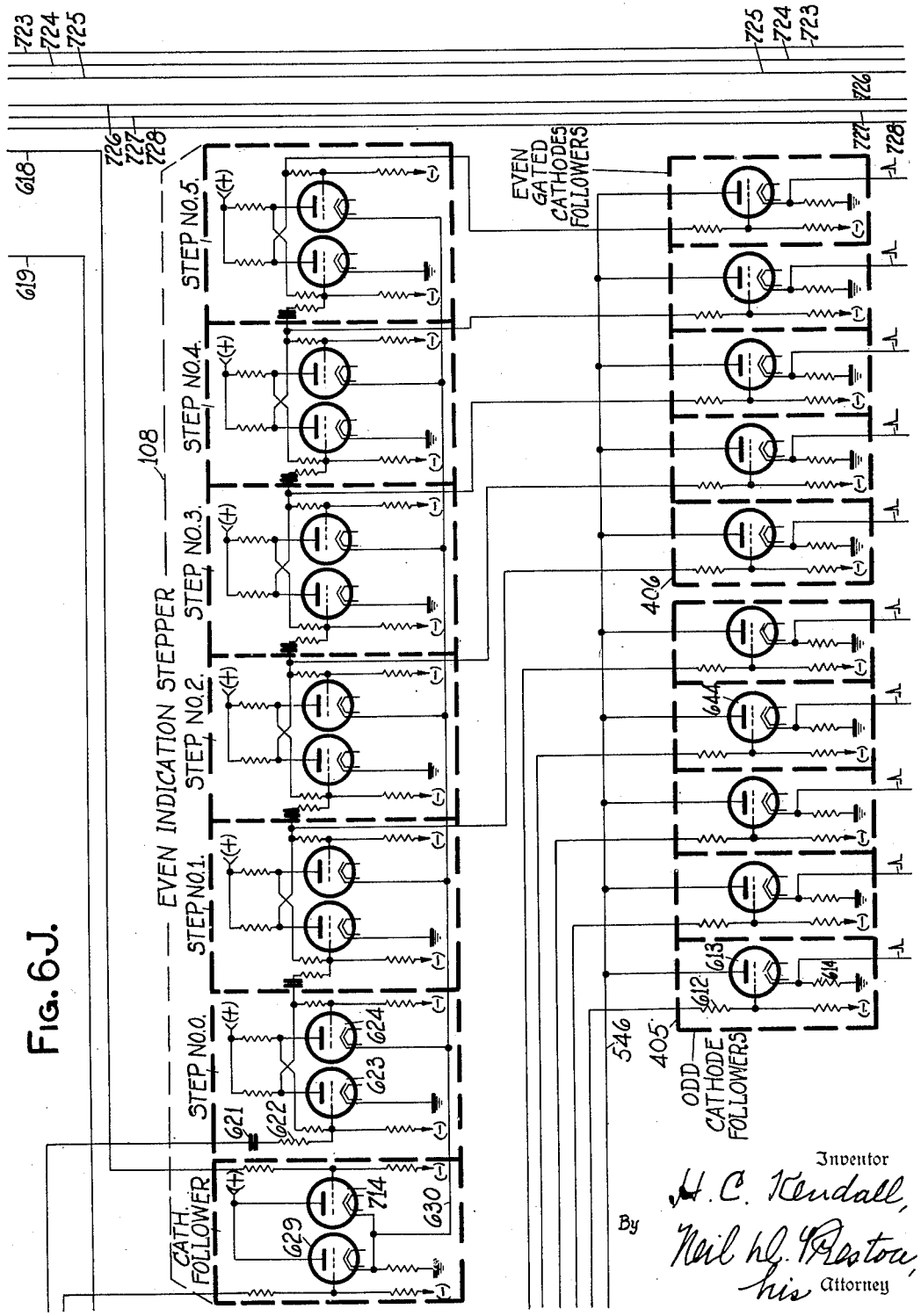
Figure 6K:
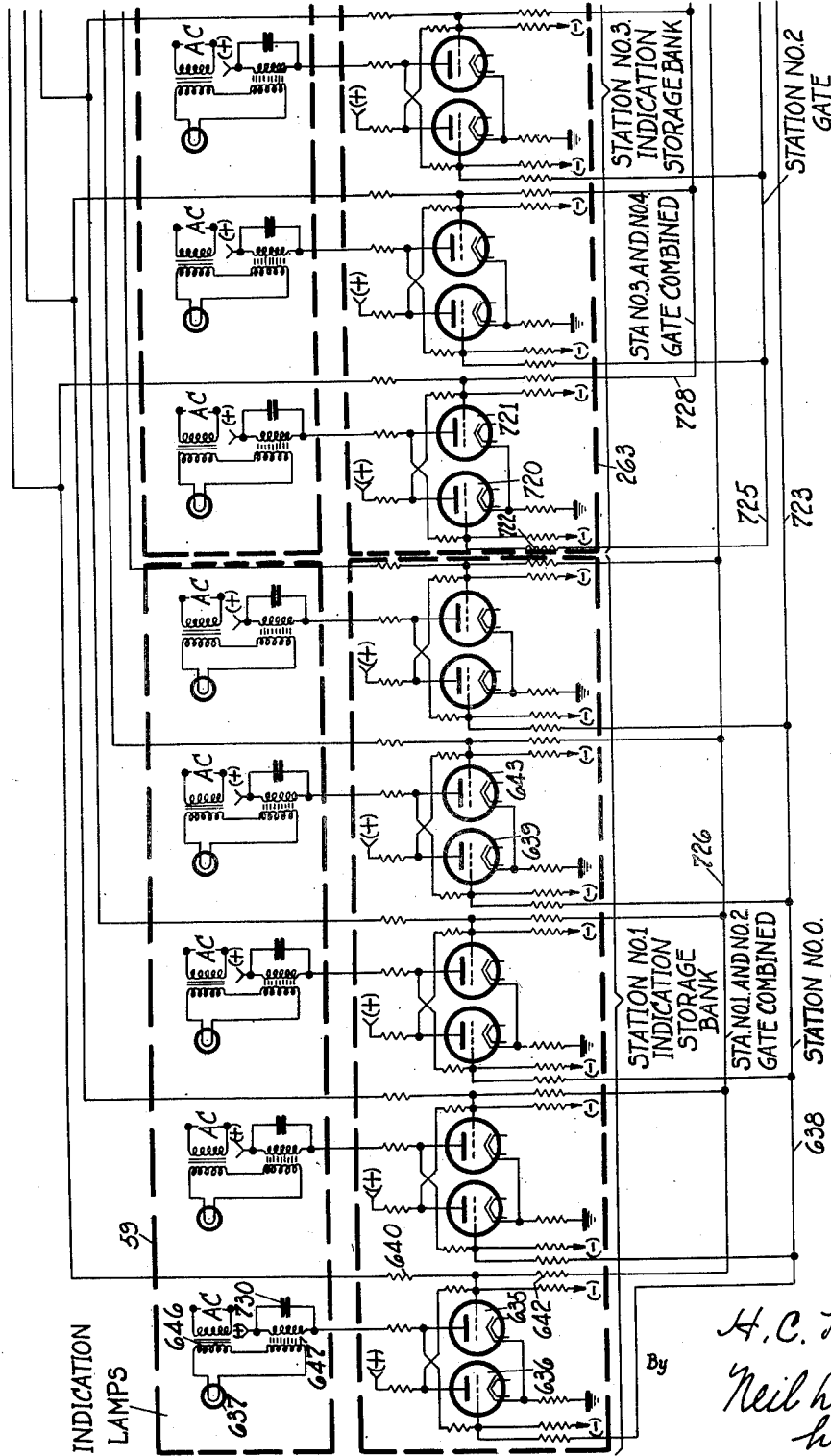
Figure 6L:
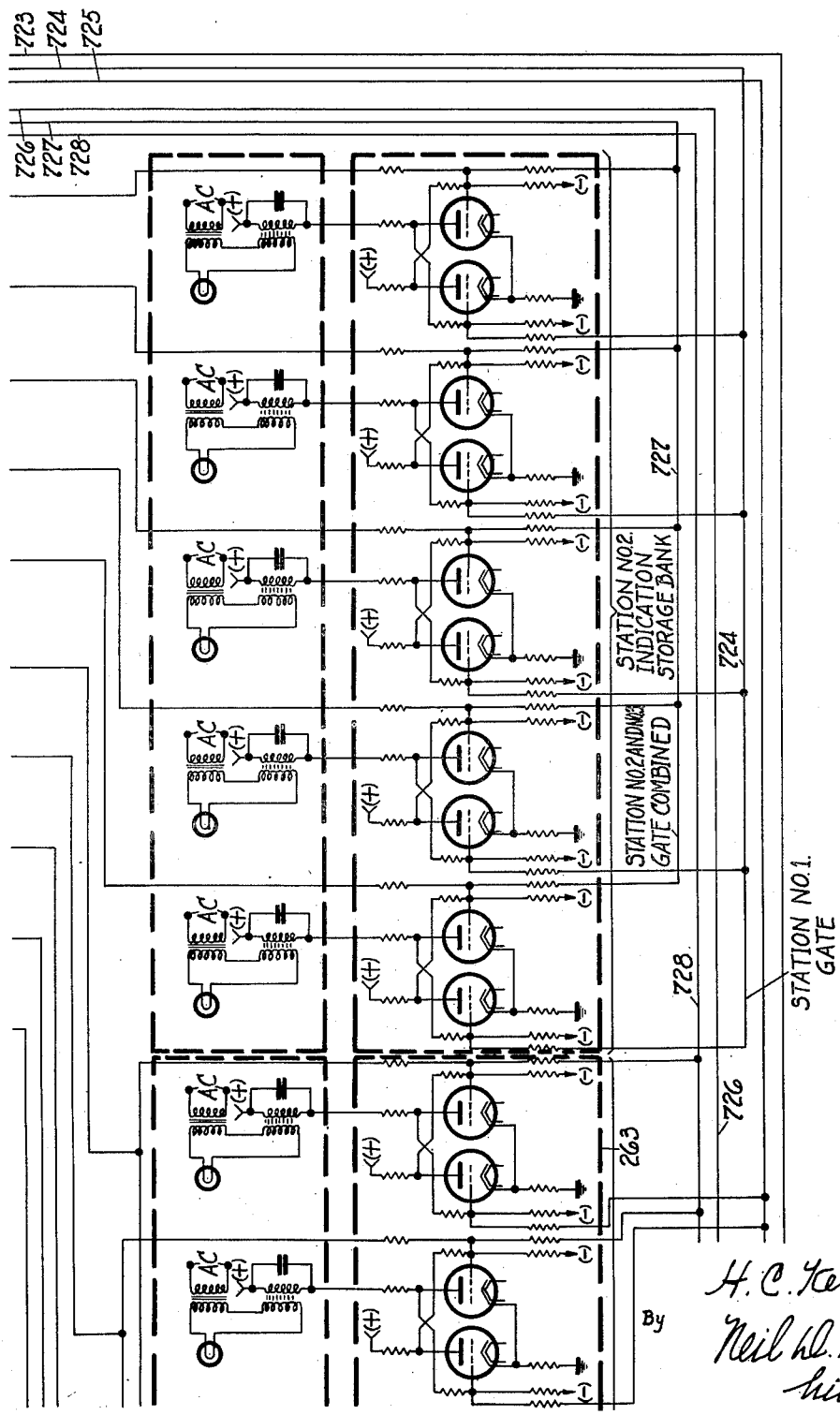

Figs. 6A to 6L, inclusive, when placed with Fig. 6B to the right of 6A, Figs 6C and 6D placed below Figs. 6A and 6B, respectively, and with the remaining drawings, 6E to 6L, placed in correspondingly similar positions, illustrate the detailed circuits of the control office apparatus;

Figs. 7A to 7E, when vertically aligned, show a waveform diagram which graphically illustrates the output of the various circuits at the control office at the beginning of a cycle of operation particularly showing their phase relationships;

Fig. 8 illustrates, in simplified form, the output of various control office circuits and their phase relationships for the end of a cycle of operation;

Figs. 9A to 9D, when vertically aligned, illustrate a typical field station; and Figs. 10A and 10B, when placed one above the other, illustrates the output of various circuits at a typical field station and indicates the phase relationships existing between those outputs.

For the purpose of simplifying the illustrations and facilitating the explanation thereof, the various parts and circuits constituting this embodiment of the present invention are shown diagrammatically, and certain conventional illustrations are employed. The drawings have been made more with the purpose of facilitating the disclosure of the present invention as to its principles and mode of operation than for the purpose of illustrating the specific construction and arrangement of parts that would be employed in practice. Thus, the various electronic tubes and their elements, together with associated resistors, condensers, and other circuit elements, are shown in conventional circuit form. Similarly, various relays and their contacts are illustrated in a conventional manner instead of showing all of the details of such apparatus. Sources of electrical energy are represented by the conventional symbols (+) and (—) associated with appropriate arrow heads and tails, respectively. These symbols indicate connections to the opposite terminals of one or more suitable sources of direct-current energy as may be required.

The numerous electronic tubes included in the system are shown to be of the type having filaments independent of their cathodes. Although the energization of these filaments has not been shown in detail, manual control of such energization may be provided in order that energy may be applied to the tubes while the system is in service but removed when the system is not in operation or when it is undergoing repair.

As an aid in making clear the exact manner of operation of this system, various block diagrams have been included which show the general function of the numerous detailed circuits. These block diagrams have been prepared for the principal purpose of outlining the major components of the system and of showing the general manner in which these components produce the desired results. For a detailed understanding of these various components, reference should be made to the detail circuit diagrams which show the circuits and apparatus included in each of the blocks shown in the block diagrams and with corresponding reference characters and legends to facilitate an understanding of the disclosure.

GENERAL ORGANIZATION

The features of this invention will be found to be useful in a varity of different applications where the ability to transmit controls and indications rapidly between a control office and a number of remote stations is desirable. To demonstrate clearly and specifically the utility of this communications system, the particular embodiment of this invention here disclosed illustrates the use of this system as applied to the control of power switch machines and signals in a C. T. C. system for railroads.

Referring to Fig. 2 of the accompanying drawings, a pair of line wires 40 extend between a control office and a plurality of field stations. The control office includes transmitting and receiving equipment as does each of the field stations. Since all of the field stations are the same as the field station No. 1 shown in Fig. 2 except for the settings of their code selectors, only one typical field station has been shown in block form in this figure.

All of the field stations included in the system and also the control office transmit and receive over this single pair of line wires 40, and both controls and indications are simultaneously transmitted over these line wires 40 by employing different carrier frequencies for controls and indications. For convenience in the disclosure, it is assumed that controls are transmitted from the control office to the field stations by a carrier frequency $f1$, assumed to be a carrier wave of 15 kc.; whereas, the indications are transmitted from the several field stations to the control office by a different carrier frequency $f2$, assumed to be a carrier wave of 8.5 kc.

Because the transmitting and receiving apparatus at the field stations and the control office is not by itself frequency selective, suitable band-pass filters are used to differentiate between the control and indication code pulses. Thus, the transmitting apparatus at the control office has the band-pass filter 41 designed to pass the output of the FM carrier modulator and transmitter 42, which output consists of a frequency modulated carrier wave of 15 kc. This output is then applied to the line wires 40 and transmitted to all of the field stations in the system. The receiving apparatus at each field station includes a band-pass filter 43 which is of a design similar to that of the band-pass filter 41, and therefore the signal transmitted from the control office is passed by the filters 43 at each of the field stations and applied to their respective receivers 44. In a like manner, the transmitter at each field station is provided with a band-pass filter 45 designed to pass the output of the FM carrier modulator and transmitter 55 which is a frequency modulated indication carrier wave of 8.5 kc. The band-pass filter 45 at the control office is of a design similar to that of the band-pass filter 46 at the field stations for passing the received indication signal transmitted over the line wires 40 to the control office receiver 56.

The control office transmitting apparatus includes besides the band-pass filter 41, an FM carrier modulator and transmitter 42, a subcarrier modulator 49, coding apparatus 48, and control levers 47. The block diagram of Fig. 2 merely shows the general organization, and a more complete block diagram for the control office apparatus is shown in Figs. 3A and 3B while the complete detailed circuits are shown in Figs. 6A–6L.

Briefly, the coding apparatus 48 includes means for demarcating the successive complete cycles of operation together with means for measuring predetermined intervals of equal duration throughout each cycle of operation with each such interval after the first allotted to the transmission of controls to a corresponding field station. Where the number of field stations in a system is less than the maximum permissible for a given cycle time, the spare time at the end of the cycle after all stations have been transmitted merely adds to the required period of rest preceding the next cycle. The coding apparatus 48 also includes means for demarcating the plurality of pulse periods that are included in each of the measured time intervals or station periods.

On any pulse period included within a station period either of two distinctive characters may be transmitted from the control office to the field stations. These characters may be distinguishable by their being of high or low amplitude, one frequency deviation or another, and the like. In this particular embodiment of the invention, the marks and counts transmitted from the control office are, as previously explained, distinguishable by their being of different frequency deviation. The control supplied by the coding apparatus 48 to the subcarrier modulator 49 as indicated by the connection between these components in Fig. 2 is not characterized by variations in frequency. Instead, a distinctive pulse is supplied by the coding apparatus for each mark that is to appear in the transmitted control code.

The coding apparatus 48 controls the makeup of the control code by selecting as to whether a mark or a count is to be transmitted on any pulse period. A mark is always transmitted on the first pulse of each station period to identify at each field station the beginning of such new station period. Either marks or counts are selectively transmitted on subsequent pulse periods with each combination of marks and counts transmitted during a station period constituting the control or controls for a particular field station. As previously explained, either a count or a mark is transmitted on each pulse period in the control cycle even during the rest period occurring at the end of each cycle. The resulting series of code characters, constitute by their sequence, as formulated by their coding apparatus 48, the control code and are applied to the subcarrier modulator 49.

The desired combination of marks and counts constituting the controls to be transmitted are selected by the control levers 47, one or more of which are related to each field station within the system. These control levers may be of any suitable type mounted upon a control machine such as that shown, for example, in the Pat. No. 2,145,798, granted to J. F. Merkel on January 31, 1939.

The subcarrier modulator 49, upon receiving the input control from the coding apparatus 48 converts it into an amplitude modulated sine wave. For each application of a pulse from the coding apparatus 48 corresponding to the desired appearance of a mark in the control cycle, the sine wave for that pulse period is of a selected high amplitude. On all other pulse periods, the sine wave is of a lower amplitude. Such an amplitude modulated wave for controls is shown in Fig. 1A at line B as related to the time scale shown at line A.

matically at line "C" of Fig. 1A. Two closely
The amplitude modulated sine wave output of the subcarrier modulator 49 is provided as an input to the FM carrier modulator and transmitter 42 where the carrier wave of frequency F1 is frequency modulated in accordance with the amplitude modulated sine wave input. This frequency modulated carrier is illustrated diagrammatically at line C of Fig. 1A. Two closely spaced straight lines are used to represent the modulated carrier frequency for a pulse period on which a count is transmitted, while three closely spaced straight lines represent the modulated carrier for those pulse periods on which a mark is transmitted.

The field station receiving apparatus shown in Fig. 2 includes besides the band-pass filter 43, a receiver 44, decoding apparatus 50, control relays 51, and controlled devices 52. The block diagram of Fig. 2 merely shows the general organization of this field station receiving apparatus and a more complete block diagram for a typical field station is shown in Fig. 4 with the detailed circuits shown in Figs. 9A-9D, and the relation of these circuits to the control apparatus being shown in Fig. 5.

The frequency modulated pulses transmitted over the line wires 40 are received at each field station as indicated at line B of Fig. 1B, and are passed by the band-pass filter 43 (see Fig. 2) to the receiver 44 at that station. This receiver 44 at each field station reconverts the frequency modulated carrier signal into an amplitude modulated wave as indicated at line "C" of Fig. 1B. This amplitude varying wave is applied to two suitable amplitude discriminators so that the receiver 44 provides two outputs. One output includes a trigger pulse for each mark and count of the cycle and is indicated at line "D" of Fig. 1B. Another output provides a trigger pulse for each mark only of the cycle and is indicated at line "E" of Fig. 1B. These two separate outputs are supplied to the decoding apparatus 50.

During the reception of a control code cycle at each field station, the response of the synch mark selector to the synch mark and the repeated response of the call mark selector to the station-call marks in the control code holds the synch mark selector in an inactive condition. It cannot, therefore, respond to a mark applied to its input even though all the marks received at the field stations are so applied to its input circuit. During the rest period, however, at the end of each control cycle when no marks are received so that the call mark selector does not respond, the synch mark selector assumes an active condition. It can then respond to the next mark received and this next mark occurring after the waiting period is, as explained, the synch mark. In responding to the synch mark, the synch mark selector again renders itself inactive and is subsequently held in that condition as long as station call marks are received to actuate the call mark selector. This operation of the synch mark selector is diagrammatically illustrated at line F of Fig. 1B.

The ability of the call mark selector to respond only to the station-call marks applied to it is dependent upon the operation of associated timing circuits. The call mark selector is ordinarily held in an inactive condition, but at the beginning of each control cycle the response of the synch mark selector to the synch mark initiates the operation of a timing circuit. At the end of the timed interval, the timing circuit renders the call mark selector active. This action occurs just prior to the time that the station-call mark for station No. 1 is applied to the call mark selector input. In responding to this mark, the call mark selector again initiates the operation of the same timing circuit so that at the end of the timed interval which occurs just prior to the occurrence of the station-call mark for station No. 2, the call mark selector is again made active. The other timing circuit associated with the call mark selector causes this selector to become inactive at a measured time interval after it has become active. The time interval provided by this latter timed circuit is approximately equal to a single pulse period. Thus, the call mark selector is active to receive the expected station-call mark over a time interval extending to both before and after the expected occurrence of that mark so that it can properly be received by this selector circuit. The action of these selectors and their associated timing circuits is diagrammatically illustrated in Fig. 1B. At line "G" the timed interval is shown as beginning with either the occurrence of the synch mark or a station-call mark and extending to a time just prior to the expected occurrence to the next station-call mark. As shown, the station-call mark selector is made inactive a short time after the expected occurrence of the station-call mark so that this selector can be actuated only by the proper station-call mark and not by other marks occurring in the control code either just before or just after the station-call mark.

When any particular station is identified or selected as the result of the reception of the proper number of station-call marks as determined by an electronic counting circuit, suitable control stepper apparatus is made active at such station to operate step-by-step in response to the count triggers supplied to the other input of the decoding apparatus 50 and shown at line "D" of Fig. 1B. The control mark triggers for the several steps are properly routed as a result of this stepping operation to govern the respective control relays 51 for the corresponding steps. These control relays 51, in turn, govern the signalling apparatus at the field station as typically shown in detail in Fig. 5.

The transmitting apparatus at the field station includes, besides the band-pass filter 46, an FM modulator and transmitter 55, a subcarrier modulator 54, and the indication contacts 53 belonging to signalling devices disclosed in detail in Fig. 5.

As described, the decoding apparatus 50 includes means distinctively responsive to the station-call marks to select or determine that portion of the complete cycle during which the station is to receive controls. This control receiving period is also the period of time during which the station can transmit indications to the control office. Thus, a connection is made to supply the output of the decoding apparatus 50 to the FM modulator and transmitter 55 to open a suitable station gate only during this station period of the cycle to thereby permit a transmission of indications by the transmitter.

During the reception of the controls, the control stepping apparatus included in the decoding apparatus 50 demarcates the pulse periods of the particular station period corresponding to that station. One or more of the indication contacts 53 is associated with each of several pulse periods as demarcated by the decoding apparatus 50. The positions of these contacts determine the output of the subcarrier modulator on the several pulse periods. If no output is supplied by the subcarrier modulator to the FM modulator and transmitter 55, unmodulated carrier is transmitted. If an output is supplied by the subcarrier modulator, however, a mark is transmitted. Thus, only marks and no counts are transmitted in the indication code.

The first pulse period demarcated by the decoding apparatus 50 is not used for the transmission of indications for reasons which will later become clear. The station-registering mark for each station is transmitted on the second pulse period. In Fig. 1A where no allowance has been made to indicate propagation delay time of the indication code, the station-registering mark for station No. 1 is, therefore, shown as being received on the eleventh pulse period, i. e., the second pulse period of the station period for station No. 1. In this Fig. 1A, the indication codes received at the control office from stations 1 and 2 are illustrated diagrammatically at lines F and G. The control office receiver 56 responds to these frequency modulated transmissions by producing the amplitude varying sine wave shown at lines F and H. The receiver 56 output supplies a trigger pulse for each sine wave cycle occurring in the amplitude varying wave in a manner that will subsequently be described.

*Control office indication receiving apparatus*

The indication receiving apparatus at the control office includes besides the band-pass filter 45 for frequency F2, a receiver 56, a count source 57, a decoding apparatus 58, and indication lamps 59.

The indication Marks are received at the control office somewhat delayed with respect to the corresponding control codes. This delay is caused by the propagation time required for pulses to travel from the control office to a field station and back to the control office. A substantial propagation delay time has been indicated at line B of Fig. 1C by showing the station-registering mark from station No. 1 as being received on the seventeenth pulse period of the time scale rather than upon the eleventh. This station-registering mark might instead be delayed only a fractional part of a pulse period or for one or more pulse periods.

Regardless of the particular delay in propagation time, the frequency modulated carrier diagrammatically illustrated at line B of Fig. 1C is passed by the filter 45 to the receiver 56 which in turn converts the carrier into an amplitude-varying wave approximating a sine wave as shown at line C of Fig. 1C. The receiver 56 also includes pulse-forming apparatus for providing a trigger for each received mark. This output of the receiver is shown at line D of Fig. 1C.

As already explained, two separate selector circuits are provided at the control office and these selector circuits are together responsive to all the station-registering marks appearing in the indication code. One of these selector circuits responds only to the station-registering marks received from the even-numbered field stations; whereas, the other of these selector circuits responds only to the station-registering marks from the odd-numbered field stations. These selector circuits are designated as the even registering mark selector and odd registering mark selector, respectively.

Of these two selector circuits, only the odd registering mark selector is gated during the station period for station No. 1 so that only this selector can respond to a mark applied to its input. For this reason, the station-registering mark from station No. 1 must be received at the control office during the station period for station No. 1 so that it can properly be received by this selector circuit. As the selector circuit responds to this station-registering mark from station No. 1, one action of this selector is that it renders, through the action of an associated device, both selector circuits inactive so that they temporarily cannot respond even though all the marks of the indication code are supplied to their input. This action of the odd registering mark selector is shown at line E of Fig. 1C.

Two separate indication steppers are used at the control office, one for the odd-numbered field stations and the other for the even-numbered field stations. One result of the response of the selector circuit to the station-registering mark from station No. 1 is the actuation of a gating circuit associated with the odd indication stepper. The actuation of this gating circuit, indicated at line G of Fig. 1C, in turn produces several results. One of these is the actuation of a count source which produces triggers at 1 millisecond intervals while so energized. Another result of the actuation of the gating circuit is that the counts provided by the count source are supplied to the appropriate indication stepper which in this case is the odd indication stepper.

Another result of the response of the odd registering mark selector is the initiation of operation of a timing circuit which, after a timed interval of sufficient length to permit the entire indication code from a station to be received, restores the gating circuit which was then actuated to its normal condition. This action of this timing circuit is illustrated at line G of Fig. 1C. When this gating circuit is restored to its normal condition, the count source is deenergized and counts are no longer applied to the indication stepper that was being operated during the timed interval. Furthermore, the blanking effect on the odd and even registering mark selectors is removed so that they can respond, subject to the gating action already described, to the respective station-registering marks.

In a similar manner, the station-registering mark from station No. 2 is received during the station period for this station when the even registering mark selector is gated. This mark is received at a sufficient length of time following the reception of the similar mark from station No. 1 so that neither selector circuit is blanked at such time. Therefore, the even registering mark selector is responsive to this first mark received from station No. 2. Also, the count source again is made effective to supply triggers, through the appropriate stepper gate circuit, to the even indication stepper. The indication steppers are provided to demarcate the pulse periods of the indication code and so provide a means for determining the time of occurrence of the various indication marks with respect to the station-registering mark just received. Each step of the stepper gates a corresponding cathode follower tube. Although the mark pulses provided by the receiver are applied to all the cathode followers, only a gated tube can respond by supplying an output pulse. Thus, the occurrence of an output pulse from a particular cathode follower tube signifies the pulse period on which the corresponding mark occurred.

More specifically, a group of cathode followers is associated with each of the two indication steppers, and both of these groups of cathode followers has applied to it the receiver 56 output triggers corresponding to the marks occurring in the indication code. Only one of these groups of cathode followers can respond to the triggers applied thereto because only one of these groups of cathode followers is at any time successively gated by its associated indication stepper. The first or station-registering mark from any field station cannot produce such an output pulse of one of the cathode follower tubes because the stepping of the indication stepper is sufficiently delayed with respect to such station-registering mark that this mark cannot fall within a step of the appropriate indication stepper. For this reason, only output pulses corresponding to indication marks are supplied by each group of cathode followers to an associated group of indication storage banks. The group of cathode followers associated with the odd indication stepper supplies its output pulses to the corresponding steps of a group of indication storage banks for the odd-numbered stations, and the output pulses of the cathode followers associated with the even indication stepper are likewise supplied to the corresponding steps of a group of indication storage banks for the even-numbered stations.

Each indication storage bank is individually gated in turn so that it may respond to the appropriate indication pulses received from the corresponding field stations. As already described, the indication code from any field station may be so delayed by propagation time that a portion of such indication code is received at the control office during the control station period for the next field station in sequence. A requirement of this system is that the order in which the field stations are transmitted to also be the order of increasing propagation time delay so that no indication code will be received at the control office prior to the reception of the complete indication code from the preceding station, thereby preventing an overlapping of the indication codes at the control office.

To ensure that each indication storage bank is properly gated during the reception of indications from the corresponding field station, even though such indications may be considerably delayed with respect to the control station period for such station, the gate applied includes not only the control station period for the corresponding station but also the control station period for the next station in sequence. By way of example, the indication storage bank for station No. 2 is gated during the station periods for station Nos. 2 and 3. During this time, not only is the complete indication code from station No. 2 received but also all or at least the first portion of the indication code from station No. 3 plus the last part of the indication code from station No. 1 if the propagation time is so great that all the code from station No. 1 cannot be received during the station period for station No. 1.

The indication code from station No. 2 is applied to all the indication storage banks corresponding to the even-numbered field stations. Out of all these indication storage banks, only the one for station No. 2 is gated at this time so that only this indication storage bank will respond to the station No. 2 code. Even though parts of the indication codes from station Nos. 1 and 3 may also be received while this indication storage bank No. 2 is gated, such indication codes cannot register on the indication storage bank for station No. 2 since the indication codes are applied only to the indication storage banks for the odd-numbered field stations. The result then is that each indication storage bank has its various steps selectively energized by the indication code from its corresponding field station and is not affected by the indication pulses from other field stations in the system.

CONTROL OFFICE TRANSMITTING APPARATUS

Sine wave source

The control office apparatus includes a 1 kc. sine wave source 145 which supplies an output to the 1 kc. Trigger source 33 and also to the cathode follower 354 (see Fig. 3A). This sine wave source 145 includes an oscillator of the Wien bridge type comprising tubes 144 and 146, a buffer tube 150 and a cathode follower tube 151 (see Fig. 6A).

A detailed description of the Wien bridge oscillator will not be given, since oscillators of this type are well known. Also, other types of oscillators could just as well be used, since the chief requirement of this portion of the apparatus is to produce an output having a wave form of sinusoidal character and suitable frequency stability characteristics.

The alternating-current output of the Wien bridge oscillator is taken from the plate load resistor of tube 144 and passed through coupling condenser 147 to the control grid of the buffer amplifier tube 150. This buffer amplifier stage is provided with a cathode bias resistor, which is by-passed by a suitable condenser to avoid degeneration, and which has a proper value to cause the tube 150 to operate as a class A amplifier. The grid of this tube 150 is connected to ground through a suitable grid leak resistor. The alternating-current output of this buffer amplifier appearing across its load resistor is passed through the coupling condenser 148 and the decoupling resistor 149 to the grid of a cathode follower tube 151. This same alternating-current output of the buffer amplifier is also fed over bus 477 to the grid of another cathode follower 354 of Fig. 6E. This latter cathode follower 354 includes tube 322 and voltage divider resistors 323 and 324 for supplying the proper voltage level for the grids of tubes 151 and 322. This voltage level together with the cathode resistors of these tubes gives the proper bias for tube 151 so that its operation is class A. The output of the cathode follower tube 151 taken from its cathode resistor 152 is a sine wave alternating current of sufficient amplitude to operate the 1 kc. trigger source 33 by being coupled through condenser 153 to the cathode of tube 154.

One kc. trigger source

The trigger source 33 (Fig. 6A) includes tube 154 connected to act as a blocking oscillator and also a tube 161 connected to act as a cathode follower for selectively repeating the output pulses of the blocking oscillator as will be presently described. The blocking oscillator includes an impulse transformer IT provided with three windings, one connected in the plate circuit of the tube 154, another in the grid circuit of the same tube, and the third acting as the output winding.

The blocking oscillator tube 154 is of the driven type with its cathode supplied with a sine wave driving voltage from the sine wave source 145. The grid circuit of this tube 154, besides including a winding 155 of the impulse transformer IT, is also supplied with a condenser 156 and a resistor 157 connected in multiple. Each time that the blocking oscillator provides an output pulse in a manner to be presently described, condenser 156 is charged to a negative value sufficient to bias tube 154 beyond cutoff.

Assuming that tube 154 is biased beyond cutoff immediately following the occurrence of an output pulse, the bias voltage across condenser 156 discharges through resistor 157 and would finally decrease to such a value that tube 154 would start to conduct. Before the bias reaches this value, however, the driving sine wave voltage applied to the cathode of tube 154 goes through a negative half cycle, thereby suddenly increasing the grid-cathode voltage sufficiently to initiate conduction. In other words, the values of condenser 156 and resistor 157 are chosen to be of such a value that the grid voltage will rise to a value just below cutoff at the time that the driving voltage goes negative. Thus, the combination of grid and cathode voltages will result in a grid-cathode voltage that is above cutoff. The current flow through the primary of the impulse transformer included in the plate circuit induces a voltage in the grid winding 155 of such a polarity as to further swing the potential of the grid of tube 154 more positive. Thus, conduction, when once begun, becomes a cumulative action which continues until plate current saturation takes place. During the conduction of the tube, the positive grid has allowed sufficient grid current flow to charge the condenser 156. Thus, the reduction of the induced potential in winding 155 when plate saturation reduces the rate of change of plate current allows the negative voltage across condenser 156 to bias tube 154 below cutoff. As above mentioned, this charge on the condenser is sufficient to hold the potential on the grid below cutoff until the next pulse period. The collapse of the magnetic field of the impulse transformer caused by the plate current decrease as the grid-cathode voltage goes negative likewise induces a negative potential in the grid circuit which is cumulative with the negative charge of the condenser to cause the grid to swing very negative. But since no current can flow in the reverse direction through the grid circuit, the grid-cathode voltage is held negative until the condenser 156 has sufficiently discharged through resistor 157 to allow the grid to be again raised above its cutoff value.

As the charge on condenser 156 decreases, the potential on the control grid of tube 154 becomes less negative, and if given time the condenser would become sufficiently discharged to allow the grid to rise above its cutoff value so that the tube 154 would begin to conduct. Thus, when once started, the blocking oscillator would repeatedly conduct and then block itself. Ordinarily, the repetition rate of the blocking oscillator would depend upon the time required for condenser 156 to discharge, which of course depends upon the product of the values of condenser 156 and resistor 157.

However, the blocking oscillator is supplied with a negative input voltage just prior to the natural time period for the tube 154 to become conductive, which trips the oscillator so to speak and causes it to follow the repetition rate of the input voltage. In other words, the input voltage or signal has a recurring rate for its negative pulses or waves which is just slightly greater than the natural repetition rate of the blocking oscillator. For this reason, the blocking oscillator produces output pulses at the frequency corresponding to the frequency of the input voltage. This output is obtained from the third winding of the impulse transformer IT and is supplied to the grid of the cathode follower tube 161 through a decoupling resistor 158 and also over bus 272 to the grid of another cathode follower tube 274 through a decoupling resistor 273 (see trigger delay 271 of Fig. 6E). The primary winding of the impulse transformer IT is shunted by resistor 159, while the output winding of the transformer is shunted by resistor 160. These resistors are given the proper values to reduce any transient oscillations which might otherwise be produced.

The impulse transformer has one terminal of its output winding connected to (—) to supply a grid bias to both tubes 161 and 274 below their cutoff values. The output winding of the impulse transformer has a pulse of one polarity induced therein upon the rise of current in the plate circuit of tube 154, and a pulse of the opposite polarity upon the decay or cessation of current in the plate circuit of tube 154. The former pulse is of the greater magnitude, because at the time of the second pulse, the voltage across condenser 156 is already of such an amplitude that the tube output is reduced. The output winding of the impulse transformer is so connected in the grid circuit of the cathode follower 161 that this former pulse is capable of abruptly swinging the grid of tube 161 above its cutoff value to make that tube momentarily conductive. Each pulse of the opposite polarity, however, merely causes the grid of tube 161 to become more negative and as this tube is already biased to cutoff, such pulse is not repeated.

Thus, the blocking oscillator together with the cathode follower constituting the 1 kc. trigger source 33 produce a positive output trigger pulse at cathode resistor 162 for each cycle of the sine wave appearing at its input.

Referring to Fig. 7A, it will be observed that the output of the 1 kc. sine wave source 145 has been shown as giving a suitable sine wave. The output of the 1 kc. trigger source 33 has been shown immediately beneath the 1 kc. sine wave, with the trigger pulses shown as occurring during the negative half cycles of the sine wave, because it is the negative half cycles of the sine wave which trip the blocking oscillator 154.

1 kc. gate source

The 1 kc. gate source 34 (Fig. 6A) includes an Eccles-Jordan trigger circuit having tubes 163 and 164 and two cathode follower tubes 168 and 172 (see Fig. 6A). Although the 1 kc. gate source 34 receives an input from the cycle starter 177 once each second to assure the proper starting condition of the gate source at the beginning of each cycle of the system operation, the regular operation of the gate source 34 during a cycle of the system is effected by the trigger pulses supplied by the 1 kc. trigger source 33. Since the latter operation of the gate source by trigger pulses is the basic operation upon which the cycle control is superimposed for checking reasons, such operation will first be considered.

Basically the tubes 163 and 164 are connected to form an Eccles-Jordan trigger circuit as described in a paper entitled "Dual-Triode Trigger Circuits" by Byron E. Phelps, published in the magazine "Electronics" for July 1945, on page 110. In addition, both tubes 163 and 164 have their cathodes connected to ground through the common resistor 165, which provides a convenient input point since condensers 166 and 167 make possible the circuit's operation to its opposite condition regardless of the past condition and even though the input pulses are applied to both tubes.

Let us assume that tube 164 is conducting and tube 163 is not conducting. Under this condition, plate load resistor 169 is not carrying a tube load current but is merely supplying a relatively high potential to the voltage dividing resistors associated with the grid of tube 164. This normal network potential on the grid of tube 164 is sufficiently positive with respect to ground to maintain that tube 164 conductive, but such positive potential causes a grid current to flow so that the actual grid potential is only slightly positive with respect to the cathode. Also, the condenser 167 is charged to this relatively high potential that exists between the plate of tube 163 and the grid of tube 164.

At the same time, the load resistor of tube 164 is carrying a tube load current so that it supplies a relatively low potential to the voltage dividing resistors associated with the grid of tube 163. Thus, a network potential is applied to the grid of tube 163 of a value to make it sufficiently negative with respect to ground that it is below cutoff with respect to the cathode. For this reason, tube 163 is nonconducting and the condenser 166 is charged only to a relatively low potential.

When a positive trigger pulse is applied to the common cathode resistor 165, both cathodes are made more positive relative to ground which in effect makes the grids negative relative to their respective cathodes. This trigger pulse is of sufficient amplitude to cause the grid-cathode voltage of tube 164 to fall to a negative value below cutoff; but, since the grid-cathode voltage of tube 163 was already below a negative cutoff value, such negative value is merely increased by the input pulse. Thus, both tubes 163 and 164 are rendered nonconductive by this input pulse.

The resulting cessation of load current through tube 164 reduces the voltage drop across its plate load resistor so that a correspondingly raised positive potential is applied to the grid of tube 163. This makes the grid of tube 163 positive relative to ground but its particular potential level with respect to its cathode is also dependent upon the actual value of the input pulse. Preferably, the amplitude of the input pulse is of such a value, that the net grid-cathode potential is above cutoff. This means that the tube 163 is immediately rendered conductive upon the cessation of conduction by tube 164 in spite of the continued existence of the input pulse. The conduction of this tube 163 causes a voltage drop across its load resistor 169 which reduces the network potential on the grid of tube 164 to a value below cutoff even though its cathode approaches ground when the input trigger pulse has completely decayed. Such operation is highly desirable, since the control of the circuit is effected in response to the abrupt leading edge of the input trigger pulse, thus rendering the timing very accurate.

The positive rise of potential on the grid of tube 163 is much higher than the normal grid network level because of the uncharged condition of the condenser 166. The input pulse should be of a value sufficient to reduce the grid-cathode voltage of the conducting tube below its cutoff value in opposition to the normal network potential, while at the same time being of a value less than the voltage rise at the plate of the conducting tube when that tube becomes nonconductive.

Each positive input pulse causes the trigger circuit combination to flip-flop from the condition assumed to its opposite condition in a manner described above. Thus, a succession of input trigger pulses causes the trigger circuit to be operated to its opposite conditions alternately.

The time constant for each of the R-C combinations including condensers 166 and 167 is relatively long compared to the duration of the very short trigger pulses applied from the 1 kc. trigger source 33, but this time constant is much shorter than the period between successive trigger pulses so that the circuit can be repeatedly operated as above described.

Since the blocking oscillator gives an output pulse for each cycle of the 1 kc. sine wave, and since these pulses are used to actuate the dual-triode trigger circuit comprising tubes 163 and 164, the state of conduction of these tubes is changed each millisecond. Thus, the plate of each of the tubes 163 and 164 is alternately raised and lowered in potential on succeeding millisecond periods of the cycle. The rectangularly shaped gates which thus appear on the plates of these tubes 163 and 164 are then applied through resistors 173 and 174 respectively to the grids of the cathode followers 172 and 168.

The voltage appearing on the grid of each of the cathode follower tubes 168 and 172 depends upon the potentials existing across the different portions of their respective grid networks. For example, the network for the grid of tube 172 includes resistors 169, 173, and 171 connected in series between (+) and (—). When tube 163 is nonconductive, this network provides the grid of tube 172 with a potential that renders tube 172 conductive; but, when the resistor 169 is carrying a tube load current as it does during the conduction of tube 163, the network then provides the grid of tube 172 with a negative potential that renders the tube nonconductive. In this way, the outputs of these tubes 166 and 172 can be controlled by the tubes 164 and 163 respectively.

For example, when the tube 163 is conducting, the current flow through its load resistor 169 causes the voltage appearing at its plate to be relatively lower, which in turn lowers the voltage appearing on the grid of tube 172 to the cutoff level of that tube. Thus, there is no voltage drop across the cathode resistor 170, and the bus 176 is, therefore, at ground potential. However, during the next millisecond period of the cycle when tube 163 is nonconducting, its plate potential suddenly rises and this rise in potential is applied to the grid of the cathode follower tube 172 to render it conductive. This raises the voltage at the cathode of tube 172 to some suitable positive value which is applied to the bus 176.

In this way, the buses 175 and 176 are alternately made positive on successive millisecond periods of the system's cycle. This has been shown in Fig. 7A by designating such pulses by the names of the devices which they control. Specifically, the voltage appearing on bus 175 is designated in Fig. 7A by the legend "Even Control Stepper Pulses;" and the voltage appearing on the bus 176 is designated by the legend "Odd Control Stepper Pulses." Tracing these buses 175 and 176 to Fig. 6C will show that they control the even and the odd steps of the control stepper 105 respectively.

*Cycle starter*

The cycle starter 177 (Fig. 6C) is provided to condition certain apparatus at the control office at the beginning of each new cycle of the system to assure the proper conditions for such new cycle in spite of a possible lack of synchronism that may have developed at the beginning of the cycle. The apparatus of this cycle starter 177 includes a free-running multivibrator comprising tubes 178 and 179, a peaker tube 180, two cathode followers 182 and 195, and an Eccles-Jordan flip-flop circuit comprising tubes 192 and 193 which circuit is of the type requiring two independent inputs in order to operate it to its opposite positions.

The free-running multivibrator may be of any suitable type, but for the purposes of this disclosure it is assumed to be of the unsymmetrical type such as described on page 362 of the book entitled "Theory and Application of Electron Tubes" by Reich, and published in 1944 by the McGraw-Hill Book Company. Briefly, a free-running multivibrator periodically produces an output pulse of rectangular shape, the rate of pulse recurrence and the pulse width depending on the circuit constants. The multivibrator shown here preferably produces a rectangular output pulse once each second. The circuit constants of this unbalanced multivibrator are chosen to be of such a value that tube 178 is nonconducting most of the time but becomes conducting during a relatively short portion of each second. Thus, the voltage supplied from tube 178 through condenser 183 to the control grid of tube 180 is normally at a high level but decreases abruptly once each second following which the multivibrator is again switched back to its normal state.

The output of the multivibrator is taken from the plate of its tube 178 and is applied through coupling condenser 183 to the grid of a peaker 180. The grid of this peaker tube is connected through a resistor 181 to (+), which tends to maintain the grid at a positive potential, but because of the grid current flow, a potential drop is produced in the resistor 181 so that the grid maintains itself at substantially cathode potential. When the output of the multivibrator abruptly drops in potential, as it does once each second, the grid-cathode voltage of tube 180 is driven negatively. This interrupts the conduction of the peaker tube 180 thereby raising its plate potential and causing a positive output pulse to be supplied to the grid of the cathode follower tube 182. However, when the multivibrator output abruptly goes positive, a corresponding increase of potential tends to appear on the grid of tube 180, but since any voltage increase results in added grid current, the grid-cathode voltage actually maintains substantially the same so that the output of the peaker tube is not appreciably affected by such a positive input pulse.

The time constant of resistor 181 and condenser 183 is relatively short in order that the condenser 183 can quickly discharge when the multivibrator output drops and rapidly restores the peaker grid potential to its original value. This quick discharge causes the pulse on the peaker grid to be relatively narrow so that the output of the peaker will appear as a relatively sharp, positive pulse.

The cathode follower tube 182 is normally biased negatively to cutoff during the conduction of current through the tube 180 and its plate load resistor. Thus, the application of the positive pulse that appears on the plate of peaker tube 180 to the grid of the cathode follower 182 results in the abrupt and brief conduction of this cathode follower. During the brief conduction period of the cathode follower 182, a positive trigger pulse thus appears across the cathode resistor 184 to give a trigger pulse on bus 657. This trigger pulse occurs once each second and for this reason is termed the one second trigger in Fig. 7A.

The cycle starter 177 includes the Eccles-Jordan type trigger circuit having tubes 192 and 193. This trigger circuit is similar to the one included in the 1 kc. gate source 34 except that there are no plate-grid condensers. Thus, this trigger circuit cannot be alternately actuated to its opposite conditions in response to a single control voltage input of one polarity. Instead, distinctive control voltages must be applied to operate the trigger circuit to its respective opposite conditions. One of these control voltages consists of positive pulses occurring once each second and applied to the control grid of tube 192 from cathode follower tube 182. The other control voltage is applied to the cathode of tube 193 from the cathode follower tube 195.

The cathode follower 195 is biased negatively to cutoff by the grid resistor network and the voltage obtained by the connection over bus 603 to the grid of tube 172 in Fig. 6A when the load resistor 169 of tube 163 of the 1 kc. gate source 34 is carrying a tube load current. But when tube 163 is nonconductive and its plate is at a relatively high potential, the grid of tube 195 is rendered conductive to give a positive output pulse across resistor 194. This control voltage for tube 195 is obtained from the 1 kc. gate source 34 over bus 603. Since the dual-triode trigger circuit of the 1 kc. gate source 34 is shifted from one of its stable conditions to the other each millisecond of the system's cycle, the output pulse during alternate millisecond periods. cathode follower 195 gives a positive rectangular These output pulses are applied to the cathode of tube 193 of the trigger circuit comprising tubes 192 and 193 and maintain tube 193 in a normally nonconducting condition. Thus, during each cycle of operation, this trigger circuit is normally in the condition wherein tube 193 is nonconducting and tube 192 is conducting.

The positive pulse that appears on the plate of peaker tube 180 causes a positive pulse to appear across the cathode resistor 184 of cathode follower tube 182 which is applied to bus 657 as above mentioned. This positive pulse is applied through an R-C differentiating combination including resistor 185 and condenser 186 to the control grid of tube 164 of the dual-triode trigger circuit included within the 1 kc. gate source. The operation of this trigger circuit (tubes 163 and 164) is normally independent of the cycle starter 177 so that, upon the occurrence of a positive pulse on bus 657, the trigger circuit may be in either of its two stable conditions.

Let us first assume that the 1 second trigger occurs while the tube 164 is conducting. This is the condition indicated in the waveform diagram of Fig. 7A, because the conduction of tube 164 causes the high plate potential of tube 163 to be applied to the grid of cathode follower tube 172 rendering it conductive, which in turn applies a positive potential to bus 176 as shown in Fig. 7A. Thus, the positive rise in potential which occurs on the grid of tube 164 in response to the application of this one-second trigger over bus 657 has no effect on tube 164. However, this one-second trigger, although appearing as a sharply peaked pulse in the waveform diagram, is of relatively long duration as compared to the time constant of the R-C differentiating circuit including resistor 185 and condenser 186. Consequently, the leading edge of the one-second trigger causes condenser 186 to become substantially fully charged so that, upon the decay of this one-second trigger, the drop in voltage of the pulse causes a corresponding drop in grid potential of tube 164. For this reason, the grid of tube 164 is driven below cutoff and a switching action takes place which makes this tube 164 nonconducting and tube 163 conducting. In this way, the one-second trigger pulse ensures that tube 164 will not be conducting. Therefore, the next positive pulse which appears across the common cathode resistor 165 as supplied by the 1 kc. trigger source will again switch this trigger circuit and make the tube 164 conducting. This condition is shown in Fig. 7A where the next occurrence of a 1 kc. trigger across resistor 165 at time T1 causes tube 164 to conduct and tube 163 to be cut off. The plate potential of tube 163 is thereby raised, causing a high potential to appear on the grid of tube 172 and thus on bus 176. At the same time, tube 164 is made conductive and the lowering of its plate potential causes tube 168 to be cut off, which results in a zero voltage on bus 175. The rectangularly shaped gates occurring on buses 175 and 176 then continues as before, but now they are properly synchronized with respect to the occurrence of the one-second trigger, as will presently be seen.

The 1 second trigger output of cathode follower tube 182 is also applied through an R-C differentiating combination including resistor 190 and condenser 191, to the grid of the tube 192 which, with tube 193, is included in a dual-triode trigger circuit. As above described, this trigger circuit is normally in the condition in which tube 192 is conducting and tube 193 is nonconducting. Thus, the application of a positive voltage on the grid of tube 192 produced by the leading edge of the 1 second trigger pulse in passing through the R-C differentiating combination cannot cause a reversal of conduction of tubes 192 and 193. However, since the time constant of condenser 191 in combination with the resistance of the circuit is short as compared to the width of this 1 second trigger pulse, condenser 191 becomes charged substantially to the peak of this trigger pulse. Since it is a relatively high voltage to which condenser 191 is now charged, the decay of the 1 second trigger pulse allows this condenser to discharge which causes a negative voltage at the grid of tube 192 to drive it below cutoff, thereby initiating a switching of the conduction of tubes 192 and 193. This switching action is possible at this time because, as has been explained, the positive trigger applied to tube 192 is also applied to tube 164 resulting in tube 163 becoming conductive. Thus, the cathode of tube 193 is restored to ground potential to permit a switching action of this trigger circuit in response to the pulse supplied from tube 182. When tube 192 becomes nonconductive, its plate rises to a relatively high potential and initiates the cycle starter pulse on bus 189 (see Fig. 7A).

Thus, the occurrence of the 1 second trigger pulse has caused the tubes 163 and 193 to be conducting in readiness for the next trigger pulse from the 1 kc. trigger source 33. When such next 1 kc. trigger pulse is applied to common cathode resistor 165 of the 1 kc. gate source, tube 163 is rendered nonconductive. A positive pulse is repeated through tube 195 to the cathode of tube 193 to render it nonconductive and to render tube 192 conductive. This terminates the output pulse on bus 189 as indicated at time T1 in Fig. 7A, because the plate of tube 192 drops in potential.

It will be observed that the length of the cycle starter pulse on bus 189 is dependent upon the particular point at which the 1 second trigger pulse occurs. If the 1 second trigger pulse is delayed as compared to the one shown in Fig. 7A, the starter pulse is shorter. If it should be so delayed as to occur exactly during a 1 kc. trigger pulse, no starter pulse would be formed. In this latter case, the system would then remain idle until another second had passed, at which time the 1 second trigger pulse would be out of step with the 1 kc. trigger pulse due to the inherent drift time difference between the 1 kc. sine wave source 145 and the cycle starter multivibrator timer including tubes 178 and 179.

Let us assume that the 1 second trigger pulse is further delayed so as to occur durying the conduction of tube 163 instead of while tube 164 is conducting as has just been described. The operation in this case is similar to the above described operation but is simplified to some extent for reasons which will be presently discussed.

The differentiating combination including condenser 186 causes the 1 second trigger pulse on bus 657 to give both a positive and a negative pulse on the grid of tube 164, but the positive pulse is of insufficient amplitude to render the tube conductive because the negative bias of the tube 164 is so great. Since under the condition now assumed, the tube 164 is nonconductive, the negative pulse can do nothing to this trigger circuit. Thus, this trigger circuit maintains the originally assumed condition. However, the 1 second trigger pulse is differentiated and the negative component is applied to tube 192 rendering it nonconductive. The tubes 163 and 193 now stand in the same condition as previously described and as indicated in Fig. 7A, so that the occurrence of the next 1 kc. trigger pulses causes the conduction of both tubes 164 and 192 terminating the cycle starter pulse on bus 189. The 1 kc. trigger pulses now successively operate the 1 kc. gate source to place rectangular pulses on buses 175 and 176, each of 1 millisecond duration as indicated in Fig. 7A and previously described.

The cycle starter 177 is thus responsive to the one second trigger to produce the leading edge of a cycle starter pulse. This pulse is terminated at the time of occurrence of the very next 1 kc. trigger. Also, the normally independently operating 1 kc. gate source is synchronized to the occurrence of the 1 second trigger in such a manner that the next 1 kc. trigger causes it to place a high potential on bus 176 and a low potential on bus 175.

Synch and station-call pulse source

The synch and station-call pulses indicated in Fig. 7A for bus 113 are produced by the synch and station-call pulse source 35 (Fig. 6B) as a result of the cycle starter pulse on bus 189 and station step pulses on bus 658. This synch and station-call pulse source 35 includes a double input dual-triode trigger circuit with grid pulsing on tube 200 and cathode pulsing on tube 213 to effect the flip-flop operation. The general operation of this type of trigger circuit has been described above. In addition, this unit 35 also includes two diodes 197 and 231, each provided with an input resistor in its cathode circuit. These diodes serve two purposes; (1) to select the negative pulse of their respective differentiating combination including condensers 196 and 230, and (2) to isolate the bus 189 from the bus 658 even though they both supply the grid of the same tube 200 with input pulses.

Throughout the system's cycle, positive pulses are applied every other millisecond from bus 175 to the cathode of tube 213 so that it is rendered nonconductive and the associated tube 200 conductive. This stable condition of the dual-triode trigger circuit is maintained except at the occurrence of the cycle starter pulse at the beginning of each cycle and during each station pulse occurring on the last or ninth step of the control stepper 105. More specifically, when the trailing edge of the cycle starter pulse on bus 189 causes a negative pulse to be applied to the cathode of tube 197 by reason of the differentiating combination including condenser 196, the grid of tube 200 is made negative below cutoff to render it nonconductive and in turn the tube 213 conductive. It is noted by reference to Fig. 7A that the trailing edge of the cycle starter pulse occurs at the time that bus 175 returns to ground potential thus making it possible for this switching operation of the trigger circuit to occur since the cathode of tube 213 is not held above ground potential. Also, the positive pulse due to the leading edge of the cycle starter pulse on bus 189 cannot affect this trigger circuit because tube 200 is conductive at that time.

The cessation of conduction by tube 200 causes a relatively high potential to be applied to bus 113 to mark the beginning of the synch pulse period. This pulse period is maintained for only 1 millisecond because the next positive pulse on bus 175 at the time T2, indicated in Fig. 7A, is applied to the cathode of tube 213 and acts to switch the trigger circuit back to its other condition. In this way the synch pulse is applied to bus 113 for only one millisecond.

As later explained, a rectangular, positive station step pulse is applied to bus 658 for each tenth millisecond period following the cycle starter pulse on bus 189. These station step pulses, indicated in Fig. 7A, are applied to bus 658 through condenser 230 and resistor 252 during the operation of each ninth step of the control stepper 105. This differentiating combination acts in response to the leading edge of each station step pulse on bus 658 to apply a positive pulse to the cathode of tube 231, but this positive pulse does nothing because diode 231 cannot conduct with the resulting negative plate-cathode voltage. The negative pulse caused by the trailing edge of the station step pulse, causes the grid of tube 200 to go negative below cutoff, thereby rendering this tube nonconductive and the tube 213 conductive. The rise in plate potential of tube 200 is applied to bus 113 and is terminated as soon as the next gate pulse is applied to the bus 175 at the beginning of the next millisecond period, because the next pulse on this bus 175 causes this dual-triode trigger circuit to switch back to its opposite position. Thus, the positive station-call pulses applied to bus 113 are just one millisecond long and occur at the end of each tenth consecutive pulse on bus 175.

Station gate driver

According to the above description, control stepping pulses appear alternately on buses 175 and 176 and for every tenth such pulse, a station-call pulse is applied to the bus 113. These station-call pulses in combination with the synch pulse also appearing on bus 113 are effective to produce the required stepping operation of the station gate stepper 106. However, to operate such a station gate stepper, improved operation results by having the successive stepping pulses for the stepper appear alternately on two separate buses, such as buses 211 and 212, as will later be described. Some means must be provided to ensure that these buses are energized in the proper order with respect to the starting time of each cycle so that the station gate stepper is properly actuated.

In view of these considerations, a station gate driver 37 (Fig. 6B) is provided which includes a peaker tube 215, a cathode follower tube 225, a dual-triode trigger circuit having tubes 199 and 204, and two cathode follower tubes 207 and 208 associated with the trigger tubes respectively. This station gate driver 37 is responsive to the pulses placed on bus 113 to cause operation of the trigger circuit in such a way as to impress corresponding pulses alternately on the station stepping buses 211 and 212. These stepping pulses then cause the step-by-step operation of the station gate stepper 106. To ensure that these steps are taken in the right order, the cycle starter pulse on bus 189 is applied to the dual-triode trigger circuit (tubes 199 and 204) at the beginning of each cycle to operate it to a particular condition before the cycle is initiated.

More specifically, with an even number of stations, the dual-triode trigger circuit of the station gate driver 37 is left at the end of a cycle so that tube 199 is conducting and tube 204 is nonconducting. In this way, the leading edge of the cycle starter pulse on bus 189 applied through condenser 198 and resistor 270 causes a positive pulse to be applied to the grid of tube 199, which positive pulse can do nothing since this tube 199 is already conducting. But the negative pulse applied to the grid of this tube 199 at the trailing edge of the cycle starter pulse on bus 189 renders it nonconductive and the tube 204 conductive. This is the condition that should exist at the beginning of each cycle of operation in readiness for response to the next gate pulse applied to bus 113.

On the other hand, if the tube 199 should not be conducting, due either to an odd number of stations or to the occurence of some extraneous condition, the positive pulse applied to the grid of this tube 199 for the leading edge of the cycle starting pulse will have substantially no effect on this tube, such positive pulse not being of sufficient amplitude to overcome the greater-than-cutoff voltage applied to this tube. The negative pulse occurring at the trailing edge of the cycle starter pulse also cannot affect the relative conduction of tubes 199 and 204 since such negative pulse will only cause the grid-cathode voltage of tube 199 to become more negative. Thus, the application of the cycle starter pulse to this station gate driver merely ensures that tube 199 is nonconductive and tube 204 conductive at the end of the cycle starter pulse.

Referring to Fig. 6B it will be noted that the plates of both of the tubes 199 and 204 are connected through resistors 205 and 206 to the control grids of the cathode follower tubes 207 and 208, respectively. The grid network for each of these cathode follower tubes is so connected to the grid bias voltage and to the plate supply voltage through resistors of proper value that it is biased to or below cutoff when the corresponding tube of the trigger circuit is conducting; but when such tube of the trigger circuit is nonconducting, then the voltage applied to the cathode follower control grid is increased so that the tube is rendered conductive. When either of these cathode follower tubes 207 or 208 is rendered conductive, the potential across its associated cathode load resistor is caused to rise.

For example, the tube 199 is assumed to be conductive during the rest period at the end of a cycle so that the tube 207 is nonconductive and the voltage across resistor 187 is zero. However, when the tube 199 is rendered nonconductive by the cycle starter pulse, the tube 207 becomes conductive and the voltage across resistor 187 rises to an operative value. Thus, during the rest period, the bus 211 is at ground potential and the bus 212 is at some positive potential, as indicated in Fig. 7A for the respective buses. If, however, tube 199 is nonconductive during the rest period, bus 212 will be at ground and bus 211 at a positive voltage. This condition will then be reversed by the occurence of the cycle starter pulse as described.

Assuming that the dual-triode trigger circuit of the station gate driver 37 has been conditioned by the cycle starter pulse on bus 189, then the next pulse on bus 113 causes a switching operation of the trigger circuit. More specifically, the positive synch pulse is applied through condenser 214 to the control grid of the peaker tube 215. Thus, the leading edge of this pulse tends to produce a positive pulse on the control grid which is not effective to do anything to the tube 215 since the control grid is already slightly positive due to the positive voltage supplied to it through resistor 216. But the negative pulse applied to the control grid of tube 215 upon the occurrence of a trailing edge of the gate pulse on bus 113 causes the tube 215 to be abruptly and only momentarily driven below cutoff. This causes an abrupt positive pulse to be applied to the control grid of the cathode follower tube 225. A positive pulse appears across its cathode load resistor which is in turn applied across the cathode resistor 226 of the dual-triode trigger circuit. This positive pulse renders both tubes 199 and 204 momentarily nonconductive and causes the conduction conditions to switch so that the tube 199 is now conducting and the tube 204 is nonconducting. This operation of the trigger circuit is the same as described in connection with the similar trigger circuit discussed in connection with the 1 kc. gate source 34.

This switching operation of the trigger circuit causes the bus 211 to return to ground potential and a positive potential to be applied to bus 212 as indicated for these respective buses in the waveform diagram of Fig. 7A at time T2. The switching operation occurs in response to the trailing edge of the synch pulse; and as described in connection with its synch and station-call pulse source 35, the trailing edge of the synch pulse occurs one millisecond following the trailing edge of the cycle starter pulse. This condition of the trigger circuit is maintained until the next successive pulse appears on the bus 113 10 milliseconds later at time T7.

Electronic steppers

Several electronic stepping circuit organizations are employed in the system of this invention. Figs. 3A and 3B show that the control office apparatus includes a control stepper 105, a station gate stepper 106, and two indication steppers 107 and 108. Also, Fig. 4 illustrates a typical field station as including a control and indication stepper 109, and a station counter 110. These various steppers or counters are basically made up of a plurality of dual-triode trigger circuits generally known as Eccles-Jordan circuits. However, each such stepper is organized in accordance with the conditions required of the related components of the system, and for this reason the detailed connection for each stepper may be dependent upon its purpose or relation to the other components.

For example, the station gate stepper 106 has its interstep control provided by plate to grid coupling with the step-by-step actuation being effected by grid connections. The output of this stepper is provided across common cathode resistors for the odd and even steps. The control stepper 105 is similar but employs cathode connections for the step-by-step control, and the output connections are made individually to the plate load resistors.

The station counter 110 at a field station (Fig. 9B) is of the binary counting type, i. e., each successive step only takes half as many operations as its preceding step. For this reason, the number of combinations obtainable with a given number of steps is equal to two raised to the power of that number of steps. Such an organization requires characteristic connections.

In view of the similarities of the various stepping circuits, any one common characteristic feature will only be described in detail in connection with the first stepper considered; but because of the different control conditions characteristic of the several steppers, each will be considered separately with respect to those different control conditions.

*Control stepper*

Figs. 6C and 6D show that the control stepper 105 includes nine steps, each respectively designated by its proper step number. Each step comprises a dual-triode trigger circuit essentially an Eccles-Jordan circuit. For example, Step No. 1 includes two tubes 659 and 660. Each of these tubes is provided with a plate load resistor, such as resistors 115 and 118, together with cross-connecting grid resistors 116 and 119. The load resistors 115 and 118 are connected to the suitable source of plate supply energy indicated as (+). Resistors 117 and 120 are connected to the negative terminal (—) of the source of grid bias.

The voltage divider formed by resistors 115, 116, and 117 places a certain portion of the voltage between the plus terminal (+) of the plate source and the negative terminal (—) of the grid bias source on the control grid of the tube 660. The circuit constants are so chosen that this potential at the grid of tube 660 is above the cutoff value of the tube when there is no tube load current through resistor 115 for tube 659. On the other hand, when the tube 659 is conducting plate current through resistor 115, the circuit constants are of such values that the potential at the control grid of 660 is below its negative cutoff value.

Consideration of the grid voltage dividing network for tube 659 shows that the resistors 118, 119, and 120 are connected between the (+) terminal of the plate source and the (—) terminal of the grid bias source, the same as for the tube 660. The circuit constants are chosen to be identical with those for the grid network of tube 660.

Consequently, this organization is such that one tube must be conducting and the other must be nonconducting. Thus, this trigger circuit organization has two stable conditions: (1) tube 659 conducting and tube 660 nonconducting, or (2) tube 660 conducting and tube 659 nonconducting. In this particular stepping circuit, the left-hand tube of each step normally conducts, and this has for convenience been designated as an A tube. It then follows that the right-hand tube of each step is nonconducting, and this has been designated as a B tube.

The cathode of the A tube of each step is connected directly to ground; whereas, the cathode of the B tube of each odd-numbered step is connected to the bus 176, and the cathode of the B tube of each even-numbered step is connected to the bus 175. These buses 175 and 176 are connected to the cathodes of the cathode follower tubes 168 and 172, respectively. Thus, the cathodes of these tubes may be considered to be at ground potential except when the corresponding cathode follower tube is conducting.

Although one or the other of the cathode follower tubes 168 and 172 is always conducting so that either bus 175 and 176 is made positive with respect to ground potential, no operation of the control stepper occurs with the various steps in the normal condition just described. This reason is that the presence of a positive pulse on either bus can only render the associated cathodes of the B tubes more positive which in effect renders the control grids more negative with respect to their cathodes. But since the B tubes are already nonconducting with their control grids biased negatively below cutoff, no action can result from their respective cathodes being made positive with respect to ground potential.

Each step of the control stepper 105 includes an input condenser and resistor, such as condenser 121 and resistor 122 for the step No. 1. The input for the step No. 1 is supplied over the bus 248 and is applied to the control grid of the A tube of this step, i. e., tube 659. However, each of the other steps receives its input from the preceding step by having its coupling condenser connected to the plate of the A tube of such preceding step. For example, step No. 2 is coupled to step No. 1 through the condenser 123. These various coupling condensers and resistors have such values as to be able to differentiate the input pulses, i. e., a potential swing of opposite polarity is placed on the control grid for the leading and trailing edges of the input pulse. If the control pulse is positive, the differentiating condenser provides a positive pulse to the control grid for the leading edge of the control pulse and provides a negative pulse to the control grid for the trailing edge of such input pulse. If the control pulse is negative instead of positive, the polarity of the pulses applied to the control grid for the leading and trailing edges is reversed from that just given for a positive control pulse.

The control pulses placed on the bus 248 are negative in character so that the leading edge of such a pulse causes the negative swing of the control grid of tube 659 to render it non-conductive. This cutting off of plate current causes the potential on the plate of tube 659 to rise to a value which renders the tube 660 conductive. Thus, the opposite stable condition of these tubes 659 and 660 is established. The rendering conductive of the tube 660 places such a negative bias on the grid of tube A that not only is it rendered nonconductive, but the trailing edge of the negative control pulse on bus 248 fails to produce a positive pulse of sufficient value to overcome this bias on tube 659 so that it remains nonconductive.

The raising of the potential on the plate of tube 659 causes a positive pulse to be supplied through condenser 123 to the control grid of the tube A of step No. 2, but this positive pulse can do nothing because this tube is already conducting.

Let us assume that the bus 175 is positive and the bus 176 is at ground potential when the negative pulse was applied to bus 248 and that after a suitable time interval following the control pulse on bus 248, this condition of the buses 175 and 176 is reversed. The making positive of the bus 176 causes the tube 660 of step No. 1 to become nonconductive which then renders the tube 659 conductive, thereby restoring this step No. 1 to its original condition. The lowering of the plate potential of tube 659 results in the application of a negative pulse to the control grid of the tube A of step No. 2, which renders that tube nonconductive and its associated B tube conductive. This reversal of conduction can take place because the bus 175 is now at ground potential. When the condition of potential on the buses 175 and 176 is again reversed, the tube B of step No. 2 is restored to its nonconducting condition and the associated tube A is rendered conductive.

This causes a negative pulse to be passed to step No. 3. It can thus be seen that the successive step-by-step operation of the stepper will take place upon the reversal of the conditions of energization of these two buses 175 and 176, providing the stepping operation has been initiated by the application of a negative control pulse on the bus 248. When this step-by-step operation has continued to step No. 9 and that step is restored, the stepper will not again operate until another initiating pulse is placed on bus 248 followed by the same step-by-step switching operation of the positive energy on the buses 175 and 176.

Since the buses 175 and 176 are controlled by cathode follower 168 and 172 which in turn are controlled by the trigger tubes 164 and 163 both of which may be nonconductive for a very brief interval during their switching operation, it may happen that both buses 175 and 176 will be positive for that brief interval of time. Such an overlap of control conditions makes it desirable to so select the value of each coupling condenser, such as condenser 123, that its output to the grid of the next step will have a duration longer than said brief interval of overlap. This arrangement ensures the positive step-by-step operation of the stepper as the buses 211 and 212 are alternately made positive with respect to ground.

Each step of the control stepper 105 provides an output to a cathode follower of the group of cathode followers 353 of Fig. 6E. Each of these cathode follower tubes is normally biased negatively to cutoff, but when its control grid is supplied with a positive pulse, that cathode follower becomes conductive and supplies a positive output across its cathode load resistor. For example, when tube 659 of step No. 1 of the control stepper 105 is conducting, the grid network for the associated cathode follower is such that the control grid of that cathode follower is at cutoff; but when the tube 659 is nonconducting, the potential on the grid of the cathode follower is raised sufficiently above cutoff that it supplies an output pulse on the bus 255. As shown, only the steps one through five of the control stepper are shown as having cathode followers 353 for reasons later to be explained.

*Station gate stepper*

The station gate stepper 106 shown in Fig. 6D includes a number of steps beginning with a pre-set step, a step No. 0, a step No. 1, and so on, until a check step for the last of the series is reached. As shown, only steps Nos. 1, 2, and 3 for station numbers 1, 2, and 3 have been shown, but if the complete number of steps were shown for the assumed system of ninety-six stations, then ninety-six such steps would be employed.

Each of the various steps of this station gate stepper 106 includes the same trigger circuit as described above in connection with the control stepper 105. Also, this stepper has the same interconnections between the various steps as described in connection with the control stepper. Moreover, after the initial input pulse is supplied over the bus 189 to pre-set step, the step-by-step action is effected by the reversal of energy on the two buses 211 and 212 in a similar manner as described for the control stepper 105, but with this stepper the restoring control is supplied to the grid of the A tubes of the stepper.

Let us assume that the bus 211 is at some operative positive potential above ground by reason of the conduction of cathode follower 207 of the station gate driver 37; whereas, the potential of the bus 212 at such a time is at ground potential by reason of the nonconduction of the cathode follower 208 of such station gate driver 37. This positive potential on the bus 211 can do nothing to the A tubes of the even-numbered steps since they are already conducting. As the cycle starter pulse is applied to the bus 189, a negative pulse is applied at its trailing edge to the control grid of tube 203 of the pre-set step. Since bus 212 is at ground potential at this time, this negative pulse makes the A tube of this step nonconductive and its associated B tube conductive. This condition persists until the switching action of the potential on the buses 211 and 212. The placing of a positive potential on the bus 212 raises the grid of the tube 203 above its cutoff value so that it is again rendered conductive and the tube B conductive. The dropping of the potential at the plate of tube 203 causes a negative pulse to be placed on the grid of tube 220 on the step No. 0 to render it nonconductive which can now occur since the bus 211 is at ground potential. However, these oscillations take place very rapidly and the negative pulse on the grid of tube 220 should, therefore, have sufficient duration to allow the switching action on buses 212 and 211 to be stabilized.

Upon the next switching of the potential on buses 211 and 212, the making positive of bus 211 makes the tube 220 of step No. 0 conductive and thus causes a negative pulse to be applied to the grid of tube 234 of the step No. 1. In this way, the switching action of the buses 211 and 212 causes the step-by-step operation of the station gate stepper 106 in a manner analogous to that for the control stepper 105 except that the step pulses are alternately applied to the grids of the A tubes of the stepper; whereas, for the control stepper 105 the stepping pulses are applied to the cathodes of the B tubes.

Each A tube of the station gate stepper 106 has its cathode connected to ground. The cathode of the B tube of each odd-numbered step is connected to ground through a common resistor 245 included in the control stepper starter 38, and similarly, the cathode of the B tube of each even-numbered step is connected to ground through the common resistor 240 included in the control stepper starter 38. All the steps of this stepper are so connected except the pre-set step which has no output other than to pass-on the step control to the step No. 0 and this step, therefore, has the cathode of its tube 217 directly connected to ground.

The purpose of the control stepper starter 38 is to provide an output pulse for each step taken by the station gate stepper. This output pulse is then applied over bus 248 to the input of step No. 1 of the control stepper 105 and conditions this first step of the control stepper so that it can respond to the changing potentials on bus 175 and bus 176 and so advance step-by-step throughout its various steps during each station period. The control stepper starter 38 comprises two tubes 241, and 246, each biased to cutoff by a voltage dividing network including resistors 253 and 103 connected between (−) and ground.

As each step of the station gate stepper is actuated with its B tube becoming conductive, the plate-cathode current of such conducting B tube produces a voltage drop across either resistor 240 or resistor 245 depending upon whether the step then actuated is for an even-numbered or odd-numbered station respectively. The sudden increase in potential across such cathode resistor 240 or 245 provides a sudden increase of the grid voltage for the corresponding tube 241 or 246. The quick charging of condenser 242 included in an R–C differentiating combination provides a sharp, positive pulse on the grid of the respective tube thereby momentarily increasing the plate current of such tube.

Assume, for example, that in response to the changing of potentials on buses 211 and 212, the step No. 1 is restored to its normal condition with its A tube conducting and that step No. 2 is then actuated by having its B tube conduct while its A tube is cut off. As the B tube of step No. 1 is cut off, the cessation of current through resistor 245 in the plate-cathode circuit of this B tube 239 causes the voltage across this resistor 245 to drop thereby placing a negative pulse on the grid of tube 246. This negative pulse cannot affect the conduction of tube 246 as it is biased to cut off. The initiation of conduction of the B tube of step No. 2 at this time causes a voltage increase across the resistor 240 to place a positive pulse on the grid of tube 241. This positive pulse increases the plate current through resistor 247 so that the voltage at the plates of tubes 241 and 246 abruptly decreases, thereby providing a negative pulse on the bus 248. In a similar manner, each advance in a step of the station gate stepper 106 causes a negative pulse to appear on bus 248 and be applied to the input of step No. 1 of the control stepper 105. Thus, the control stepper 105 and the station gate stepper 106 may be said to be interlocked in that the operation of the control stepper cannot be initiated until a step has been taken by the station gate stepper, and this latter stepper cannot advance a step until the last step of the control stepper is restored to normal, thereby signifying that the control stepper has successfully completed its stepping operation. As will later be seen, this feature, in conjunction with the check step of the station gate stepper to be described, quickly provides an indication of erroneous operation in the event that either the station gate stepper or control stepper do not perform properly.

*Control levers and switch diodes*

In this embodiment of the invention, the control of a field station device to one of its conditions is effected by including in the control code for that field station a single character, a mark, on a corresponding one of several designated pulse periods. By way of example, the first and second control pulse periods may be assigned to the control of a switch machine at a field station: the transmission of a mark on the first such control pulse period is then effective to operate the switch points to the normal position, while the occurrence of a mark on the second pulse period causes operation of the switch points to the reverse position.

As explained in connection with the description of operation of the control stepper 105 and the associated cathode followers 353, time-spaced, positive pulses of one-millisecond duration occur successively on buses 255—259 shown in Fig. 6E. The control levers 47 selectively connect these buses through the switch diodes 39 to the switch tubes 84. The application of one of the time-spaced pulses appearing on buses 255—259 to a switch tube causes a mark to be transmitted on the corresponding control pulse period to the station represented by that switch tube. Figs. 6E and 6F show, for example, that bus 256 is connected through lever SML1 for station No. 1 and through diode 266 to switch tube 267. The control pulse appearing on bus 256 occurs as a result of the actuation of step No. 2 of the control stepper 105 so that the application of this pulse to switch tube 267 causes a mark to be transmitted on the second control pulse period of the station period for station No. 1.

Two control levers are provided for each of the field stations. One of these levers SL1 is for the control of the signals at a field station, and the other lever SML1 is for the control of the switch machine at such field location. In addition, a push button contact such as the contact 264 for station No. 1 is included in series with each of the three-position signal control levers.

The lever SML1 has two positions designated R and N for "reverse" and "normal" respectively. In the reverse position, this switch connects bus 256 to the plate of diode 266, and when in the normal position connects bus 255 to the plate of diode 266. The lever SL1 may be moved to either its L, S, or R positions corresponding to signals "left," "stop," or "right." The position of this lever selects as to whether bus 257, 258, or 259 is to be connected to the plate of diode tube 265. This control is also subject to the position of push button contact 264 for reasons to be later described. This contact is normally in the open position but may be closed when a control is to be transmitted and held in such closed position either manually or through control of additional apparatus not shown for a sufficient length of time to ensure proper reception of the control at the field station. Similar levers are associated with the apparatus for each of the remaining field stations included within the system, and these control levers also determine which of the buses 255—259 will be connected to the plates of corresponding diodes. With the organization of these control levers shown, only two of the buses 255—259 may be connected to the plates of the diodes associated with any of the field stations. Thus, either of the positive pulses on bus 255 or bus 256 may be applied to the right-hand diode for each station such as diode 266. Similarly, one of the positive pulses on buses 257—259 may be applied to the plate of the left-hand diode such as diode 265.

The switch diodes 39 permit a plurality of control pulses to be applied over a common bus to each of the switch tubes 84 and yet effectively isolate the buses 255—259. In other words, if the switch diodes were not present, the application of a control pulse through one of the control levers for a station to a common bus such as bus 433, would permit the pulse also to appear through the other control lever to some other one of the buses 255—259 and produce improper operation.

*Trigger delay*

The stepping operation of the control stepper 105 is in response to the 1 kc. triggers shown in Fig. 7A so that the control pulses supplied by the control stepper to the cathode followers 353 and finally appearing on buses 255—259 have their leading and trailing edges coincident with these 1 kc. triggers. It is desirable for reasons presently to be explained that regularly occurring triggers at the 1 kc. rate be supplied to the switch tubes 84 and also to the subcarrier modulator 49. These triggers must, however, occur within the limits of each rectangularly shaped control pulse provided by the control stepper 105. The trigger delay 271 provides these required triggers by supplying an output of 1 kc. triggers with the triggers sufficiently delayed so that they occur within the limits of the control pulses.

The trigger delay (see Fig. 6E) is supplied with an input over bus 272. This input consists of positive triggers obtained from the 1 kc. trigger source 33. These triggers are supplied through the decoupling resistor 273 to the control grid of tube 274. This tube 274 is provided by cutoff bias by the negative direct-current voltage supplied to bus 272 by the connection at the 1 kc. trigger source 33 of this bus through resistor 160 to the (—) source. The negative-going variations of the voltage on bus 272 do not affect the output of tube 274 because they only drive the grid-cathode voltage more negatively beyond cutoff. Each positive pulse on the control grid of tube 274, however, increases the plate current of this tube to provide corresponding negative-going pulses at its plate. These pulses appearing across plate load resistor 275 are applied through blocking condenser 432 to the cathode of diode 276 so that they appear across cathode resistor 277.

The plate of diode 276 is connected through resistor 278 to the (+) voltage source and a connection is also made from the plate of this diode to the control grid of tube 281. The control grid of tube 281 is also connected through condensers 279 and 280, connected in parallel, to ground. Ordinarily the voltage at the plate of diode 276 would be at a relatively high potential with respect to ground and, since this diode plate is connected directly to the control grid of tube 281, this control grid would be at the same high potential with respect to ground. The cathode of tube 281 is, however, connected directly to ground so that any tendency of the grid of this tube to rise above ground potential causes grid current to pass through the resistor 278 and this grid current will continue until the voltage drop produced by said grid current across resistor 278 is sufficient to lower the control grid potential to substantially the voltage of the cathode. Thus, the plate of diode 276 is normally near ground potential, and with the cathode of this diode at ground potential also, diode 276 cannot conduct.

Each negative pulse appearing on the cathode of tube 276 in response to the positive triggers applied to the input of tube 274 lowers the cathode voltage of the diode for a relatively short time below ground and thus below the plate voltage so that the diode conducts and charges condensers 279 and 280. The conduction of diode 276 increases the voltage drop across resistor 278 and causes the voltage at the plate of this diode to substantially reach the voltage of its cathode. As a result, the plate voltage of diode 276 may reach a relatively low negative value and place a negative charge upon the condensers 279 and 280. The pulse applied to the cathode of tube 276 is relatively narrow pulse, but the time constant of the circuit for charging condensers 279 and 280 is relatively short because of the low values of capacitance of these condensers and the low resistance charging path through the diode 27. For this reason, although the negative pulse applied to diode 276 is of short duration, the short time constant of the charging circuit permits the condensers 279 and 280 to be charged to a relatively large negative potential during the time that the negative pulse is applied to the cathode of diode 276.

The negative voltage appearing at the control grid of tube 281 decreases the plate current of this tube, thereby providing an increase in the plate voltage of this tube which is applied through condenser 285 to the control grid of tube 282.

The control grid of tube 282 is supplied with a bias potential by means of the voltage dividing network including resistors 262 and 283 connected between the (+) source and ground. Thus, a positive bias is supplied to the grid of tube 282 causing a flow of grid current to produce a voltage drop across resistor 283 which tends to maintain the voltage on the grid of tube 282 at the voltage of its cathode which is at ground potential. The positive pulse, therefore, applied to the R–C differentiating combination including condenser 285 cannot produce an appreciable effect on the plate voltage output of tube 282 because the increase of grid voltage of this tube merely increases its grid current, and this increase of grid current tends to hold the grid voltage at the level of the cathode voltage.

Following the application of each negative pulse to the cathode of diode tube 276, the charge across condensers 279 and 280 is dissipated through a discharge circuit including these condensers, resistor 278, and the voltage supply back to ground. Since the resistive part of this discharge circuit includes the relatively high resistance of resistor 278 as compared to the low resistance of the charging circuit including the diode 276 and resistor 277, the discharge time of condensers 279 and 280 is relatively long. The reason for including the variable condenser 280 in parallel with the fixed condenser 279 is to permit varying this discharge time to provide the desired time delay. As condensers 279 and 280 continue to discharge toward their normal state which, as already explained, occurs when the grid of tube 281 is substantially at ground potential, i. e., condensers 279 and 280 fully discharged, a point is reached when the voltage at the grid of tube 281 rises above the cutoff level and permits a flow of plate current through the load resistor 284. Tube 281 is preferably chosen to be a sharp cutoff tube so that this rise of its grid potential above the cutoff level produces a relatively sharp increase of plate current with a correspondingly sharp decrease of plate potential. This negative pulse appearing at the plate of tube 281 is then applied through the differentiating combination including condenser 285 to the control grid of tube 282 and lowers the grid-cathode voltage of this tube with the result that a positive pulse appears at the plate of tube 282. This positive pulse is applied through resistor 293 to the control grid of cathode follower 287 and through a condenser 430 to the control grid of cathode follower 288.

The cathode of cathode follower 287 is connected through load resistor 291 to ground and this cathode is also connected through resistor 289 to the (+) source. This voltage dividing arrangement supplies the cathode of this cathode follower with a relatively high bias voltage. Since the grid of this tube is connected through resistors 290 and 286 to the (+) source, the control grid is also at a relatively high bias potential, and the resultant grid cathode voltage of this tube is at approximately the cutoff bias for this tube. Thus, each positive pulse appearing on the grid of tube 287 as a result of a decrease in conduction of tube 282 causes cathode follower tube 287 to conduct and provide a rise of potential at its cathode which then appears on bus 270 and is supplied to the switch tubes 84.

For reasons which will later become apparent, the output pulses of the cathode follower 288 are preferably relatively sharp and narrow so that the input of this cathode follower obtained from tube 282 is supplied through condenser 430 included in an R-C differentiating combination to provide relatively sharp, positive pulses on the grid of this tube 288. Since condenser 430 acts as a blocking condenser, tube 288 is biased to cutoff between pulses. As a result, its cathode is normally at ground potential and, for reasons which will become apparent, this permits the cathode of tube 313 also to be normally grounded. Tube 288 is also preferably biased to cutoff by the connection of its grid through a resistor to the (—) source. Each positive pulse applied to its grid, therefore, produces a flow of plate current through the cathode resistor 314 to supply a positive pulse to the cathode of tube 313 included in the subcarrier modulator 49.

Figure 7B:
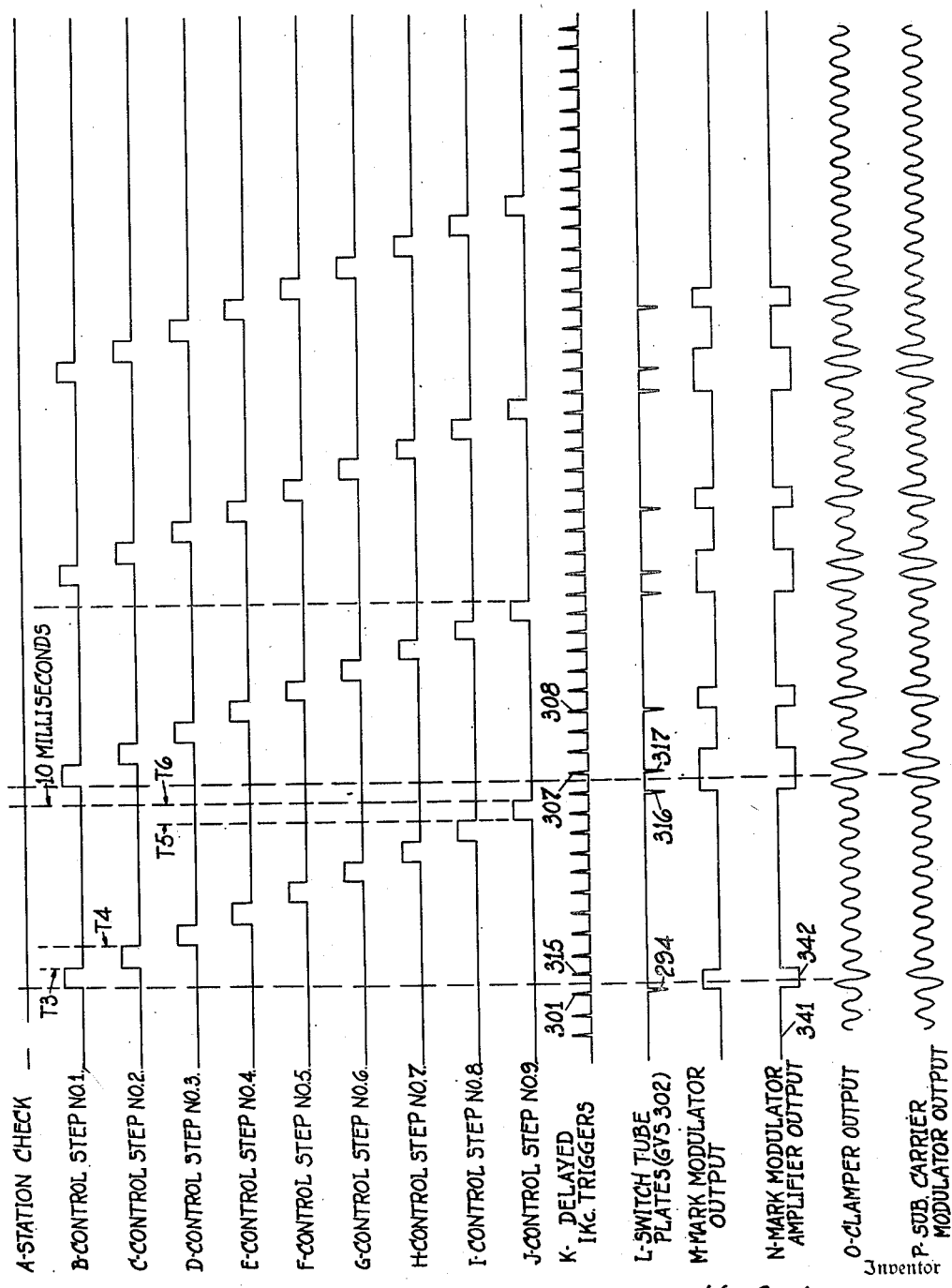

The delayed 1 kc. triggers provided by the trigger delay circuit 271 are shown in Fig. 7B at line F. The amount of delay provided for these triggers with respect to the input 1 kc. triggers shown in Fig. 7A is preferably such as to cause the delayed triggers to occur at a time when each cycle of the 1 kc. sine wave shown in Fig. 7A is at zero amplitude and about to rise in amplitude. Since the leading and trailing edges of each control pulse produced by the control stepper 105 are coincident with the 1 kc. triggers in Fig. 7A, and these rectangular control pulses are of 1 millisecond (1000 microseconds) duration, the resultant delay for the 1 kc. triggers causes them to appear substantially within the limits of the corresponding control pulses as shown in Fig. 7B.

*Switch tubes*

The switch tubes 84 (Fig. 6F) supply an output over bus 302 to control the operation of the subcarrier modulator 49. In addition to a synch and station call switch tube 295, an additional switch tube is provided for each station included within the system as shown by switch tube 267 for station No. 1. The control of these various switch tubes is derived from the switch diodes 39, the cathode followers 351, and the trigger delay 271.

The switch tubes are preferably pentode-type tubes. The cathode of each switch tube is connected through a resistor to ground and is supplied with a positive potential by means of a voltage dividing circuit connected from (+) to ground. This voltage dividing circuit for switch tubes 295, for example, includes resistor 299 and the cathode resistor of this tube. The cathode resistor of each switch tube is by-passed by a suitable condenser. For each of these switch tubes to conduct plate current, the various electrodes of the tube must be supplied with proper operating potential with respect to the cathode voltage. The plate and screen grid of each tube must be at a suitable positive potential with respect to the cathode, the suppressor grid must not be substantially negative with respect to the cathode, and the control grid-cathode potential must be above the cutoff potential for this tube.

The plate potential of each of the switch tubes is supplied from (+) through an appropriate load resistor to the plate electrode. The screen grid of the synch and station call switch tube 295 is provided by a connection to (+) through resistor 297 and this screen grid is by-passed to ground by a condenser 431. The screen grids of the remaining switch tubes corresponding to the various field stations are each connected to the output of a corresponding cathode follower included in the cathode followers 351. When the cathode follower associated with any switch tube is not conducting, the screen grid of such switch tube is substantially at ground potential so that the screen grid is at a potential below that of its cathode. Under such conditions the switch tubes cannot conduct plate current. However, when the associated cathode follower is conducting, the rise in voltage at its cathode provides a direct voltage of sufficient amplitude for the screen grid of the associated switch tube that such switch tube will, provided suitable operating potentials are also at such time applied to its remaining electrodes, conduct plate current.

As explained in connection with the description of the switch diodes 39, positive pulses are supplied from the cathodes of each pair of diodes for a particular field station each time that the control stepper 105 is operated throughout its various steps. These positive rectangular pulses then appear on the suppressor grids of the corresponding switch tubes and the voltage thus applied is of sufficient amplitude to raise the suppressor grid potential of these tubes during such pulse periods substantially to the potential of the cathode.

In addition, the control grid of each switch tube is provided with an input from the trigger delay 271 which provides positive pulses at 1 millisecond intervals to the switch tube grids. These delayed 1 kc. triggers are shown at line F of Fig. 7B. Each application of a positive pulse to the control grid of a switch tube raises its grid-cathode voltage above the cutoff level to permit such tube to conduct, assuming that at such time the potentials of the remaining electrodes are at a suitable level with respect to the cathode potential. To summarize, the situation with respect to the switch tubes 49 is as follows: The control grid of each switch tube is continually pulsed by the delayed 1 kc. triggers which momentarily raise its control grid-cathode potential above cutoff. The suppressor grids of the switch tubes are selectively pulsed by the positive pulses obtained from the switch diodes except for the synch and station-call switch tube which has its suppressor grid pulsed by the output of cathode follower 359. The screen grids of the various switch tubes are selectively gated by the outputs of the cathode followers 351 except for the screen grid of the synch and station-call switch tube 295 which is continually at the proper operating potential.

The suppressor grid gating potential of switch tube 295 is obtained over bus 634 from cathode follower 359 (see Fig. 6B) which in turn obtains its input over bus 113 from the synch and station-call pulse source 35 shown in Fig. 6B. As explained in connection with this latter apparatus, the voltage appearing on bus 113 includes a positive, rectangular, one millisecond pulse occurring each tenth millisecond as shown in Fig. 7A. When tube 209 of the synch and station-call pulse source is conducting, the total grid-cathode voltage of cathode follower tube 259 is at cutoff so that its cathode is at ground potential. When tube 209 is nonconductive, however, the grid-cathode voltage of tube 259 is raised so that this tube conducts and the potential at its cathode rises above ground, thereby raising the suppressor grid potential of switch tube 295. The single, positive trigger applied to the control grid of tube 295 from the trigger delay 271 during the time that the suppressor grid is so gated causes this switch tube to conduct. The resulting decrease of plate voltage supplies a negative pulse over bus 270 to the subcarrier modulator 49.

Each time the control stepper 105 is operated throughout its various steps, the time-spaced control pulses on buses 255—259 are selectively applied through the control of the control levers 47 to all the suppressor grids of the switch tubes for the field stations. Only one step at a time of the station gate stepper 106 (see Fig. 6D) can, however, supply a high potential to the grid of its associated cathode follower tube. Therefore, only one of the switch tubes for the field stations can have its screen grid potential suitably positive with respect to the potential of its cathode, and only one of the switch tubes can respond at any one time to the triggers applied to it from the trigger delay 271 even though the suppressor grids of other switch tubes may at that time be suitably gated by the pulses obtained from the switch diodes 39. As each switch tube responds to a trigger applied to its control grid, its plate voltage momentarily decreases, thereby supplying a negative pulse over bus 302 to the input of the subcarrier modulator 49. These output pulses are illustrated in Fig. 7B at line L.

The stepping operation of the control stepper 105 is initiated at the end of each station-call pulse period. Each station-call pulse is applied to the synch and station-call switch tube 295 and causes a corresponding trigger pulse to be applied to the subcarrier modulator 49. Then as the steps of the control stepper are successively operated, one millisecond control pulses are selectively applied, subject to the control exercised by the control levers 47, to the corresponding switch tubes. The resulting trigger pulses supplied by the then gated switch tube in response to each control pulse applied thereto bear a definite time relationship to the preceding station-call pulse. The apparatus at each control office is capable of determining, with respect to the portion of the control code intended for that station, the time relationships of the control pulses to the station-call pulse and in this way ascertaining the nature of the control intelligence transmitted to such station.

*Subcarrier modulator*

The subcarrier modulator 49 receives an input of negative pulses over bus 302 from the switch tubes 84 and also receives a delayed 1 kc. trigger input from the trigger delay 271. An additional input for the subcarrier modulator is obtained from cathode follower 354 which supplies a sine wave output. The subcarrier modulator includes amplifier tubes 316 and 318, a mark modulator including tubes 312 and 313, and a clamper including tubes 320 and 321.

Cathode follower 354 obtains its sine wave input from the 1 kc. sine wave source 145. The operation of this cathode follower 354 was explained in connection with the description of the 1 kc. sine wave source so that it need only be mentioned here that a sine wave output is obtained from cathode follower 354 having a frequency of 1 kc. per second. This output of cathode follower 334 is applied through condenser 325 which provides a low reactance to this frequency and appears across potentiometer 326.

The positive delayed 1 kc. triggers appearing across cathode resistor 314 of tube 288 included in the trigger delay 271 are applied to the cathode of tube 313. This tube 313 is included with tube 312 in a dual triode, Eccles-Jordan type trigger circuit. The negative pulses supplied over bus 302 to the cathode of diode 310 supply corresponding negative pulses to the control grid of tube 312. Thus, this form of trigger circuit is similar to that shown in the cycle starter 177 (see Fig. 6C) which trigger circuit includes the tubes 192 and 193 since in both of these trigger circuits one of the tubes has its cathode positively pulsed while the remaining tube is supplied with negative pulses applied to its control grid.

In the normal condition of this trigger circuit included in the subcarrier modulator, tube 313 is nonconductive because of the recurring positive triggers supplied to its cathode from the trigger delay 271. Each occurrence of a negative pulse on bus 302, however, places a corresponding negative pulse on the control grid of tube 312 which drives this tube beyond cutoff and reverses the condition of this trigger circuit so that its tube 312 becomes nonconductive and its tube 313 conductive. The negative pulses applied to tube 312 occur at substantially the same time as the positive pulses applied to the cathode of tube 313 since the negative pulses appearing on bus 302 occur as a result of conduction of the switch tubes in response to delayed triggers also obtained from the trigger delay 271. For this reason the values of condenser 309 and resistor 311 included in an R–C differentiating combination are chosen so that each pulse on bus 302 produces a broader negative pulse on the control grid of tube 312 than the corresponding positive trigger applied to the cathode of tube 313. Also, as was explained in connection with the trigger delay 271, an R–C differentiating combination is associated with cathode follower 288 to ensure sharp and narrow output pulses being applied to the cathode of tube 313. Thus, the control exercised by the negative pulse on the grid of tube 312 is the controlling factor in the operation of this trigger circuit with the result that each negative pulse appearing on the grid of tube 312 results in this tube 312 becoming nonconductive and tube 313 becoming conductive.

Since the trigger delay 271 supplies an output pulse once each millisecond, a positive pulse is always applied to the cathode of tube 313 one millisecond following the application of each negative pulse to the grid of tube 312. Therefore, if at such time a negative pulse is not again supplied from bus 302, this trigger circuit of the subcarrier modulator is switched back to its original condition with tube 313 nonconductive. If, however, another negative pulse is again applied to bus 302, resulting in the appearance of a negative pulse on the control grid of tube 312, this negative pulse again controls the condition of this trigger circuit so that tube 312 will again be nonconductive for another millisecond. In other words, each occurrence of a negative pulse on bus 302 switches the trigger circuit to the condition in which tube 312 is nonconducting and the trigger circuit is maintained in this condition for one millisecond at which time the trigger circuit is restored to the normal condition by a positive pulse supplied to the cathode of tube 313. Such restoration of the trigger circuit to its normal condition does not occur, however, if another negative pulse appears on bus 302 at this time. Thus, the output of the mark modulator obtained from the plate of tube 312 consists of a positive rectangular pulse of a one-millisecond duration corresponding to each occurrence of a negative pulse derived from the plates of the switch tubes for the various field stations. This output of the mark modulator is shown at line M in Fig. 7B.

The mark modulator output is applied through a decoupling resistor to the control grid of an amplifier tube 318. This tube 318 is preferably biased to cutoff by the voltage dividing network connected from (+) to (—) and including the plate load resistor of tube 312. Although cutoff voltage of this tube is obtained when tube 312 is conductive corresponding to the normal condition of the trigger circuit, actuation of the trigger circuit to its operated condition with tube 312 nonconductive raises the grid-cathode voltage of tube 318 above the cutoff level so that this tube conducts with a resulting decrease of its plate potential. Thus, in addition to amplifying the output of tube 312, the polarity of the voltage variations at the plate of tube 312 is also reversed as shown by the mark modulator amplifier output at line N in Fig. 7B.

The circuit comprising tubes 320 and 321 operates as a clamper and includes tubes 320 and 321 connected back-to-back in that the cathode of each is connected to the plate of the other. The control grids of both tubes 320 and 321 are supplied with a varying bias potential by the voltage dividing network including resistors 434 and 448 connected between (—) and (+). This bias voltage may be at either a high or low level depending upon whether tube 318 is nonconductive or conductive respectively. As explained, the voltage across potentiometer 326 is a sine wave voltage and is applied through the variable tap on the potentiometer and through resistors 328 and 329 to the cathode of tube 321 and the plate of tube 320. The grid voltage of tube 321 when the plate voltage of tube 318 is at a low level, is such that the resultant grid-cathode voltage of tube 321 is beyond cutoff even during the negative half cycle of the sine wave voltage applied to the cathode of tube 321. On the positive half cycles of this sine wave voltage, the resulting grid-cathode voltage of tube 321 is driven even more negatively beyond cutoff because of the increase of cathode potential of this tube. The grid-cathode voltage of tube 320 is also below cutoff when the plate voltage of tube 318 is at a low level. Thus, both tubes 320 and 321 are cut off when tube 318 conducts.

When tube 318 is nonconductive as it normally is when the mark modulator including tubes 312 and 313 is in its normal condition, the voltage applied to the grids of tubes 320 and 321 is raised above the cutoff level for these tubes so that they can conduct. Tube 320 conducts the positive half cycles of the sine wave as they are applied to its plate. Tube 321 similarly conducts the negative half cycles as they drive the cathode of this tube sufficiently negative with respect to the plate to permit this tube to conduct. In this way, the positive pulses provided by the mark modulator in response to the output triggers of the switch tubes act as gates on the clamper tubes 320 and 321 in that they prevent these tubes conducting for an interval of 1 millisecond following each such output trigger. At all other times the clamper tubes 320 and 321 are conductive in response to the sine wave of voltage appearing between their plates and cathodes.

When the clamper tubes 320 and 321 conduct, the voltage at the point 327 is substantially at ground potential because only a small voltage drop appears across the clamper tubes. When the clamper tubes are nonconductive, however, the voltage at the point 327 is substantially at the same level as the voltage at the tap on the potentiometer on tube 326. Resistors 328 and 329 are preferably of an equal value of resistance so that when the clamper tubes conduct and lower the potential at the point 327 substantially to the ground level, the voltage at the junction of resistors 328 and 329 is approximately one-half the voltage at the variable tap of potentiometer 326. When the clamper tubes are nonconductive the voltage at this junction of resistors 328 and 329 is substantially at the voltage level of the tap on potentiometer 326. Thus, the input voltage of tube 330 which is obtained from the junction of resistors 328 and 329 varies between two levels, the lower of which is approximately one-half the amplitude of the higher as at line O of Fig. 7B. A change of amplitude of the sine wave occurs either in response to a trigger appearing on bus 302 from the switch tubes 84 or to a delayed trigger from the trigger delay 271. Thus, these amplitude changes occur in coincidence with the delayed 1 kc. triggers shown in Fig. 7B. As was explained in connection with the trigger delay 271, the delayed triggers occur at the zero amplitude time of each sine wave cycle of the 1 kc. sine wave shown at line A in Fig. 7A. It follows then that, in the clamper output, each cycle of the sinusoidal appearing waveform has its amplitude for that cycle determined at the beginning of such cycle as illustrated in Fig. 7D.

The amplitude varying sine wave thus obtained from the output of tube 330 is as shown in Fig. 7B at line P. This inverted and amplified voltage is then supplied to the input of a cathode follower tube 331 with the output of this cathode follower appearing across the potentiometer 337 included in the FM carrier modulator and transmitter 42.

*FM carrier modulator and transmitter*

The FM carrier modulator and transmitter 42 supplies a carrier wave output to the band-pass filter 41 and this carrier is frequency modulated with the frequency deviation being substantially proportional to the amplitude of the amplitude varying sine wave appearing across potentiometer 337.

The FM carrier modulator and transmitter includes a free-running multivibrator comprising tubes 332 and 336. This free-running multivibrator is similar to the free-running multivibrator included in the cycle starter 177 comprising tubes 178 and 179. The multivibrator including tubes 332 and 336 is preferably, however, a balanced multivibrator in that each tube is nonconductive for substantially as long a time as it is conductive. In addition, this multivibrator differs in that the control grids of its tubes are not connected through respective resistors directly to ground. Instead, the control grid of each tube is provided with a bias potential for controlling the frequency of the multivibrator output. Normally, the output frequency of a multivibrator is determined primarily by the time required for the respective grid-plate condenser to discharge through the associated network of resistors following the sudden drop in plate voltage of the associated multivibrator tube as it becomes conductive. By varying the "steady-state" conditions for these condensers according to the amplitude of a control voltage, the frequency of the multivibrator can be made to be substantially proportional to the amplitude of such modulated voltage.

The bias for the tubes 332 and 336 includes a direct voltage obtained from the potentiometer 335 connected between (+) and ground and also includes the amplitude-varying sine wave output of the subcarrier modulator. This alternating component of the bias is then superimposed upon the direct voltage portion of the bias. The circuit constants of the multivibrator and the amplitude of the direct voltage bias as obtained from potentiometer 335 are chosen so that the output frequency of the multivibrator is approximately 15 kc. when no alternating voltage appears across potentiometer 337. The addition of an alternating component to this bias varies the instantaneous amplitude of the bias to produce corresponding variations of the multivibrator output frequency. In each positive half-cycle of the alternating component of bias the instantaneous amplitude of the bias is increased so that the time required for the grid-plate condensers such as condenser 338 to reach their new steady-state conditions is decreased resulting in an increase of multivibrator frequency. Since the average value of this frequency is many times the frequency of the alternating voltage obtained from the subcarrier modulator 49, the multivibrator goes through numerous cycles of operation for each cycle of the sine wave input voltage. As the multivibrator tube 332 is alternately made conductive and nonconductive at a varying frequency, the voltage across cathode resistor 339 varies correspondingly and supplies a substantially square wave of voltage through condenser 340 to the control grid of amplifier tube 345.

The output of amplifier 345 appearing at the plate of this tube is applied through coupling condenser 346 to the control grid of amplifier tube 347 and also to the control grid of an inverter tube 348. The inverter 348 provides the required 180° phase shift required to drive the tube 348 which together with tube 347 is included in a push-pull amplifier. The square wave output of this push-pull amplifier is then transformer-coupled to the input terminals of bandpass filter 41.

The band-pass filter 41 is constructed to have a relatively narrow pass-band so that its output includes a relatively narrow frequency spectrum. Experiments have shown that frequencies higher and lower than this relatively narrow pass-band need not appear in the output of the filter 41 to convey the required intelligence which includes only two distinguishable characters, namely, large and small frequency deviation corresponding to marks and counts respectively. This output of the band-pass filter 41 is then applied over wires 692 and 693 to the line wires 40 for transmission to the various field stations.

*Operation of complete control office transmitting apparatus*

The preceding description has given detailed explanations of the various components included in the control office transmitting apparatus. The description to be given here will attempt to describe the matter in which these individual components shown in detail in Figs. 6A to 6F and in block form in Figs. 3A-3B cooperate to produce the transmitted control code.

The basis of the pulse timing is the 1 kc. sine wave source 145 which produces a sinusoidal output at a frequency of 1 kc. per second as shown at line A in Fig. 7A. This sine wave is applied to the 1 kc. trigger source 33 and this trigger source produces an output pulse for each cycle of the sine wave with each trigger occurring during the negative half cycle of the sine wave. These 1 kc. triggers and their relation to the sine wave are shown in Fig. 7A at line B. The 1 kc. triggers are applied to the 1 kc. gate source 34. As a result of these triggers, the 1 kc. gate source supplies over its output buses 175 and 176 positive, rectangular pulses of one-millisecond duration. The voltage on these buses 175 and 176 alternatively varies between ground potential and some positive potential to thereby form what are known as even control stepper pulses and odd control stepper pulses respectively, as shown in Fig. 7A at lines F and G.

The basis of the cycle timing is the cycle starter 177. The cycle starter supplies an output pulse once each second to initiate the beginning of a new cycle of operation. The cycle starter operates independently from the 1 kc. sine wave source 145 so that the output pulse of the cycle starter may occur at various times with respect to the 1 kc. triggers. The output pulse of the cycle starter may, consequently, appear at a time when either the voltage on bus 175 or on bus 176 is at high potential with the other bus then at ground potential. To produce the desired stepping of the control stepper 105 and associated circuits, it is desirable that the appearance of the positive pulses on buses 175 and 176 bear a definite relationship to the time of occurence of the one-second trigger. For this reason, an output pulse is supplied from the cycle starter 177 over bus 657 to the 1 kc. source 34. The application of this pulse to the 1 kc. gate source ensures that the next occurence of a 1 kc. trigger following the one-second trigger supplied by the cycle starter will cause the voltage on bus 176 to rise to a positive potential simultaneously with the decrease of the potential on bus 175 to the ground. Following this synchronizing action of the output of the 1 kc. gate source in response to the one-second trigger, the voltage on the buses 175 and 176 alternately rises and falls as before in response to the 1 kc. triggers.

The one-second trigger also acts upon the trigger circuit included in the cycle starter to produce the leading edge of the cycle starter pulse shown in Fig. 7A at line E. The trailing edge of this cycle starter pulse occurs in coincidence with the rise of potential on bus 176. This control of the cycle starter provided by the 1 kc. gate source 34 is shown by the connection from the 1 kc. gate source 34 to the input of tube 195 included in the cycle starter 177. Since the one-second trigger may, as described, occur at various times with respect to the 1 kc. triggers, the width of the cycle starter pulse appearing on bus 189 and shown in Fig. 7A may vary. This cycle starter pulse is applied over bus 189 to the input of the synch and station-call source 35, the station gate driver 37, and the pre-set step of the station gate stepper 106. The leading edge of the cycle starter pulse produces no effect upon any of the components mentioned.

Upon the occurence of the trailing edge of this cycle starter pulse the synch and station-call pulse source 35 responds by producing an increase of the voltage on bus 113 corresponding to the leading edge of the synch pulse shown at line H of Fig. 7A. The trailing edge of this synch pulse occurs one millisecond later at time T2 when the voltage appearing on bus 175, which supplies an input to the synch and station-call pulse source, abruptly rises. The resulting one-millisecond rectangular synch pulse appearing on bus 113 is supplied not only to cathode follower 350 but also to the station gate driver 37. The cathode follower 350 merely repeats this synch pulse and applies its output to the suppressor grid of the synch and station-call switch tube 295 included in the switch tubes 84. The leading edge of the synch pulse supped over bus 113 to the station gate driver 37 produces no effect upon this component. The trailing edge of this synch pulse occurring at time T2 does, however, produce an effect upon this station gate driver.

The station gate driver 37 provides 10 millisecond positive gates alternatively on its output buses 211 and 212. When one of these buses is at ground potential, the other is at some positive potential and vice versa. It is desirable that the occurrence of these gates bear a certain relationship to the occurrence of the one-second trigger designating the beginning of a new cycle. In other words, altogether either bus 211 or 212 may be at ground potential upon the occurrence of the one-second trigger with the other bus then at some positive potential, the station gate driver 37 should operate to place bus 211 at ground potential and bus 212 at a positive potential immediately following the occurrence of the synch pulse. It is for the reason that the cycle starter pulse is applied over bus 189 to the input of the station gate driver 37. The leading edge of this cycle starter pulse produces no effect upon this apparatus, but upon the occurrence of the trailing edge, the station gate driver causes the voltage on bus 212 to drop to ground potential and the voltage on bus 211 to rise above ground. If the potentials on these buses are at these relative values at the time of occurrence of the trailing edge of the cycle pulse, they will remain in that condition. If, however, they are not supplied with these desired potentials, as is indicated at lines J and K of Fig. 7A, this occurrence of the trailing edge of the cycle starter pulse will switch or reverse the potential on these buses 211 and 212 to the relative values shown i.e., with bus 212 at ground potential and bus 211 above ground. With the apparatus of the station gate driver in this condition, the occurrence of the trailing edge of the synch pulse shown at line G of Fig. 7A produces a switching action which results in the potential on bus 211 abruptly being lowered to the ground level at the same time that the potential on bus 212 rises above ground.

As described, the cycle starter pulse is also applied over bus 189 to the input of the pre-set step of the station gate stepper 106. Although the leading edge of this pulse does not affect the output of this step of the station gate stepper, the occurrence of the trailing edge produces a sudden increase in the output potential of this step which is then applied to the input of step No. 0 of the station gate stepper. This high value of the output potential of the pre-set step is maintained until time T2 shown in Fig. 7A when the rise in potential on bus 212 occurring in the manner just described increases the input to the pre-set step and restores this step to its normal condition. The rise in the output potential of the pre-set step occurring at time T1 does not affect the output of step No. 0 to which it is applied. However, the decrease of potential occurring at time T2 when this step is restored to normal does actuate this step No. 0. The output potential of this step supplied to its associated cathode follower tube 229 included in the cathode followers 351 suddenly rises as shown at line L of Fig. 7A. Also, with this advance of a step of the station gate stepper 106, a pulse is supplied to the input of the control stepper starter 38 causing it to supply an output pulse at time T2 over bus 248 to step No. 1 of the control stepper 105.

The successive steps of the control stepper 105 are connected alternately to buses 175 and 176. The constant changing of the potentials on these buses as shown in Fig. 7A produces no response of the various steps of the control until the input pulse is supplied to step No. 1 from the control stepper starter 38. When this input pulse is supplied to step No. 1, the output potential of this step suddenly rises. At that instant, designated as time T2, the voltage on bus 176 abruptly decreases to ground potential thereby permitting the B tube to become conductive at this time and the A tube nonconductive. One millisecond later, at time T3, the rise in potential on bus 176 causes step No. 1 to be restored to its normal condition thereby producing the trailing edge of the output pulse of step No. 1. This increase of voltage on bus 176 occurring one millisecond after the input pulse to step No. 1 from the control stepper starter causes this step No. 1 to give an output pulse of one-millisecond duration and thereby clarifies the reason for having the pulsing on buses 175 and 176 properly synchronized with respect to the beginning of the cycle.

The return of step No. 1 to its normal condition actuates step No. 2 at time T3. Step No. 2 is restored to its normal condition at time T4 when the potential on bus 175 rises above ground to cut off the then conducting B tube of this step No. 2. The stepping operation of this control stepper 105 thus produces the time-spaced, one-millisecond pulses shown at lines B—J of Fig. 7B. The outputs of the first five steps of this control stepper are, in this embodiment of the invention, applied to the inputs of corresponding cathode followers 353 so that similar time-spaced pulses appear on buses 255—259.

When the control stepper 105 has operated throughout all its steps 1 through 9, a pulse is supplied by step No. 9 of the stepper, over bus 658, to the synch and station-call pulse source 35. The occurrence of the leading edge of this output pulse of the control stepper No. 9 occurring at time T5 does not produce any effect upon the synch and station-call pulse source. As the control stepper 105 responds once more, however, to the changing of potentials on buses 175 and 176, the step No. 9 is restored to its normal condition. The resulting decrease of potential at the plate of tube B of step No. 9 at time T6 is then applied over bus 658 and causes a negative pulse to be applied to the synch and station-call pulse source in such a manner that an increase of potential appears on bus 113. This rise of potential corresponds to the leading edge of the station-call pulse for station No. 1 as shown at line H of Fig. 7A. At time T7, the potential on bus 175 supplying an input to the synch and station-call pulse source terminates this first station-call pulse which is supplied over bus 113 to both the cathode follower 350 and the station gate driver 37. As with the synch pulse, the station-call pulse for station No. 1 does not, with its leading edge, produce any effect upon the station gate driver, but the trailing edge occurring 1 millisecond later at time T7 does switch the potentials on buses 211 and 212 with the result that the potential on bus 212 returns to ground at the same time that the potential on bus 211 rises above ground. The rise in potential on bus 211 makes the then nonconductive A tube of step No. 0 of the station gate stepper conductive. The decrease in the output potential of this step at this time T7 also has the effect of actuating step No. 1 by making its A tube nonconductive. The resulting rise of output of step No. 1 then causes the associated cathode follower tube 235 included in the cathode followers 351 which is normally biased at cutoff to conduct. This advance in a step of the station gate stepper 106 again causes an output pulse to be supplied by the control stepper starter 38 to the step No. 1 of the control stepper 105. Following this occurrence of the input pulse to step No. 1, the control stepper 105 is again operated throughout its nine steps in response to the changing of potentials or buses 175 and 176. Then, as step No. 9 of the control stepper is again restored to its normal condition, another one-millisecond station-call pulse is provided by the synch and station-call pulse source 35 over bus 113. The termination of this station-call pulse then again reverses the potentials on buses 211 and 212 with the result that another step is taken by the station gate stepper 106.

Prior to the time T2 shown in Fig. 7A, the various circuits operate in such a manner as to synchronize the changing potentials on buses 175 and 176 and also those on buses 211 and 212 so that they will be properly related to the initiation of the cycle as determined by the one-second trigger. The above summarizing description is an attempt to explain the manner in which this synchronizing action is accomplished. Following this action, the synch and station-call pulses supplied by the synch and station-call pulse source 35 each cause the station gate driver 37 to reverse the potentials on buses 211 and 212. Each such reversal then causes an advance in step of the station gate stepper 105 and each such advance of a step causes step No. 1 of the control stepper to be actuated. When the control stepper has been operated throughout all its steps, it causes the synch and station-call pulse source to supply another station-call pulse and, in this manner, the station periods and control code pulse periods are demarcated by this apparatus.

When all the steps of the station gate stepper corresponding to the various field stations have been successively actuated, the last or check step is actuated. This step does not provide a pulse for the control stepper starter so that the control stepper cannot be operated. Since an output pulse cannot be supplied by the last step of the control stepper to the synch and station-call pulse source 35, the station gate stepper cannot be further operated. As a result, the check step remains in its actuated condition with its B tube conducting until the beginning of the next code cycle.

If an odd number of field stations is included in the system, the conditions with respect to the station gate stepper will be as shown in Fig. 6D wherein the control grid of the A tube of the step for the last station is pulsed from bus 212. Then as the potential raises on bus 212 to restore this step to its normal condition, the check step will be actuated. Bus 212 will then remain at a high potential for the rest of the cycle as shown at line J of Fig. 7A. Under these circumstances, the grid of the A tube of the check step will be pulsed from bus 211 and will not be restored until the beginning of the next cycle when the potential on this bus rises as at time T1.

If the system includes an even number of field stations, the check step will be pulsed from bus 212 and will not be restored until the next cycle has been initiated. Since the station gate step for the last station, will be restored by a rise of voltage on bus 211, the voltage on bus 212 will remain at ground potential throughout the remainder of the cycle and until that time in the next cycle corresponding to T2.

Marks cannot be transmitted during the time that the check step is actuated because the control stepper 105 cannot be operated at such time. Therefore, the period of time during which the check step is actuated corresponds to the required rest period at the end of each cycle. The length of this rest period depends upon the number of station included in the system, since it extends from the end of the station period for the last station until the transmission of the next synch pulse.

The successive station gates supplied by the various steps of the station gate stepper 106 and shown at lines L—O in Fig. 7A are repeated by their associated cathode followers 351. The resulting output gates supplied by the cathode followers associated with the various steps following step No. 0 successively gate corresponding switch tubes for the various field stations. The time-spaced, one-millisecond pulses appearing on buses 255—259 are selectively applied, subject to the control exercised by the control levers 47, to the suppressor grids of the switch tubes for the various stations. The synch and station-call switch tube 295 has its suppressor grid supplied with the potential of the cathode follower 350 so that the suppressor grid voltage of this switch tube appears as shown at line H of Fig. 7A. As the one-millisecond pulses are selectively applied to the switch tubes for the various field stations, the switch tube which is then gated by reason of its screen grid being supplied by the proper operating potential from one of the associated cathode followers 351, responds to the 1 kc. delayed triggers shown at line K of Fig. 7B which are supplied to the control grids of all the switch tubes from the trigger delay 271. The switch tube that is then gated, supplies output pulses over bus 302 to the subscriber modulator 49. The result then is that all station-call pulses as well as the synch pulses that appear on bus 302 are obtained from the output of the synch and station-call switch tube 295; whereas, the control pulses for the field stations are obtained from the respective switch tubes for these field stations. These pulses appearing on bus 302 are shown at line L of Fig. 7B.

The subcarrier modulator 49 responds to each of the trigger pulses supplied to it over bus 302 by producing an output pulse of rectangular form having a duration of one millisecond as shown at line M in Fig. 7B. The leading edge of each such rectangular pulse is coincident with the input pulse supplied over bus 302, and the trailing edge of each pulse is coincident with the next 1 kc. delayed trigger which occurs 1 millisecond later. These rectangular pulses effectively act as gates upon the clamper included in the subcarrier modulator. A sine wave input is obtained for the subcarrier modulator from cathode follower 354 which obtains its input form from the 1 kc. sine wave source 145. The clamper responds to the gating potential obtained from the mark modulator by supplying an output having substantially sinusoidal waveform with each cycle being of high amplitude for each occurrence of a rectangular pulse and of low amplitude where such rectangular pulses do not occur as may be seen by comparing lines N and O in Fig. 7B. Since the delayed triggers are delayed to the extent that they occur at the point of zero amplitude of the 1 kc. sine wave, the rectangular gates are coincident with the beginning and end of each complete cycle of the sine wave. Therefore, the final result is that each occurrence of a trigger on bus 302 causes the output of the subcarrier modulator to be of substantially sinusoidal waveform and with a high amplitude for the whole succeeding cycle. At all other times, the sine wave cycles are of low amplitude.

The subcarrier modulator output is then applied to the FM carrier modulator and transmitter 42. This component supplies an output to the band-pass filter 41 having a substantially square waveform with the frequency of the output being dependent substantially upon the instantaneous amplitude of the 1 kc. modulator output. Thus, in effect, the output of the transmitter is essentially a frequency modulated wave having approximately square wave characteristics. This output wave is then passed through the band-pass filter 41 to the line wires 40. By passing only a relatively small band of frequencies, the band-pass filter 41 substantially eliminates the square wave characteristics of the transmitter output so that a substantially conventional frequency modulated wave is transmitted over line wires 40 to the various field stations included within the system.

FIELD STATION APPARATUS
Field station receiver

The purpose of the field station receiver at each field station is to transform the frequency modulated wave received over line wires 40 from the control office into an output of pulses. Each field station receiver supplies two separate pulsing outputs for the control of the circuits at such field station. One of these outputs of pulses includes a pulse for each occurrence of a mark in the received control code, and the other includes a pulse corresponding to each occurrence of a mark or a count in the received control code. This latter output, therefore, in effect supplies an output pulse once each millisecond while the system is in operation.

The frequency modulated output of the control office transmitting apparatus is applied over line wires 40 to each of the field stations included in this communications system. In Figs. 9A, 9B, 9C and 9D which show the apparatus at a typical field station, the control office transmission is applied from line wires 40 to a band-pass filter 43. This filter is similar to the filter 41 at the control office which passes the output of the control office transmitter to the line wires 40. The band-pass filter 43, therefore, passes only those frequencies containing the control code intelligence and applies this signal across resistor 356 connected between the control grid and ground of tube 357. Tube 357 is cathode biased by the flow of plate current through its cathode resistor 358, and this resistor is by-passed for the range of frequencies amplified in this circuit by condenser 359. Tube 357 is operated as an overdriven amplifier as is also tube 360 to which the output of tube 357 is applied through coupling condenser 361. As such, tubes 357 and 360 act as saturation limiters and effectively limit the amplitude of the incoming signal, thereby removing most of the undesirable amplitude variations.

The output of tube 360 is applied through coupling condenser 363 to the control grid of amplifier tube 362. This tube 362 is also operated as an overdriven amplifier and the grid rectification of the input signal which occurs as the result of the control grid being driven positive on the peaks of the positive half cycle, causes a negative voltage to appear at the upper terminal of resistor 364. Condenser 472 and shunting resistor 364 together have a time constant of such a value that the voltage at the upper terminal of resistor 364 is a relatively steady voltage with its amplitude depending upon the amount of grid current of tube 362 and thus, in turn, upon the amplitude of the input signal to this tube.

The plate output voltage of tube 362 is applied to the control grid of tube 367. This tube 367 is operated as a conventional amplifier with the exception that its cathode is not connected directly to ground but is instead connected to the plate of tube 366. The negative voltage across resistor 364 is applied to the control grid of tube 365 and controls the conduction of this tube. When the receiver input signal is at a low level, the negative voltage across resistor 364 decreases correspondingly. As the voltage across resistor 364 rises toward ground potential, the control grid-cathode voltage of tube 365 is made correspondingly less negative. As a result, tube 365 conducts a relatively large plate current so that the large voltage drop across its plate load resistor 473 of tube 365 causes a decrease in the voltage applied to the control grid of tube 366.

Tube 366 is biased negatively by a voltage dividing circuit included between (+) and (−). The values of the resistors included in this voltage dividing circuit are so chosen that when tube 365 conducts, a relatively large plate current passes through its plate resistor 473 and the resulting decrease of plate potential of this tube causes the grid-cathode voltage of tube 366 to be below cutoff. However, when tube 365 conducts little plate current or is cut off entirely, the resulting increase of plate potential of this tube then permits tube 366 to conduct. This latter condition of tube 366 is obtained when the input signal to the receiver is above some predetermined level. With an input signal of sufficient amplitude, the voltage across resistor 364 becomes more negative with the result that the grid-cathode voltage of tube 365 similarly becomes more negative. Thus, the plate current of tube 365 is decreased with the result that tube 366 can then conduct plate current. Thus, tube 366 can conduct only when a sufficiently strong input signal is applied to the receiver 44.

Tube 366 is effectively connected in the cathode circuit of tube 367. When the grid voltage of tube 366 is raised as a result of a sufficiently strong input signal to the receiver 44, this tube can conduct and thereby permit the impedance in the tube 367 to conduct also. However, when the input signal to the receiver is below the desired level, the resulting nonconduction of tube 366 greatly increases the impedance in the cathode circuit of tube 367 so that it cannot conduct. In this way, tubes 365 and 366 function as a squelch circuit in that they prevent the operation of tube 367 when the input signal to the receiver is below some desired value.

The output signal obtained across load resistor 368 of tube 367 when the receiver is not squelched is applied through coupling condneser 369 to the control grid of cathode follower tube 370. The control grid of tube 370 is supplied with a positive potential by the voltage dividing network including resistors 382 and 383 connected between (+) and ground. This positive potenbetween + and ground. This positive potential tends to overcome the high cathode potential of this tube supplied by the voltage drop across its load resistor 371, thereby preventing the grid-cathode voltage from going below cut-off on negative half cycles of the input voltage.

The output of cathode follower tube 370 appears across its cathode resistor 371 and is applied to the resistance-capacitance network comprising condensers 372 and 373 which are preferably of equal valve, and the variable resistors 374 and 375 which are ganged so that they will preferably have equal values of resistance throughout their range of variation. This R–C circuit is frequency selective and the values of the components are so chosen that the center frequency (15 kc. for the control code) occurs at approximately the center of the most linear portion of the output voltage versus frequency characteristics of this network. Consequently, an output is obtained and applied through the crystal rectifier 376 that varies in amplitude according to the instantaneous frequency of the received signal with the amplitude varying in one direction as the frequency increases above the center frequency and varying in the other direction as the frequency decreases below the center frequency. Since the control code transmitted by the control office is frequently modulated according to an amplitude varying signal, the output of the frequency selective network comprises a carrier frequency wave with varying amplitude. The output waveform is, therefore, of high amplitude for each mark in the control code and of low amplitude for each count.

The output of the frequency selective network is rectified by the crystal rectifier 376 so that a unidirectional signal of varying amplitude and including carrier frequency components is applied to the low-pass filter 377. This low-pass filter removes the carrier frequency components with the result that the input applied to amplifier tube 378 through resistor 379 includes only low frequency components and has substantially the form of an amplitude varying sine wave of 1 kc. frequency, similar to the output of the subcarrier modulator 49 included in the control office apparatus. Condenser 380 shunted across grid leak resistor 381 of tube 378 correct the phase distortion produced by the filter 377.

The output of the low-pass filter 377 is amplified by amplifier tube 378 which supplies its plate output voltage through coupling condenser 369 to the potentiometer 387. The tap of this potentiometer 387 is adjusted to provide the proper value of input for tube 386. Tube 386 is operated without fixed or cathode bias and for this reason grid rectification of the input signal takes place. During each positive half cycle of the applied alternating voltage, grid current of tube 386 passes through resistor 388 and from the tap on potentiometer 387 to ground. The tendency of the grid-cathode voltage to increase on the positive half-cycles of the input signal is thus counteracted by the grid bias produced as a result of grid current so that the plate current of tube 386 is substantially unaffected by positive half cycles. Negative half cycles of the input wave, however, reduce the grid-cathode voltage and produce a decrease of plate current in this tube. The resulting increases of plate voltage which occur for each negative half cycle of the input voltage are applied to the control grid of cathode follower tube 475. For each cycle of the input to tube 386 of large amplitude, a correspondingly large increase of the plate potential of this tube occurs. Similarly, a smaller variation of the plate potential occurs as a result of each cycle of reduced amplitude in the input to tube 386. The input to cathode follower 475 varies, therefore, according to the amplitude of the alternating input to tube 386. Consequently, the output of tube 475 obtained across its cathode resistor 390 reaches either a high or a low level once each millisecond since each cycle of the alternating input to tube 386 is of one-millisecond duration.

The output of cathode follower tube 475 appearing across its cathode resistor 390 is fed to the control grids of the left-hand tube of two conventional one-shot, biased multivibrators. One of these multivibrators includes the tubes 394 and 396, and the other includes the tubes 391 and 393. The varying voltage thus applied to the control grids of the left-hand tubes of each multivibrator acts as varying bias voltages for these tubes.

The control grid of the right-hand tube of each of these multivibrators is connected directly through a resistor to (+). Under normal conditions, therefore, the right-hand tube of each multivibrator conducts and the left-hand tube is cut off. When a positive input pulse is applied to the nonconducting tube of one of the multivibrators and is of sufficient amplitude to overcome the cutoff bias on such tube, a quick reversal of the conduction status of these tubes results. The abrupt decrease in the plate potential of the tube which is then made conductive is applied through a resistor to the control grid of the other tube. For example, the application of a positive pulse to the grid of tube 394 will, if of sufficient amplitude, drive the grid-cathode voltage of this tube above cutoff and thereby initiate a switching action of this multivibrator which will end with tube 394 conducting and tube 396 cut off. The decrease of plate voltage of tube 394 as a result of plate current flow through its plate load resistor 444 will cause a sudden decrease of grid potential of tube 396 to hold the grid cathode voltage of this tube below cutoff. Following this switching action, condenser 447 will discharge and allow the grid voltage of tube 396 to rise. When the voltage at the grid of this tube rises above cutoff, another reversal of conduction of these tubes will take place to restore the multivibrator to its original condition in which it will remain until another positive pulse is again applied to the control grid of tube 394.

Resistor 395 and 474 respectively associated with the two multivibrators are of different values so that they attenuate the input pulses to the multivibrators differently. The input pulses corresponding to both marks and counts are but only slightly attenuated by resistor 474 so that the amplitude of the pulses at the control grid of tube 391 corresponding to either marks or counts is sufficient to make this tube conductive. The larger resistor 395, however, provides greater attenuation of the input pulses to tube 394. The pulses corresponding to counts have their amplitude reduced to such an extent that they cannot drive the grid of tube 394 above cutoff so that this multivibrator cannot respond by supplying output pulses for the received counts. The larger amplitude mark pulses are still effective, despite their attenuation by resistor 395, to make tube 394 conductive. In this way, these two multivibrators are selectively operated so that the multivibrator including tubes 394 and 396 provides output pulses only for the marks in the code; whereas, the multivibrator including tubes 391 and 393 supplies an output pulse for each mark and each count received.

The circuit constants for each of these multivibrators is so chosen that it will remain in the condition wherein its left-hand tube is conducting for less than one millisecond. This condition must be met so that each multivibrator may be operated on successive milliseconds to the condition in which its right-hand tube becomes conductive.

Each of the multivibrators is followed by a peaker circuit to give a single, narrow pulse from the rectangular output pulse provided by the multivibrators. Each peaker circuit operates in the same manner as the similar peaker included in the cycle starter 177 shown in Fig. 6A. The input grid voltage to each peaker tube is obtained from the plate of the left-hand tube of its associated multivibrator. As each multivibrator is operated to its opposite condition with its left-hand tube conductive, the decrease in potential occurring as such tube becomes conductive causing the peaker to apply a positive output pulse to its associated cathode follower tube 399 or 402. Thus, for each output pulse of the cathode follower 475 corresponding to a mark in the control code, a positive pulse is applied to the control grid of cathode follower tube 399, thereby causing a similar positive output pulse to appear across the cathode resistor 400 of this tube. The resulting pulses appearing on bus 401 are as shown at line B of Fig. 10A. Similarly, a positive pulse is applied to the control grid of cathode follower tube 402 for each occurrence of either a mark or a count in the control code, and corresponding pulses then appear across cathode resistor 403 and are applied over bus 404 to the remainder of the field station apparatus.

*Synch mark selector*

The synch mark selector 661 has applied to it over bus 401 a positive pulse corresponding to each mark received in the control code. The purpose of this synch mark selector is to supply an output pulse only for each input pulse applied to it corresponding to a synch mark but to supply no output for those pulses applied to it which correspond to station-call marks or control marks.

The synch mark selector includes a tube 411 which responds only to the synch marks. Diodes 417 and 446 control the conduction of tubes 419 and 420 which in turn control the gating of the tube 411 so that it will respond, as desired, only to the synch marks.

The cathode and suppressor grids of tube 411 are both supplied with a positive potential by means of a voltage dividing network including resistors 663 and 664 connected between (+) and ground. The plate of this tube is connected through a load resistor 415 to (+). The positive mark pulses appearing on bus 401 are applied to the control grid through an R-C differentiating combination including condenser 410 and resistor 408. The screen grid of tube 411 is connected directly to the plate of tube 420. When tube 420 conducts, its plate voltage is at a relatively low level because of the voltage drop across its plate load resistor 407. The voltage that then appears on the screen grid of tube 411 is so low with respect to the cathode potential that this tube cannot conduct. However, when tube 420 conducts very little plate current or is cut off, its plate voltage is high with the result that the screen grid potential on tube 411 is then sufficiently above the potential of its cathode that this tube can then conduct plate current.

Assume for the moment that the condition of tube 420 is such that it conducts but little plate current or is cut off so that the screen grid of tube 411 has a sufficiently high potential applied to it to permit it to conduct in response to a positive pulse applied to its control grid. The manner in which this gating occurs will subsequently be explained; for the present it need only be known that prior to the reception of a new control code cycle tube 411 has its screen grid properly gated so that it can respond to an input pulse, i. e., the synch mark pulse, applied to its control grid. When tube 411 conducts in response to the positive pulse, its plate voltage abruptly decreases, thereby causing a negative pulse to be applied through condenser 416 to the cathode of diode 417. The plate of diode 417 is connected to the control grid of tube 419, and both diode plate and control grid of tube 419 are connected through resistor 443 to (+). Since the cathode of tube 419 is connected directly to ground, the control grid of this tube must conduct sufficient grid current through resistor 443 to maintain the control grid substantially at ground potential. Consequently, the plate of diode 417 is normally at ground potential and, since the cathode of this diode is connected through resistor 409 to ground, diode 417 normally does not conduct current. When the negative pulse is applied from the plate of tube 411 to the cathode of diode 417, the potential of this diode cathode is lowered below ground so that the resulting positive plate-cathode potential of this diode permits this tube to conduct. As a result, the diode plate potential is lowered approximately to the potential of the cathode of this tube so that the control grid potential of tube 419 is also lowered below ground and below the potential of its cathode. Thus, although this tube 419 normally conducts a high plate current, the decrease of its grid-cathode potential occurring at this time causes a reduction in plate current with a corresponding increase of plate potential.

The decrease of plate potential of diode 417 occurring in response to the momentary conduction of tube 411 also causes condenser 418 to become negatively charged to the negative potential appearing between the plate of diode 417 and ground. Since this condenser 418 charges through the relatively low resistance of diode 417, the low time constant of this circuit permits condenser 418 to become negatively charged in a very short time. Consequently the negative potential at the control grid of tube 419 is maintained by the negative voltage to which condenser 418 has been charged in response to the negative pulse at the plate of tube 411. As a result, the plate potential of tube 419 remains at a high level.

Normally, when tube 419 is conductive with its plate potential relatively low, the voltage at the control grid of tube 420 supplied by the voltage dividing network including the plate load resistor 665 of tube 419, resistor 666, and resistor 667 connected between (+) and (−) is also relatively low. Tube 420 is cut off as a result so that its plate potential and also the potential of the screen grid of tube 411 are at a high value. During the time that tube 419 is held in a nonconductive condition by the charge across condenser 418, the high plate voltage of tube 419 increases the grid voltage of tube 420 so that this tube conducts a relatively high plate current. As a result, the plate voltage of tube 420 and also the screen grid voltage of tube 411 are at a low value so that tube 411 cannot conduct in response to a positive pulse applied to its control grid.

The result of this operation is that tube 411 is gated so that it can conduct plate current only when condenser 418 is substantially discharged so that tube 419 can conduct. At all other times, while tube 419 is held in a nonconductive condition by the negative voltage across condenser 418 placed there as a result of the response of tube 411, tube 411 cannot conduct because of its low screen grid potential. In other words, when tube 411 is gated in the manner explained, its response to the first positive pulse applied to its control grid following its being so gated causes a removal of the gating potential applied to its screen grid so that it cannot respond to the succeeding positive pulses applied to its control grid. The grid voltage of tube 419 established by the negative voltage at the upper terminal of condenser 418 rises exponentially because of the discharge circuit provided for the condenser through resistor 443. This resistor presents a high resistance discharging circuit for condenser 418 in comparison with the low resistance of the charging circuit through diode 417. Condenser 418 discharges slowly, allowing the voltage at the control grid of tube 419 to rise toward ground potential. As the grid-cathode voltage of this tube reaches cutoff, it conducts plate current and the resulting decrease of its plate potential lowers the voltage on the control grid of tube 420. This action continues until tube 420 is cut off. The rise of plate potential of tube 420 then occurring produces a corresponding increase of the screen grid voltage of tube 411 so that this tube is then again properly gated, thereby permitting it to respond to a positive input pulse.

In the description of the call mark selector 269 that follows, an explanation will be given as to how the continued reception of station-call marks during a control code cycle maintains condenser 418 negatively charged so that tube 411 cannot become gated as long as these station-call marks are received. The description given here of the synch mark selector explains the necessity of providing a waiting or rest period at the end of each control code cycle during which no marks are transmitted. During such a rest period, neither the call mark selector nor the synch mark selector can respond and condenser 418 can then become discharged and permit the gating potential to be applied to the screen grid of tube 411. Tube 411 can then respond to the next mark pulse applied to it and this next pulse is the synch mark pulse for the next control code cycle. The variations of the gate control voltage appearing across condenser 418 are diagrammatically illustrated at line F of Fig. 10A. This voltage is shown as going abruptly negative in response to the synch mark and then rising slowly to its former value. Before the condenser becomes sufficiently discharged to gate the synch mark selector, it is again negatively charged in response to the call mark selector for station No. 1. This condenser 418 cannot discharge sufficiently to gate the synch mark selector until the rest period at the end of the cycle when no more marks are received from the control office.

The output of the synch mark selector 661 obtained from the plate of tube 411 is applied to the station counter 110 and to the call mark selector 269. The pulse applied to the station counter causes the various steps of the counter to be reset so that a proper count of the station-call marks that follow the synch mark is ensured. The pulse applied to the call mark selector 269 conditions this selector circuit so that it can properly respond to the call mark selector for station No. 1. The output pulse of the synch mark selector is shown at line C of Fig. 10A.

Call mark selector

The call mark selector 269 is supplied with an input from bus 401 which applies a positive pulse to the control grid of tube 413 for each occurrence of a mark in the received control code. The output of the call mark selector is applied to the synch mark selector 661 to hold that selector circuit inactive while station-call marks are continuously being received during the cycle. The output of the call mark selector is also applied to the station counter 110 so that the station-call marks in the control code may be counted by this station counter and so permit each field station to respond only to that portion of the control code intended for it.

The call mark selector 269 includes a tube 413 which is selectively gated so that it responds only to the pulses applied to it corresponding to the occurrences of station-call marks in the control code. It also includes diodes 439 and 422 which control the operation of a phantastron delay circuit including diode 424, cathode follower 426, and the pentagrid tube 427. In addition, a one-shot multivibrator including tubes 437 and 438 is provided.

Tube 413 is connected in much the same manner as the corresponding tube 411 of the synch mark selector. The cathode and suppressor grid of tube 413 are supplied with a positive voltage by their being connected through resistor 668, to (+). For this tube 413 to conduct, therefore, its control grid must be driven suitably positive above ground to raise the grid-cathode voltage above cutoff, and the screen grid of this tube must at the same time be made sufficiently positive with respect to the cathode. The screen grid of tube 413 is connected directly to the plate of tube 438. Tubes 437 and 438 are included in a one-shot multivibrator circuit which is similar to the multivibrator circuits included in the field station receiver 44. As in the one-shot multivibrators already described, the right-hand tube 438 is normally conducting because the control grid of this tube is connected through a resistor to (+). Therefore, the plate potential of this normally conducting tube is at a relatively low level, thereby maintaining the screen grid of tube 413 at the same low potential so that tube 413 cannot conduct even though positive pulses are applied to its control grid.

It was explained in connection with the synch mark selector 661 that the response of this selector circuit to the synch mark occurring at the beginning of a cycle causes a negative pulse to be applied to the call mark selector. This negative pulse is applied through condenser 421 to the cathode of diode 422. This diode 422 is normally nonconductive so that its cathode is substantially at ground potential. The negative pulse applied to this diode cathode causes this diode to conduct and thereby place a negative pulse, through condenser 425, across cathode resistor 423 of diode 424. The negative pulse appearing on the cathode of tube 424 initiates the operation of the phantastron delay circuit. Since phantastron delay circuits are well known in the art, a detailed description of this circuit will not be presented here. A complete description of such a delay circuit may be obtained from the book "Principles of Radar," by the M. I. T. Radar School Staff, 2nd edition, pages 2–58.

This phantastron delay circuit included in the call mark selector is preferably adjusted so that it produces a positive output pulse at the cathode of tube 427 at 9.5 milliseconds following the input pulse applied to the cathode of diode 424. This phantastron output pulse is shown at line D of Fig. 10A. This positive output pulse is applied to the control grid of multivibrator tube 437, and triggers this one-shot multivibrator to its opposite condition in which tube 437 is conductive and tube 438 is cut off. The circuit constants of this multivibrator are preferably so chosen that it remains in this condition for one millisecond. At the end of this time, the circuit is restored to its normal condition with tube 438 conductive and tube 437 cut off. During this one millisecond interval, however, that tube 438 is nonconductive, its high plate potential increases the voltage on the screen grid of tube 413 so that it can respond to a positive pulse applied from bus 401 and through condenser 412 to its control grid. The total effect then is that the response of the synch mark selector 661 to the synch mark initiates the timing action of the phantastron delay circuit and this delay circuit, after an interval of 9.5 milliseconds, causes the multivibrator to be operated so that tube 413 is suitably gated. Then at 10.5 milliseconds following the occurrence of the synch mark, the multivibrator restores itself to its normal condition and removes the gating potential from the screen grid of tube 413. This action of the station-call mark selector is illustrated at lines D and E in Fig. 10A wherein the output pulse 441 of the phantastron delay circuit is shown as occurring at 9.5 milliseconds following the output pulse 435 of the synch mark selector. The phantastron trigger operates the one-shot multivibrator which is then restored to its normal condition after one millisecond. Thus, the tube 413 is gated for a time interval which effectively overlaps the expected time of occurrence of the call mark selector for station No. 1, which arrives approximately 10 milliseconds following the occurrence of the synch mark.

When tube 413 conducts plate current in response to the station-call mark for station No. 1, the decrease of its plate potential applies a negative pulse to the cathode of diode tube 439. This negative pulse then places a corresponding negative pulse on the cathode of diode 424. Another timing action of the phantastron delay circuit is thus initiated and after 9.5 milliseconds, the multivibrator including tubes 437 and 438 is again actuated for a one millisecond interval. In this way, the occurrence of the call mark selector for station No. 1 causes tube 413 to be gated at the proper time for the occurrence of the call mark selector for station No. 2. In this way, each occurrence of a call mark selector causes the tube 413 to be properly conditioned for the expected occurrence of the following station-call mark. The control marks occurring in the code between successive station-call marks cannot produce an output from tube 413 even though they are all applied to the control grid of this tube.

The negative pulses appearing on the plate of tube 413 in response to the station-call marks (see line G, Fig. 10A) are also applied through condenser 445 to the cathode of diode 446 included in the synch mark selector 661. The cathode of diode 446 is normally supplied with a positive potential by the voltage dividing network including resistor 669 and resistor 670 connected between (+) and ground. The reason for making the cathode of this diode normally positive is that the nature of the gating potential applied to the screen grid of tube 413 produces relatively small spurious responses at the plate of this tube. Since the plate of diode 446 is substantially at ground potential, small negative pulses applied to the cathode of this diode do not drive the cathode below ground and, therefore, cannot cause this diode to conduct. As a result, these spurious pulses do not appear at the control grid of tube 419. When, however, tube 413 conducts in response to a call mark selector, the decrease of its plate potential is relatively large. The cathode of diode 446 is maintained at only a small positive voltage with respect to ground so that the large negative pulses applied to the cathode of this diode not only overcome this normal positive voltage but are also of sufficient magnitude to drive the cathode of this tube below ground potential. As a result, these negative pulses charge condenser 418 negatively and cause the control grid of tube 419 to be driven below ground potential. Each response of tube 413 to a call mark selector produces the same effect at the control grid of tube 419 as does the response of tube 411 to the synch mark. Each occurrence of either a synch mark or a station-call mark causes condenser 418 to become negatively charged; and while this negative charge appears across condenser 418, the screen grid of tube 411 is at so low a potential with respect to its cathode that it cannot conduct in response to the positive pulses applied to its control grid. Only when negative pulses are not applied from the plates of tubes 411 and 413 to the cathodes of diodes 417 and 446, respectively, for a sufficient length of time to permit condenser 418 to become discharged can the required high voltage be applied to the screen of tube 411 and so permit this tube to conduct when a pulse is applied to its control grid.

*Station counter*

The groups of marks for the various field stations are each identifiable as being associated with the control of a particular field station only by their time of occurrence in the cycle. Field station No. 5, for example, is designated as such because the group of marks for the control of this station occur immediately following the fifth station-call mark following the synch mark. For this reason, a station counter 110 is provided at each field station. By counting the station-call marks that follow the synch mark, this counter can provide a distinctive output when a preselected number of station-call marks have been received and thus condition the field station apparatus so that it can properly respond to the control marks for that station.

Essentially the station counter 110 is of a kind known as a seven-step, binary counter. As such, this counter is capable of counting a maximum of $2^7$ or 128 input pulses. This capacity readily permits counting the station-call marks for the maximum of 96 stations which may be included within this system in a cycle time of one second.

Each step of the station counter is basically an Eccles-Jordan type trigger circuit. The left-hand tube of each step of the counter is normally nonconductive and the right-hand tube normally is conductive so that these tubes have been designated as B and A tubes, respectively. Each step of the station counter is, with but a few exceptions, similar to the trigger circuit included in the 1 kc. gate source 34 as shown in Fig. 6A. One of these exceptions is that the various steps of the counter are actuated by pulses applied simultaneously to the plates of the two tubes included in each step instead of to their cathodes. Also, the plate of one or the other tubes of each step is connected through a switch contact and resistor to a bus 135.

To ensure that the A tube of each step is conductive at the beginning of each cycle, a positive pulse is applied to the control grid of each tube in response to the synch mark at the beginning of the cycle. The response of the synch mark selector 661 causes a negative pulse to be applied to the control grid of tube 451 included in the station counter 110. Tube 451 is normally biased above cutoff by the voltage dividing network including plate load resistor 415 of tube 411 included in the synch mark selector, and resistors 450 and 452 directly associated with tube 451. With this value of bias on tube 451, the conduction of plate current through the plate load resistor of this tube causes a relatively low voltage to be applied through resistor 454 to the control grid of tube 453. Cathode follower tube 453 is, as a result, biased to cutoff by the negative voltage obtained from the (—) source so that the cathode of this tube 453 is substantially at ground potential. Each negative pulse provided by the synch mark selector to the control grid of tube 451 produces an increase in plate voltage of this tube so that the control grid of tube 453 is driven above cutoff. This cathode follower tube then conducts momentarily and applies a positive pulse over bus 449 to the control grids of the A tubes of the station counter to ensure that each A tube is then conductive.

Each step of the station counter 110 receives an input of pulses which is supplied simultaneously to the plates of both tubes included in that step. These input pulses are obtained from the plate of the right-hand tube of the preceding step except for the first step of the counter which receives its input from the call mark selector. The input pulses to the first step are applied to the junction of resistors 139 and 140. Resistor 139 is included to prevent the input pulses from being short circuited through the power supply. Each negative pulse applied causes a momentary decrease in the plate voltage of both the A and B tubes of this first step. Since the voltages across condensers 127 and 128 cannot instantly be changed, the negative pulses appearing on the plates of these tubes also appear on the control grids of both tubes. The grid-cathode voltage of both the A and B tubes is momentarily driven below cutoff so that a switching action takes place, and the tube which was conductive becomes nonconductive. Before the first input pulse is applied to the first step of the station counter, the A tube of this step is conducting so that the voltage at the plate of this A tube is at a low level. When this first step is actuated in response to the input pulse from the synch mark selector, the A tube becomes nonconductive and the voltage at the plate of this tube then abruptly increases. A positive pulse is then applied through condenser 129 to the junction of resistors 130 and 132 associated with the second step. When the next input pulse is applied to the first step, the A tube of this step again becomes conductive, and the resulting decrease of its plate voltage causes a negative pulse to be applied through condenser 129 to the junction of resistors 130 and 132. In a similar manner, successive reversals of each step of the counter cause the successive pulses applied to the next step of the counter to be alternately of opposite polarities.

In a binary counter of this kind, each step of the counter after the first must respond only one-half as often as the preceding step. As was just explained, the successive output pulses of any one step caused by its successive reversals are alternately of one polarity and then the other. Thus, by causing each step of the counter to be responsive only to input pulses of a particular polarity, such next step then responds only to alternate output pulses of the preceding step and, therefore, responds at a rate which is one-half the frequency of response of the preceding step.

The manner in which each step is made to be responsive only to pulses of one polarity will now be explained. The nonconducting tube of any step has a grid-cathode voltage which is substantially below cutoff, and to cause such nonconductive tube to become conductive requires a positive pulse of considerable amplitude. The conducting tube of any step, however, has its control grid at substantially the same potential as its cathode so that for such tube to become nonconductive requires only that a negative pulse be applied to its control grid of sufficient amplitude to drive the grid-cathode voltage below cutoff. By causing the input pulses to each step to be of greater amplitude than that required to cut off a conducting tube but less than that amplitude that will cause a cut off tube to conduct, each step will respond only to negative input pulses. In this way, each step of the counter is able to differentiate between positive and negative input pulses. The first reversal of conduction of the tubes in the first step of the counter does not affect the conduction status of the tubes of the second step because making the A tube of the first step nonconductive causes a positive pulse to be applied to the plates of the tubes of the second step and such positive pulse cannot actuate this second step. When the first step is restored to its normal condition by the second pulse supplied to it from the call mark selector, the A tube of this step is again made conductive. A negative pulse is then applied through condenser 129 to the plates of the tubes of the second step so that this second step is then actuated. The third pulse from the call mark selector again switches the first step and makes its A tube nonconductive but this action produces no effect upon the second step. The fourth pulse applied to the first step restores this step to its normal condition and the resulting negative pulse applied to the second step also restores this step to its normal condition. Another negative pulse is then provided from the plate of the A tube of this second step through condenser 133 to the plates of the tubes comprising the third step with the result that this third step is actuated and its A tube made nonconductive. Thus, each application of a negative pulse to the first step causes a reversal of this step. The second step, on the other hand, is reversed only for every second pulse applied to the input of the first step; and, similarly, the third step is reversed only on every fourth pulse applied to the first step. The fourth, fifth, sixth, and seventh steps of the binary counter likewise are reversed on the eighth, sixteenth, thirty-second, and sixty-fourth pulses appearing in the input to the first step.

For each pulse applied to the input of the first step of the station counter 110, a particular condition exists for the total of the seven steps of this counter and this total condition of the steps is unique with respect to the number of pulses counted. The fact that the number of pulses counted determine the conduction status of the combined seven steps permits a distinctive output to be provided by the counter when a predetermined number of pulses have been counted in a manner that will now be explained.

The plate of either the A or B tube of each step of the counter is connected through a switch contact and resistor to a bus 135. The switches associated with the counter shown in Fig. 9B have been positioned, for example, in such a manner that the plate of tube B of the first step is connected through resistor 137 to bus 135. One or the other but not both plates of the tubes of each step are connected in this manner to bus 135.

Each counter is to respond after counting some preselected number of input pulses. After counting this number of pulses, the various steps of the counter are in some particular condition with respect to the conduction of the tubes of each step. The switches associated with each counter are so positioned that they connect the plate of the nonconducting tube of each step through a resistor to bus 135. For example, after counting four pulses all the steps of the counter are in their normal condition except step No. 3 which has its B tube conducting and its A tube nonconducting. The counter shown in Fig. 9B has its switches positioned so that a distinctive output will be provided after four input pulses have been counted because the B tube of each step is connected through a resistor to bus 135 except for step No. 3 which has its nonconducting A tube connected through a resistor to bus 135.

The switches provide a multiple path from the (+) source, over bus 135, to the control grid of tube 143. With respect to the first step of the counter, the plate of the B tube of this step is connected through the switch contact 136 and resistor 137 to bus 135. Similar connections are provided from the plates of the nonconducting tubes of all the remaining steps through corresponding resistors to the bus 135. In this way, seven multiple paths are provided from the (+) source through corresponding resistors to this bus, and since the corresponding plate resistors of the various steps are of equal values, the resistance in each of these multiple paths is equal. The plate resistor corresponding to resistor 139 of the first step is common to both tubes of that step and therefore conducts plate current from one or the other of the tubes of that step. However, since it is the nonconducting tube of each step which has its plate connected through a resistor to bus 135, no plate current passes through the individual load resistors such as resistor 140 associated with the first step of the counter. With no plate current passing through any of these individual load resistors, there can be no voltage drop across these resistors and, therefore, the voltage applied to the bus 135 from the (+) source is a maximum for this condition of the steps of the station counter. With respect to the condition shown in Fig. 9B, the application of the fifth input pulse to the first step of this counter would actuate this first step to its opposite condition wherein its A tube would be nonconductive. With the switches in the position shown, the path from the (+) source to the bus 135 would then include the plate load resistor of a conducting tube, namely, resistor 140 associated with the B tube of this first step. This plate current through resistor 140 would then decrease the increment of voltage provided by this multiple path and thereby reduce the voltage on bus 135.

The voltage on bus 135 is applied to the control grid of tube 143. This tube is provided with a cathode bias by means of voltage regulator tube 114 connected between the cathode of tube 143 and ground. The upper terminal of the voltage regulator tube is connected through a resistor to (+) to maintain this tube conductive so that a constant bias will be supplied to tube 143 by the voltage across the tube 114. This voltage regulator tube 114 provides a cutoff bias for tube 143 which can be overcome only by the maximum attainable voltage on bus 135, i. e., the voltage obtained when the seven multiple paths connected from (+) to bus 135 include only individual load resistors such as resistors 140 and 132 which are then not conducting plate current. When tube 143 is cut off, its plate voltage is at a high level and the high voltage that is then applied to the control grid of tube 456 overcomes the negative voltage applied to the grid of this tube from (—) so that this tube can conduct and supply a low plate output voltage to tube 457 of the control and indication stepper 109. When the voltage on bus 135 reaches its maximum, tube 143 conducts with the result that its plate voltage decreases, thereby also decreasing the grid voltage of tube 456 so that this tube then becomes cut off and increases the voltage on the screen grid of tube 457. In addition, a negative pulse is applied through the differentiating combination including condenser 431 to the control grid of tube 458 of the control and indication stepper 109 of Fig. 9C.

The maximum voltage occurring on bus 135 in response to the counting of some pre-selected number of pulses by the station counter is maintained only until the occurrence of the next input pulse to the station counter. At that time, the condition of one or more steps of the counter is reversed and the voltage on bus 135 is decreased. As a result, tube 143 is again cut off so that its plate voltage increases. Tube 456 then again conducts and its plate voltage decreases, thereby lowering the screen grid voltage of tube 457 included in the control and indication stepper. At the same time, a positive pulse is applied to the control grid of tube 458. This positive pulse cannot affect the conduction status of the tubes of this step because these steps of the stepper 109 discriminate against positive input pulses in the same manner as described in connection with the various steps of the station counter 110. Since the station-call marks counted by the station counter are 10 milliseconds apart, the outputs of tubes 143 and 456 are, in effect, 10 millisecond gates, the output gate of tube 143 being a negative gate and the output gate of tube 456 a positive gate. The positive or station gate provided by tube 456 is illustrated in Fig. 10A at line H.

*Control and indication stepper*

The control and indication stepper 109 at each field station includes, in addition to the various steps of the stepper, a gated tube 457, a peaker including tube 465, and a cathode follower tube 467. Tube 457 is gated by the station gate for the station so that it permits the pulses that control the stepping operation of the stepper to be effective only during the time that the field station is responsive to the portion of the control code intended for it.

The count pulse input supplied to the control grid of tube 457 is obtained over bus 404 from the receiver 44. The cathode and suppressor grid of tube 457 are provided with a potential above ground by the voltage divider network including resistors 471 and 677 connected between (+) and ground. For this tube to conduct plate current, not only must its grid-cathode potential be raised above cutoff but also its screen grid voltage must be suitably raised with respect to the voltage level of its cathode. As explained, the screen grid of this tube is gated by the station gate voltage obtained from the plate of tube 456 and shown at line H of Fig. 10A. As a result, this screen grid is normally at a relatively low potential, but after the pre-determined number of station-call marks have been received, a 10 millisecond positive gate is supplied by tube 456 and raises the screen grid potential of tube 457 sufficiently so that this tube can then conduct in response to the count pulses applied to its control grid from bus 404. Each time that tube 457 conducts in response to a positive pulse, its plate voltage decreases and supplies a negative pulse through condenser 463 and resistor 464 to the control grid of tube 465. This peaker circuit operates in the same manner as the corresponding peaker included in the cycle starter 177 shown in Fig. 6C. The result of the operation of this peaker is that it supplies a positive pulse at its plate for each negative pulse applied to its control grid. These positive pulses are applied through resistor 468 to the control grid of tube 467. Ordinarily, when the plate voltage of tube 465 is at a low level, cathode follower tube 467 is biased to cutoff so that its cathode potential is at ground. Each positive pulse applied to the input of this cathode follower causes this tube to conduct with the result that the potential at its cathode momentarily increases and supplies a positive pulse over bus 470 to the cathodes of the right-hand tubes of each step of the stepper.

The stepper shown in Fig. 9C is very similar to the control stepper 105 shown in Fig. 6C and operates in much the same manner. The initiation of the stepping operation occurs as a result of a negative pulse applied to the control grid of tube 458 of step No. 0. The negative pulse occurs as a result of the action of the R–C differentiating combination including condenser 481 as it responds to the leading edge of the 10 millisecond negative station gate supplied by the output of tube 143. Each step of the stepper is normally in the condition wherein its right-hand tube is nonconducting and its left-hand tube is conducting. The negative pulse that is applied to the control grid of tube 458 reverses the conduction status of the two tubes included in step No. 0 so that tube 458 becomes cut off.

At each station, the step No. 0 of the control and indication stepper is operated to the condition in which its left-hand tube is nonconductive in response to the negative pulse derived from the leading edge of the negative station gate. This station gate is initiated at each station by the response of the station counter to the pre-selected number of station-call pulses for that station. One millisecond after the station-call mark, a positive pulse appears on bus 470 and raises the cathode potential of tube 459 sufficiently so that this tube becomes momentarily cut off, thereby restoring this step No. 0 to its normal condition. With tube 458 again made conductive, the resulting decrease of its plate potential causes a negative pulse to be applied through condenser 460 and resistor 484 to the control grid of tube 461 included in step No. 1. This negative pulse reverses the condition of step No. 1 so that tube 461 becomes nonconductive. One millisecond later another positive pulse occurs on bus 470 that restores step No. 1 to its normal condition and reverses the condition of the tubes of step No. 2. In this way, the successive one millisecond positive pulses on bus 470 cause the control and indication stepper 109 to be operated throughout its various steps.

Each step of the control and indication stepper 109 is operated from its normal condition to the condition in which its left-hand tube is nonconductive by a negative pulse obtained from the preceding step is obtained as a result of this step's being restored to normal by a positive pulse appearing on bus 470. This positive pulse is also applied at the same time to the cathode of the right-hand tube of the step then being operated from its normal condition. Thus, although the negative pulse applied to the left-hand tube of such step from the preceding step tends to make such left-hand tube nonconductive and the right-hand tube conductive, the positive pulse then applied to the cathode of the right-hand tube tends to prevent this right-hand tube from becoming conductive. For this reason, the R–C differentiating combination acting upon the negative pulse supplied from any step to the succeeding step causes such negative pulse to be relatively broad; whereas, the peaker circuit associated with tube 465 causes the pulses applied to bus 470 to be sharply peaked. Consequently, the negative pulse applied to the grid of the left-hand tube of any step, including the pulse applied to the first step from the station counter, is of longer duration than the positive pulse applied to the cathode of the right-hand tube so that the negative pulse controls the operation of each step because it holds the grid of the left-hand tube at a negative voltage even after the decay of the positive pulse on bus 470. The positive pulses on bus 470, therefore, are effective to restore any actuated step to its normal condition wherein its right-hand tube is nonconductive, but these positive pulses do not prevent the succeeding step from being actuated to the condition in which its right-hand tube is conductive.

When any of the steps of the control and indication stepper following step No. 0 are in their normal condition with the left-hand tube conductive, a relatively low voltage is applied to the control grid of an associated cathode follower tube. At such time the cathode follower tube is then biased to cutoff by the negative voltage obtained from the (−) source. However, when a step of the stepper is actuated with its left-hand tube becoming nonconductive, the voltage applied to the associated cathode follower is increased and the cathode follower tube can then conduct. Thus, when step No. 1 is in the condition in which its tube 461 is nonconductive, the plate voltage of this tube is at a high level and this high voltage is applied through resistor 487 to the control grid of tube 486. The voltage supplied by the resistance network including resistors 487 and 488 and the load resistor 671 of tube 461 connected between (+) and (—) supply a cutoff bias for tube 486 when tube 461 conducts. The voltage on the grid of tube 486 rises above cutoff when tube 461 becomes nonconductive. When tube 486 conducts, the potential drop across its cathode resistor 489 raises the potential of its cathode above ground. This situation exists for only one millisecond at which time another positive pulse appears on bus 470 to restore the step to its normal condition and thereby drive the grid-cathode voltage of the associated cathode follower tube to cutoff. Similarly, as each step of the control and indication stepper is actuated, the increase of its output voltage causes a positive rectangular pulse to appear at the cathode of its associated cathode follower tube.

Each of the various steppers used in this communication system such as the control and indication stepper just described as well as the control stepper 105 and station gate stepper 106 (see Fig. 6D) at the control office is adapted to the particular operating characteristics desired of that stepper. Where particularly advantageous operating characteristics are desired as for the control office stepping operation, a stepper such as the control stepper 105 of Fig. 66 which is controlled by two individual stepping buses is used. In the control stepper 105, each odd step is controlled by one bus and each even step by another similar input bus. Each step is restored to the normal condition by a rise of potential occurring at the cathode of the right-hand tube of such step as it is pulsed by either bus 175 or 176. For example, when step No. 1 of the control stepper is operated from the normal condition so that its left-hand tube is nonconductive, the next occurring increase of potential on bus 176 causes tube 660 to become nonconductive so that the step is restored to its normal condition. The resulting decrease of plate voltage of tube 659 produces a negative pulse at the control grid of tube A of step No. 2. Simultaneously with the increase of voltage on bus 176, there occurs a decrease of voltage on bus 175 so that the cathode of the B tube of step No. 2 is at ground potential at the time of occurrence of the negative pulse at a grid of the A tube of this step. With the cathode of the B tube at ground potential, the B tube is more readily made conductive, thereby ensuring that the negative pulse at the grid of the A tube is effective to operate this step from its normal condition. In this stepper, there is thus no need for requiring that the coupling circuit from one step to the next produce a broadened pulse at the control grid of the left hand tube of such next stepping. The reason for this is that at the time of occurrence of the negative pulse obtained from the preceding step there is then no positive pulse applied to the cathode of the right hand tube of the step that is then to be operated from the normal condition. Thus, by providing two buses to produce the desired stepping operation with each bus pulsing alternate steps of the stepper and with the pulsing voltage thereon properly synchronized so that one is at ground potential while the other is above ground potential, an improved stepping operation results which ensures against a step being missed in the stepping operation.

Mark delay

The mark delay 343 is similar to the trigger delay 271 shown in Fig. 6E. The input voltage to the grid of tube 495 of this mark delay consists of the mark pulses obtained from receiver 44 over bus 401. The output pulses of the mark delay appear across cathode resistor 496 of tube 497 and are applied through resistor 498 and over bus 492 to the control grid of tube 491 included in the control storage circuits 293. These output pulses of the mark delay are applied through similar resistors also to the control grids of the left-hand tubes of each pair of tubes included in the control storage circuits. The amount of delay provided by the mark delay circuit is preferably about 500 microseconds for reasons which will subsequently be explained.

Control storage circuits and control relays

The control storage circuits 293 includes an Eccles-Jordan type trigger circuit for each pulse period of the control code on which a control mark may be transmitted. As was stated in connection with the description of the control office transmitting apparatus, a control mark may be transmitted in the embodiment of the invention shown in Figs. 6A–6L on any of the first five pulse periods following the first pulse period when the station call mark is transmitted. Five trigger circuits are, as a result, included in the control storage circuits and the operation of each is governed by whether a mark is transmitted upon a corresponding pulse period of the control code. Each of these trigger circuits controls the operation of a corresponding relay included in the control relays 51.

Each of the trigger circuits may be operated to one of two conditions, and, similarly, the associated control relay may be either picked up or dropped away. When one of these trigger circuits is in the condition wherein its left-hand tube is conductive and its right-hand tube is nonconductive, the voltage at the plate of the right-hand nonconductive tube is high. Since the plate of this right-hand tube is connected through a relay winding to ground, the high plate potential occurring when the trigger circuit is in this condition causes the relay winding to be energized with sufficient current to pick up its armature. When, however, the trigger circuit is in its opposite condition with its right-hand tube conductive and its left-hand tube cut off, the low plate potential of the right-hand tube causes the current through the winding of the associated relay to decrease to a value below that required to maintain its armature picked up.

The condition to which each trigger circuit is operated in response to the control code transmitted in one cycle of operation is maintained until that time in the next cycle of operation when the field station apparatus again becomes responsive to that portion of the control code intended for it. At such time, the positive station gate is supplied from the output of tube 456 included in the station counter (see Fig. 9B), through condenser 501 (see Fig. 9D), to the control grid of tube 502 included in the control storage circuits 293. The positive-going leading edge of this station gate appears as a positive pulse on the control grid of tube 502 because of the action of the R–C differentiating combination including condenser 501. Tube 502 is normally biased to cut-off by the voltage applied to its control grid by the voltage dividing network including resistors 672 and 673 connected between (—) and ground. When this tube is cut off, its cathode is at ground potential, but when a positive pulse is applied to its control grid, the tube momentarily conducts and the corresponding positive pulse appearing across cathode resistor 503 places a positive pulse over bus 504 which raises the potential at the control grid of the right-hand tubes of each trigger circuit. This positive pulse ensures that the right-hand tube of each trigger circuit is conductive at this time. As explained, when the right-hand tube of a trigger circuit is conductive, the associated control relay is energized with a small amount of current through its winding which is insufficient to pick it up.

The positive, one-millisecond pulses obtained from the cathode followers 344 are applied in succession to the control grids of the left-hand tubes of each trigger circuit. The positive delayed mark pulses are also applied from the mark delay 343 to the control grids of the left-hand tubes of all of the trigger circuits. The approximately 500 microsecond delay of each mark causes it to occur well within the limits of one of the positive, rectangular output pulses of the cathode followers 344. Thus, the delayed marks are shown in Fig. 10A at line P as occurring approximately within the midpoint of respective output pulses provided by the control and indication stepper and shown at lines I—O of Fig. 10A.

Each positive, one millisecond pulse applied from the cathode followers 344 to the grid of the left-hand tube of one of the trigger circuits increase the grid-cathode voltage of such left-hand tube, but this increase of grid voltage is not sufficient to make the left-hand tube conductive. If, however, during the time that a one millisecond pulse is applied, a delayed mark is also applied to the control grid of such left-hand tube from the mark delay 343, the resultant increase of voltage on the grid of such tube will make this tube conductive and the right-hand tube nonconductive. The result of such a switching action is to energize the associated control relay. In this way, any of the trigger circuits may be selectively operated to the condition in which its right-hand tube is nonconductive. The only requirement for such a reversal of a trigger circuit is that a delayed mark be applied to the grid of its left-hand tube at the time that its grid is being driven positively by a one millisecond pulse from an associated one of the cathode followers 344.

If the same control code is transmitted on several successive cycles to a field station, the trigger circuits will all be in the same condition at the end of the station period for that station as they were prior to the beginning of the station period. The leading edge of the station gate occurring at the beginning of the station period for a station restores each trigger circuit to its normal condition and thereby causes the energizing current for each of the associated relays to be below the value required to maintain the relay armature picked up. If the control code for the station is the same as in the preceding cycle, the trigger circuits which were out of their normal condition in the preceding cycle will again be operated to such condition. Consequently, each trigger circuit which was out of its normal condition is restored to the normal condition after an interval which is less than one station period. As a result, the associated relays are energized with the below normal current only for this same short period of time. Since the control relays have a normal drop away time that is greater than the length of one station period, the relays will not drop away during this time. If, however, a control mark is not transmitted on a particular pulse period after having been previously transmitted on such pulse period, the corresponding trigger circuit is not again operated from its normal condition. After a brief interval corresponding to the release time of the associated control relay, the relay will drop away.

Subcarrier modulator

The subcarrier modulator 54 at each field station receives an input of rectangularly shaped, one millisecond pulses from the indication contacts 53 and also receives a count input over bus 404 from the receiver 44. The output of the subcarrier modulator is applied to the FM carrier modulator and transmitter 55 and includes a full sine wave cycle for each mark to be transmitted in the indication code from that station and, since counts are not transmitted in the indication code, the subcarrier modulator does not supply any output corresponding to those pulse periods of the indication code where marks are not desired to be transmitted.

The subcarrier modulator comprises an amplifier and inverter including tube 511, a diode 680, a shock-excited or ringing oscillator including tubes 513 and 514, and additional amplifiers including tubes 519 and 520.

The rectangularly shaped, one-millisecond output pulses of the cathode followers 344 are applied not only to the control storage circuits 293 but also, over wires 90—95, to the indication contacts 53. These time-spaced pulses on the wires 90—95 are selectively applied to the single output wire 681 depending upon the position of the several indication contacts. The pulse appearing on bus 90, occurring as a result of the actuation of step No. 1 of the control and indication stepper, is always applied to bus 681 regardless of the positions of the indication contacts to thereby constitute the pulse period for the station-registering mark from this field station. The nature of the remainder of the indication code is determined by the selective action of the indication contacts as they are connected to the various buses 91—95 to the output bus 681 and thus permit certain of these one-millisecond pulses to be applied to the control grid of tube 511 included in the subcarrier modulator.

Tube 511 is normally biased to cutoff when no positive pulses are applied over bus 681 to its control grid. At such times, its plate voltage is high so that the grid-cathode potential of tube 513 produced by the voltage dividing network supplying the potential to the control grid of this tube is above cutoff. For each occurrence of a positive, one millisecond pulse to the control grid of tube 511, this tube conducts and the decrease of its plate potential then lowers the grid potential of tube 513 to the point where this tube becomes cut off.

The positive, one millisecond input pulses to the subcarrier modulator 54 occur, as previously explained, as a result of the stepping operation of the control and indication stepper 109. This stepper operates in response to the receiver count output so that the leading and trailing edges of the resulting one millisecond pulses are substantially coincident with the count pulses supplied by the receiver 44. These count pulses are applied from bus 404, through condenser 682, to the control grid of tube 514. This tube 514 is normally in a nonconductive condition because of the cutoff bias supplied through grid leak resistor 517. Each positive pulse applied from bus 404 to the control grid of this tube causes it to conduct momentarily. Thus, as each rectangularly shaped pulse applied to the subcarrier modulator from the indication contacts 53 causes tube 513 to be cut off, the positive trigger applied to the control grid of tube 514 simultaneously with the leading edge of such rectangularly shaped pulse causes this tube 514 to conduct momentarily. At the end of the positive trigger on the grid of tube 514, this tube again becomes nonconductive. For the remainder of the one millisecond interval during which tube 513 is cut off by the pulse from the indication contacts 53, an oscillatory variation of voltage appears across the parallel connected inductance 516 and condenser 518. These circuit elements are chosen to be of a value such that substantially sinusoidal voltage variations will appear at the cathodes of tubes 513 and 514 having a frequency of approximately 1,000 cycles per second. At the end of the one millisecond period, the removal of the input pulse to the subcarrier modulator from the indication contacts causes tube 513 to become conductive again so that the transient oscillations are terminated. Since the input pulses to the subcarrier modulator from the indication contact 53 are of one millisecond duration, and the shock excited oscillator is adjusted to produce a 1 kc. output, each application of a pulse causing tube 513 to be cut off causes substantially a complete cycle to be applied to the control grid of tube 519.

The positions of the indication contacts 53 may, at various times, cause successive time spaced, one millisecond pulses to be applied to the input of the subcarrier modulator. These successive input pulses will then hold tube 513 in a cut off condition for two or more milliseconds. During such time, the oscillations in the cathode circuits of tubes 513 and 514 would continue but with the successive cycles of the oscillatory output attenuated because of the inherent damping effect always present in a tuned circuit. For this reason, the positive pulses are applied once each millisecond to the control grid of tube 514. One millisecond after the cutoff potential is applied to tube 513 and a resulting complete sine wave cycle has been applied to the control grid of tube 519, the occurrence of a positive trigger on the grid of tube 514 causes this tube to become momentarily conductive. This action momentarily terminates the oscillation across inductance 516 and condenser 518, and the plate-cathode current of tube 514 that results restores the current through inductance 516 substantially to the value it had when the blanking pulse was first applied to the control grid of tube 513. Upon the decay of the positive input pulse to tube 514, this tube again becomes cut off and oscillations again are produced across the tuned circuit with the resulting output cycle of practically the same amplitude as the preceding cycle. In this way, the successive output cycles of the shock-excited oscillator are of substantially the same amplitude as at line G of Fig. 10B instead of successive cycles being reduced in amplitude by attenuation in the tuned circuit.

The diode 680 is connected between the control grid of tube 513 and ground and prevents the control grid of tube 513 from being driven positive upon the termination of the blanking pulses applied to this tube. Amplifier tube 519 amplifies the output oscillations of the ringing oscillator and is provided with class A cathode bias by the cathode resistor 493. The resulting voltage variations across the plate load resistor 683 of this tube are then applied through coupling condenser 479 to the control grid of cathode follower tube 520. This tube is also supplied with a class A bias by means of the cathode resistor 521. In operating as a cathode follower, the bias voltage developed across the relatively large cathode resistor 521 tends to produce too large a value of bias for this tube which is corrected by the positive potential applied to the control grid of this tube by the voltage dividing network including resistors 684 and 685 connected between (+) and ground. The output voltage of the subcarrier modulator appearing across cathode resistor 521 of tube 520 is then applied across potentiometer 522 included in the FM carrier modulator and transmitter 55.

The FM carrier modulator and transmitter is similar to the corresponding transmitter 42 at the control office and operates in much the same manner. This apparatus includes a free-running multivibrator having its normal steady bias voltage adjusted to give a frequency of operation corresponding to the desired center frequency of the indication code. In this embodiment of the invention, a frequency of 8.5 kc. has been mentioned as a desirable frequency for indications. The varying voltage supplied by the subcarrier modulator is superimposed upon the steady bias of the multivibrator by means of the variable tap on potentiometer 522 and adds to the direct voltage obtained across potentiometer 686 so that the output frequency of the transmitter varies above and below the center frequency according to the instantaneous value of the modulating voltage. The circuit constants have been so chosen in this form of the invention that the instantaneous frequency deviates about the center frequency by plus and minus 1 kc. for each sine wave cycle provided by the subscriber modulator. At all other times, when marks are not to be transmitted in the indication code, no varying output voltage is supplied by the subcarrier modulator and the multivibrator circuit including tubes 523 and 524 then operates at its center frequency.

The multivibrator output is amplified by tube 674, and the output of this tube then drives the grid of tube 526 which, with tube 525, is included in a push-pull amplifier. A phase inverter including tube 675 provides the input voltage for tube 525. The output of this push-pull amplifier is transformer-coupled to the input of the band-pass filter 46. This band-pass filter 46 also has a relatively narrow pass band so that the output of this filter applied to the line wires 40 includes but a relatively narrow frequency spectrum. Since the indication code includes but one character, a mark, experiments show that only a relatively narrow band of frequencies need be transmitted over line wires 40 to permit satisfactory reception at the control office of the intelligence contained in the indication codes from the various field stations.

The field stations transmit their indications to the control office one at a time in sequence. To prevent interference, the transmitter at each field station must operate to transmit carrier only during the time that is allotted to such station for the transmission of indications. This period is the same as that during which controls are received at that station. For this reason, a blanking voltage is applied to the push-pull output amplifier of the FM carrier modulator and transmitter. This blanking voltage is removed only when indications are to be transmitted.

More specifically, a gate inverter 384 (Fig. 9D) including tubes 529 and 532 is provided to supply the desired blanking control. The input voltage for tube 529 is obtained from the plate of tube 456 included in the station counter 110 (see Fig. 9B). Normally tube 456 is conductive so that its plate voltage is relatively low. As a result, tube 529 is biased to cutoff by the connection of its grid through resistor 530 to (—). With tube 529 cut off, a relatively high potential is applied to the control grid of cathode follower tube 532 from the plate of tube 529. The resultant grid-cathode voltage of tube 532 is above cutoff so that this tube then conducts. The resulting voltage at the cathode of tube 532 is then applied to the common cathodes of tubes 525 and 526 included in the FM carrier modulator and transmitter. This positive voltage on the cathodes of tubes 525 and 526 produces a cutoff grid-cathode voltage for these tubes so that they cannot supply an output through the band-pass filter 46 to the line wires 40.

During the time that a field station is made active by the reception of the proper number of station-call marks, tube 456 included in the station counter is nonconductive so that a relatively high voltage is applied to tube 529 included in the gate inverter 384. Consequently, tube 529 is conductive. With this tube conductive, its plate voltage is at a low value and tube 532 is, therefore, biased to cutoff as a result of the negative voltage applied to its control grid from (—) through resistor 531. With no current flow through cathode resistor 533, a blanking voltage is no longer applied to the cathodes of tubes 525 and 526. This removal of the blanking voltage continues until the next station-call mark is received at the field station. In this way, the FM carrier modulator and transmitter 55 is prevented from supplying an output to line wires 40 except during the particular period of time in each cycle that is allotted to the transmission of indications from such station.

*Operation of complete field station apparatus*

The preceding description has explained the manner of operation of the major components included in the apparatus at each field station. The present description will serve not only as a summary of the description already given but will illustrate the manner in which these components cooperate to produce the desired results at the field stations.

The frequency modulated control code transmitted from the control office over line wires 40 is received at each field station by a receiver 44 which receives its input energy from the line wires through a band-pass filter 43. The receiver amplifies the received signal and limits its amplitude variations. A squelch circuit is operable to make the receiver output inactive when the strength of the incoming signal is below some predetermined value. A discriminator circuit converts the received frequency-varying carrier signal into a signal, still at the carrier frequency, whose amplitude varies according to the instantaneous frequency of the input signal. The resultant amplitude varying signal is then rectified and the high-frequency components are filtered to give an amplitude varying wave of substantially sine wave form. This resulting signal is then rectified so that only the half cycles of one polarity out of each complete cycle are retained. The retained half cycles are of either a high or low amplitude depending upon whether the input is of high or low frequency deviation and are applied as an input driving voltage to each of two one-shot multivibrators. The input to these multivibrators are differently attenuated so that one multivibrator responds only to a large amplitude input, while the other responds to either low or high amplitude input pulses. The multivibrator outputs are then both applied to respective peaker circuits so that two pulsing outputs of the receiver are provided; one of these outputs includes a pulse for each occurrence of a mark in the control code, and the other provides a pulse for each occurrence of a mark or a count in the control code.

The mark pulses are applied to the input of the synch mark selector 631. This synch mark selector includes a tube 411 having its screen grid selectively gated in such a manner that when tube 419 included in the selector is nonconductive, the screen grid of tube 411 is not suitably gated and this tube can then not respond to the mark pulses applied to its control grid. Tube 419 is maintained in its nonconductive condition during each cycle as long as controls are transmitted by a negative voltage maintained across condenser 418. Condenser 418 is charged to this negative voltage as a result of the response of the synch mark selector to the synch mark at the beginning of a control cycle and this voltage is maintained across condenser 418 throughout the rest of the cycle as long as controls are transmitted by the continued response of the call mark selector 269. Only during the rest period at the end of each control cycle after all controls have been transmitted can condenser 418 discharge and permit tube 419 to become conductive. When this action occurs, tube 411 responds to the next mark pulse applied to its input and this next mark pulse is the synch mark pulse of the next cycle. As tube 411 responds to this synch pulse, condenser 418 is again negatively charged with the result that the gating potential is again removed from the screen grid of tube 411.

The call mark selector 269 includes a phantastron delay circuit whose timing operation is initiated by each response of either the synch mark selector or the call mark selector. At the end of the interval timed by the phantastron delay circuit, a gate is provided to tube 413 so that this tube can conduct in response to the next mark pulse applied to its control grid. The interval timed by the phantastron delay is selected so that its output gate is effective on tube 413 just prior to the expected occurrence of the next station-call mark. The required gating potential for the screen grid of tube 413 to accomplish this purpose is obtained from the output of a one-shot multivibrator which is actuated by the output pulse of the phantastron delay. After a brief period, such as one millisecond, the multivibrator restores itself to its normal condition and the gating potential is then again removed from the screen grid of tube 413. The response of the call mark selector during the time that this tube is gated again initiates the timing of the phantastron delay so that, upon the occurrence of the next station-call mark, tube 413 is again properly gated.

The output pulse of the synch mark selector is applied to each step of the station counter 110 to ensure that all the steps of this counter are in the proper condition prior to the counting of the station marks. This action effectively resets the counter to zero so that a proper count of the station-call marks to be received in the new cycle may be obtained. The input pulses to be counted by the station counter 110 are obtained from the call mark selector 269. Each total of the input pulses applied to the counter causes the total of seven steps of this counter to be in a different condition. For any combination of positions of the switches associated with the steps of this counter, a particular number of input pulses to the counter causes its steps to be actuated to the condition in which the plate of the nonconducting tube of each step is connected through a switch contact to a bus 135. Under this condition, the voltage on bus 135 is a maximum, and only for this condition does tube 143 conduct. The next input pulse applied to the station counter 10 milliseconds later changes the condition of one or more steps of the counter so that the voltage on bus 135 decreases and tube 143 again becomes nonconductive. The result is that a 10 millisecond gate is supplied by the station counter.

The control and indication stepper 109 includes a tube 457 which has applied to its control grid the count pulses from the receiver 44. This tube 457 has its screen grid gated by the positive station gate supplied by the station counter 110 so that it can provide output pulses in response to the count pulses only during the time of application of this station gate. During the time that this station gate is applied, tube 457 responds to the count pulses and causes positive pulses to be applied over bus 470 to the various steps of the control and indication stepper. The negative-going leading edge of the negative station gate provided by the station counter supplies a negative pulse to the input of step No. 0 of the stepper 109 to actuate this step to its opposite condition. The positive pulse appearing on bus 470 one millisecond later restores step No. 0 to its normal condition and actuates step No. 1. On succeeding milliseconds, the positive pulses on bus 470 cause the stepping operation of the code stepper so that each step of this stepper is actuated to its opposite condition for a one millisecond interval. During the time that each step is so actuated, its associated cathode follower tube included in the cathode followers 344 is conductive and supplies an output pulse at its cathode.

The mark delay 343 supplies an output pulse that is delayed substantially 500 microseconds with respect to each corresponding input pulse. The input to the mark delay is obtained from the mark pulses supplied by the receiver 44, and the output pulses of the mark delay are applied over bus 432 to the various steps of the control storage circuits 293. The resulting delayed marks now fall within the limits of respective pulse periods demarcated by the stepper 109 as shown in Fig. 10A. The delayed station-call mark 442A shown at line P now occurs within the one millisecond pulse provided by step No. 0 of the stepper 109 (see line I). Since the station-call mark for a station is transmitted each cycle and does not actually represent a portion of the control code intelligence, the output pulse of step No. 0 is not repeated by a cathode follower and applied to the input of a corresponding control storage circuit. The delayed mark 499A corresponding to the first control mark immediately following the station-call mark falls within the time limits of the one-millisecond output pulse of step No. 1 of the stepper 109 (see line J). The delayed control mark 508A (see line P) corresponding to the control mark 508 (see line B) occurring in the fourth pulse period following the station-call mark 442 similarly now occurs during the time of the one-millisecond output pulse provided by step No. 5 (see line N).

Both the delayed marks and the time-spaced one millisecond pulses provided by the cathode followers 344 are applied to the inputs of the corresponding control storage circuits 293. Once actuated, each of these control storage circuits is held in its actuated condition with its left-hand tube conductive until that time in the next cycle when this field station again is made responsive by the station counter 110 to the control code intended for it. At such time, the leading edge of the positive station gate causes a positive pulse to be applied to tube 502 and the output pulse at the cathode of this tube is then applied to each of the control storage circuits to restore them to their normal condition. In such condition, the right-hand tube is conductive thereby causing each of the associated control relays to be energized with a below normal current. For any of these control storage circuits to be again operated to its opposite condition with its left-hand tube conductive requires that a delayed mark be applied to the control grid of such left-hand tube, during the time that a positive, one-millisecond pulse is also applied to such control grid from an associated one of the cathode followers 344.

In Fig. 10B, the outputs of the control storage circuits 1 and 4 are diagrammatically illustrated at lines A and D supplying a high output voltage, thereby indicating that these control storage circuits were operated in the preceding cycle to the condition in which the output voltage supplied to its associated relay is at a high level, i. e. left-hand tube conductive. The remaining control storage circuits are diagrammatically shown at lines B, C, and E as not having been operated in the previous cycle. Upon the occurrence of the leading edge of the station gate shown in Fig. 10A, control storage circuits 1 and 4 are restored to their opposite conditions so that all the control storage circuits are in the same condition with their right-hand tubes conductive and their associated relays energized with only a low value of current.

The delayed mark 499A (line P, Fig. 10A) occurs within the time limits of step No. 1 of the stepper 109 (line J). Thus, during the time that the one-millisecond output pulse of cathode follower 486 associated with step No. 1 is applied to the control grid of tube 491, delayed mark pulse 499A is also applied to the control grid of this tube. These two positive voltages on the grid of this tube drive its grid-cathode voltage above cutoff so that this trigger circuit is actuated to its opposite condition. When tube 500 becomes nonconductive, its plate voltage increases and this increase of voltage across the winding of relay R1 then permits sufficient current to pass through these windings so that this relay can be picked up. When no delayed marks occur during the time that output pulses are supplied by the cathode followers associated with steps 2 and 3 of the stepper 109 (line P, Fig. 10A), the second and third control storage circuits controlling relays R2 and R3, respectively, cannot be operated to their opposite conditions. These relays R2 and R3 must, as a result, remain energized with only a low value of current. The same situation holds true with respective to the control of relay R5. The occurrence of delayed mark 508A during the time that an output pulse is provided by the cathode follower associated with step No. 4 of the stepper 109 causes the 4th control storage circuit controlling relay R4 to be actuated to its opposite condition so that relay R4 is again fully energized. Although the windings of relays R1 and R4 are momentarily energized with a current having a value below that which would ordinarily permit them to remain picked up, this period of low energization is but relatively short and is, in fact, only of a few milliseconds duration so that these relays cannot drop away during this time. As a result, the control relays 51 remain either steadily picked up or dropped away as long as the control code for a station is not altered.

The time-spaced, one millisecond pulses supplied by the cathode followers 344 are selectively applied by the indication contacts 53 to bus 681 over which they are applied to the input of the subcarrier modulator 54. The one-millisecond pulse on bus 90 is not subject to the control of the indication contacts 53 so that it is always applied over bus 681 to the subcarrier modulator, thereby permitting the subcarrier modulator to control the FM carrier modulator and transmitter 55 for the transmission of the station-registering mark on this first pulse period.

The subcarrier modulator includes a shock-excited oscillator which is adjusted to supply an output of substantially sine wave form with a frequency of 1 kc. Each one-millisecond pulse applied to the subcarrier modulator permits the shock-excited oscillator to supply an output during the one-millisecond period that such pulse is applied; and, since the oscillator output is at a frequency of 1 kc., a full sine wave cycle is supplied for each such pulse applied to the subcarrier modulator. Where successive pulses are applied, the shock-excited oscillator has its operation re-initiated on successive milliseconds by the receiver count pulse output so that successive sine wave cycles are of substantially the same amplitude.

The resulting output of the subcarrier modulator includes substantially a full sine wave cycle for each time-spaced pulse that the indication contacts 53 allow to be applied to the input of the subcarrier modulator. This output is applied as a varying bias to a free-running multivibrator included in the FM carrier modulator and transmitter. The steady value of the bias for this multivibrator causes it to operate at the center frequency, and the instantaneous variations of the bias produced by the subcarrier modulator output cause the multivibrator frequency to vary above and below its center value. The resulting frequency modulated square wave output is then amplified and applied through a band-pass filter 46 to line wires 40 for transmission to the control office.

The gate inverter 384 supplies a blanking pulse to the cathodes of the push-pull output amplifier tubes of the transmitter so that the transmitter can be active only during the time that the field station is responsive to the part of the control code cycle that controls are transmitted to such station. This blanking pulse is coincident with the station gate as illustrated at line H of Fig. 10A.

The one-millisecond pulse period demarcated by step No. 0 of the control and indication stepper 109 is not utilized in the indication code. In other words, no code character is initiated in the indication code immediately upon removal of the blanking pulse from the transmitting output. The first character is transmitted upon the second pulse period as demarcated by step No. 1. This arrangement is provided for the indication code to prevent transient disturbances in the control office receiver upon the reception of carrier from interfering with the received code characters. More specifically, experience has shown that as the various field station transmitters successively transmit to the control office, the successive bursts of received carrier at the control office receiver cause transient disturbances that tend to interfere with the proper reception of the control code characters. If, as in the present system, the first indication code character from each field station is not transmitted until a brief interval after the establishment of carrier from such station, the transient produced in the control office receiver will have subsided sufficiently to prevent its interfering with proper reception of the indication code.

The number of steps provided for the control and indication code stepper depends upon the maximum of either controls or indications that are to be transmitted to or from the station respectively. This stepper demarcates the pulse periods for the received control code and thus permits determination of the time of occurrence of the various control marks so that the nature of the control intelligence can be ascertained. This stepper also demarcates the pulse periods for the indication code. For the indication code, step No. 1 of this stepper demarcates, as already explained, the pulse period allotted for the transmission of the station-registering mark from this station. An additional step, following step No. 1, must then be provided for each of the pulse periods on which indication marks may be selectively transmitted. For this reason, the number of steps included in the control and indication code stepper must include one step for each pulse period on which an indication mark may be transmitted plus one additional step (step No. 1) for the station-registering mark. If the number of steps so provided is less than the number of pulse periods on which control marks may be transmitted from the control office, then the number of steps of the stepper must be increased to provide this greater number of steps.

*Field station application circuits*

The relationships between the decoding apparatus 50, the control relays 51, the controlled devices 52, and the indication contacts 53 are shown in detail in Fig. 5 for a typical field station. The decoding apparatus 50 is shown in block form in Fig. 5 the same as in Fig. 2, but its output is indicated as directly controlling the control relays 51 which are shown as including relays R1, R2, R3, R4, and R5. The particular manner in which these five control relays are individually energized by code pulses transmitted over the system has already been described in detail. Relays R1 and R2 are controlled by a switch machine control lever SML1 in the control office, while the relays R3, R4, and R5 are controlled by a signal control lever SL1 in the control office.

More specifically, when the switch machine control lever SML1 is in its normal position, a control is repeatedly transmitted to maintain relay R1 energized and relay R2 deenergized. If the lever SML1 is moved to its reverse position, no control is transmitted to the relay R1 and it is released, but a control is then repeatedly transmitted to energize relay R2. The transmission of a mark on any control pulse period energizes the relay associated with that pulse period. Thus, if relay R1 is to be deenergized and relay R2 energized at any field station, the control code for that station will not include a mark on the first control pulse period but will include a mark on the next control pulse period.

In a similar manner, the signal lever SL1 when in its normal or stop position causes the energization of relay R4, but when it is in its signal-right or signals-left position it causes the energization of either relays R3 or R5, respectively. These relays are not maintained steadily energized in response to the signal lever operation, since it is desired that the signals may be controlled as stick signals, i. e., they may be automatically returned to stop upon the passage of a train. For this reason, the signal lever SL1 has associated with it a suitable push button which can be temporarily actuated to make the particular signal control temporary in duration.

The controlled devices 52 shown only in block form in Fig. 2 is shown in greater detail in Fig. 5 and includes the usual switch machine and signals diagrammatically illustrated as associated with an outlying track switch with the usual related control devices. More specifically, the switch points W are shown as being controlled by a switch machine SM, which may be of any suitable type such as shown in the patent to W. K. Howe, Pat. No. 1,466,903, dated September 4, 1923. This switch machine SM has associated therewith a suitable point detector mechanism and switch position indicating relays which may include two correspondence relays NP and RP. The relay NP is energized only when the track switch points W are operated to their normal positions and locked by the switch machine SM in correspondence with the switch machine control provided by the relays R1 and R2. The relay RP is similarly energized only when the switch points W are locked in the reverse position.

A detector track section T is shown as having associated therewith a track battery TB connected to the track rails through the usual series limiting resistor 79 at one end of the section together with a track relay TR connected across the other end of the section. The track relay TR is indicated as being associated with the track section T by the use of a dotted line. The track relay TR is normally energized, and its front contact 82 normally energizes a slow release repeater relay TP by an obvious circuit.

The track switch also has associated therewith suitable signals 60, 61, 62, and 63 of any well known type, such as search light, semaphore, or color light signals. These signals, shown as color light signals, govern traffic in opposite directions over the switch points, and can be cleared only when the switch points W are in full normal or reverse locked positions in correspondence with the then existing switch control for the switch machine. This control over the signals has been indicated diagrammatically by taking the dotted lines representing the signal control through contacts of the relays NP and RP, such as contacts 77 and 87. The signal control may be provided in accordance with the usual practices in a centralized traffic control system, the various details of which have not been fully shown.

A signal-at-stop relay M is associated with the signals and is normally energized when all of the signals 60, 61, 62, and 63 are at stop, but is deenergized whenever any one of these signals is cleared. Also, a lock relay L has been indicated as associated with the switch machine control, and this relay L is dropped away whenever a signal is cleared or the detector track section T is occupied by a train.

Under normal conditions, the switch points at a field station are positioned for main line traffic and all of the signals associated with that switch are at stop. This normal condition has been illustrated in Fig. 5 in which the control relay R1 is shown picked up and the remainder of these relays are shown dropped away. Under this condition, energy is applied from (+), through front contact 64 of lock relay L, back contact 65 of control relay R2, front contact 66 of control relay R1, over wire 67, through the switch machine SM, to (—). The switch machine SM has thus been operated to its normal position in which it remains permitting main line traffic over the switch points when the signals are properly cleared.

On the other hand, if it is desired to route traffic onto the turn-out track, the switch machine lever SML in the control office is operated to its opposite or reverse position. This action results in the deenergization of the relay R1, and the energization of the relay R2. Under this condition, energy is supplied to the switch machine SM from (+), through front contact 64 of lock relay L, back contact 66 of relay R1, front contact 65 of relay R2, wire 70, through the switch machine SM to (—). The switch machine SM is thus controlled to its reverse position, and the initial existence of such a control results in the deenergization of both correspondence relays NP and RP. Upon the completion of the operating stroke and the locking of the switch points W in their reverse positions, the reverse correspondence RP is energized.

Let us assume that the switch points W are in the normal position as shown, and that the signal 60 is to be cleared for eastbound traffic. To accomplish this function, the control levers SML1 and SL1 are moved to their proper positions to effect, through the medium of the communication system, the energization of relays R1 and R3 while the remaining relays R2, R4, and R5 are deenergized. With this condition of relays R1 and R2, the switch machine SM is controlled to the normal position as shown and for reasons above explained. The energization of relay R3 completes a pickup circuit for relay RD from (+), through a circuit including back contact 71 of relay R4, back contact 80 of relay R5, front contact 72 of relay R3, back contact 73 of relay LD, windings of relay RD, to (—). As soon as relay RD picks up, a stick circuit is completed including front contact 75 of relay TR, back contact 76 of relay R4, front contact 74 of relay RD, back contact 73 of relay LD, windings of relay RD, to (—). In this way, even though that part of the control code causing the energization of relay R3 is temporary and permits this relay R3 to drop away after a short interval, the energization of the relay RD is maintained through its stick circuit dependent upon the continued energization of the track relay TR.

Assuming that the relay NP is picked up indicating a correspondence between the switch control and the actual switch position, then the closure of front contact 68 of relay RD is effective to energize the signal control circuit for signal 60 which includes a front contact 78 of relay NP. These signal control circuits have been abbreviated and the signal control should include all of the usual safety conditions which are ordinarily employed in a case of this kind. With the signals cleared, the lock relay L is, of course, dropped away, thereby opening front contact 64 so that the switch machine SM cannot be inadvertently controlled to a different position.

When the train accepts a signal 60 and passes on to the detector track section T, the track relay TR is deenergized which is in turn repeated after an interval by its repeater relay TP. During this interval, the front contact 75 is open prior to the closure of back contact 83, so that the stick circuit of the relay RD is temporarily opened causing it to drop away and thereby hold the signals 60 and 61 at stop. A subsequent signal control can be almost immediately transmitted to pick up the relay RD again if desired, because the back contact 83 is closed after this short interval and upon the complete passage of the train, the track relay TR picks up closed front contact 75 before its repeater TP picks up to open back contact 83.

Since the pickup circuits of the relays RD and LD are interlocked by having the pickup circuit of each relay included a back contact of the other (see contacts 73 and 81), the picking up of one of these relays to clear one signal cannot possibly permit the energization of the other relay at that time. If it is desired to reverse the direction of traffic, then it is necessary for the stop control to be transmitted by moving the signal lever SL1 at the control office to its center position. As a result, a control is transmitted that causes relay R4 to be picked up and open the back contact 76. The opening of this contact releases either the relay RD or LD as the case may be so that the subsequent picking up of the relay R3 or R5 will then pick up the proper relay RD or LD for the newly desired direction of traffic. Such a reversal in the direction of traffic is subject to the control of suitable approach locking circuits and the like which will prohibit the reversal of traffic for a certain time interval following the initial energization of one of these relays when there is a train in approach to the signal which was last cleared.

From the above description it should be apparent that the signals may be cleared in both directions and for main line traffic or the turn-out traffic dependent upon the position of the switch.

The relays NP, RP and T, in addition to their function with respect to the control of apparatus at the field station, also perform a function with respect to the transmission of indications from the field station to the control office. As already described, the relays NP and RP repeat the position of the switch points; whereas, the relay T is a track relay and its condition is governed by the occupancy conditions of the detector track section T. The relay M, on the other hand, is governed by the condition of the various signals at the field station and this relay is energized only when all of the signals display a stop aspect. Since the particular signal to be energized is selected in accordance with the direction of traffic and also in accordance with the position of the switch points, the dropping away of the relay M following the transmission of a control to the field station calling for the energization of one of the signals at that field station is an indication that such control has been properly executed and that the proper signal has been energized.

The decoding apparatus 50 includes steppers which demarcate the successive pulse periods for the field station both for the reception of controls and for the transmission of indications. The output of these steppers may be considered as connected to the wires 90—95. The first wire 90 passes through the indication contacts without interruption for the purpose of transmitting a station-registering mark; whereas, the other wires 91—95 are governed by the indication contacts 96, 97, 98, 99, 100, 101 and 102. These wires then pass through suitable rectifier units through the subcarrier modulator 54 to effect the transmission of an indication mark for the respective steps in which these individual circuits are closed. The rectifier units are employed for isolating the various circuits so that a common connection can be supplied to the subcarrier modulator 54.

By way of illustration, when the switch machine at a field station has been operated to its normal condition, the NP relay will be picked up and the RP relay released because these relays repeat the normal and reverse positions of the switch points respectively. Consequently, a direct connection is provided from the decoding apparatus 50, over wire 91, through front contact 96 of relay NP and back contact 97 of relay RP to the subcarrier modulator 54. Thus, a mark is transmitted on the particular pulse period represented by the one-millisecond pulse applied to bus 91. By analogy, it can be seen that no such pulses will be applied over buses 92 and 93 with relays NP and RP in this condition. At the control office, the reception of an indication mark on the first pulse period instead of on the second or third is an indication that the switch machine has been operated to its normal condition.

CONTROL OFFICE RECEIVING APPARATUS

Receiver

The control office receiver 56 (see Figs. 6G and 6H) is, with but a few exceptions, similar to the receiver 44 at each field station. Since the indication codes from the field stations include only marks and no counts, the receiver at the control office need supply only a single output including a pulse for each received mark. For this reason, only a single one-shot multivibrator need be included in the receiver at the control office as compared to the two similar multivibrators that are included with the receiver at each field station. This one-shot multivibrator includes tubes 542 and 543 which receive their input from the cathode resistor 540 of cathode follower tube 541. The result of the operation of the control office receiver is that, from its input supplied from line wires 40 through bandpass filter 45, it supplies output pulses from its cathode follower tube 545 to control the rest of the control office receiving apparatus. This output of the cathode follower tube 545 comprises, as already explained, a single positive output pulse corresponding to each occurrence of a mark in the received indication codes from the various field stations.

Odd and even station-registering mark selector

The various field stations transmit their indication codes to the control office contemporaneously with, and in response to, their reception of that portion of the control code intended for each respective station. Therefore, substantially the only delay involved in the reception of an indication code from a station following the transmission of the control code to that station is the propagation time involved in transmitting the frequency modulated wave from control office to a field station and back again to the control office. Ordinarily this propagation time is relatively short so that at least the first few characters of the indication code from a station are received at the control office before the end of the station period allotted to the transmission of controls to that station.

The registering mark selector circuits 88 and 260 include tubes 569 and 570 which are selectively gated so that they respond only to the station-registering marks from the odd and even-numbered field stations respectively. Tube 569 included in the odd registering mark selector 88 is gated so that, although the entire receiver mark output is applied to its input, it can respond to input pulses only during the station periods for the odd-numbered field stations when controls are transmitted to those stations. As just described, at least the first part of the indication code from a field station, including the station-registering mark, is received at the control office before the end of the station period for such station. Consequently, when the station-registering mark from an odd-numbered field station is received at the control office, tube 569 is gated so that it can conduct plate current in response to the corresponding pulse applied to its input. During the time that tube 569 is so gated, various indication marks following the station-registering mark may also be applied to the input of tube 569. It is desirable, however, that this selector circuit be responsive only to the station-registering marks, and not to the indication marks occurring between successive station-registering marks. For this reason, the output pulse of the selector circuit, as it responds to the station-registering mark, is effective, through the associated stepper gate circuit 89, to operate the blanker 254 so that this blanker will render both tubes 569 and 570 ineffective to the following mark pulses applied to their input. This action of the blanker 254 is maintained for a definite time interval that is measured by a timing circuit included in the gate restorer 355. This removal of the blanking action on tubes 569 and 570 does not occur, however, until sufficient time has elapsed to allow all the indication code from that field station to be received at the control office.

The next indication code received at the control office originates at an even-numbered field station. At such time, tube 570 is gated so that only this tube can respond to the first mark applied to both tubes 569 and 570. The response of tube 570 to the station-registering mark from the even-numbered field station similarly causes the associated station stepper gate circuit 261 to be effective upon the blanker so that both tubes 569 and 570 are again unresponsive to the indication mark pulses applied to their input following the occurrence of such station-registering mark.

Tubes 569 and 570 are preferably pentode type tubes having their cathodes at a suitable positive potential above ground by means of a voltage dividing network such as that associated with tube 569 and including resistors 535 and 536 connected between (+) and ground. The input pulses to the control grids of tubes 569 and 570 are applied over bus 546 and through an R-C differentiating combination including condenser 568 and resistor 547. The screen grids of these tubes are respectively gated by the potentials appearing on buses 211 and 212. The potential on bus 211 is at some value above ground only during the time of transmission of controls to the odd-numbered field station as shown at line K of Fig. 7A. Similarly, bus 212 is at a positive potential above ground only during transmission to the even-numbered field stations as indicated at line J of Fig. 7A. Thus, the voltages on these two buses vary alternately between ground potential and some suitable positive potential. When the voltage on the screen grid of either tub 569 or 570 is at ground potential, the resulting screen-cathode voltage is substantially negative because of the positive voltage continually applied to the cathodes of these tubes by the associated voltage dividing network. Under this condition, these tubes cannot conduct plate current even though the potentials at their other electrodes are then at a suitable operating level. However, when the voltage at the screen grid of either of these tubes is raised above ground potential, that tube can then conduct plate current in response to positive pulses applied to its control grid, provided that suitable operating potentials are at the same time applied to its other electrodes. In this manner, these tubes 569 and 570 are alternately gated by the potentials on buses 211 and 212 so that they can respond to the station-registering marks from the odd and even-numbered field stations respectively. A detailed description of the way in which these selector circuits are rendered ineffective to the indication marks occurring between successive station-registering marks will be presented in connection with the description of the odd and even stepper gate circuits.

Odd and even station stepper gate circuits

The purpose of the odd and even stepper gate circuits 89 and 261 is to control the operation of respectively associated odd and even indication steppers, 107 and 108. These stepper gates also control the blanker 254 which, in turn, controls the blanking of the odd and even mark selectors 88 and 260, respectively.

The odd stepper gate circuit 89 includes an Eccles-Jordan type trigger circuit comprising tubes 573 and 574. This trigger circuit may be operated to either of its two stable conditions by the application of pulses to the grid of its left-hand tube or the cathode of its right-hand tube. Each negative pulse applied from the plate of tube 569, through resistor 571 and differentiating capacitor 572, to the control grid of tube 573 drives the grid-cathode voltage of this tube below cutoff. In this trigger circuit is in the condition in which tube 573 is conductive and tube 574 is nonconductive, this negative input pulse will cause a reversal in the conduction status of these two tubes so that tube 573 will become cut off and tube 574 conductive. The cathode of tube 574 is positively pulsed by the output pulses of the gate restorer 355. Whenever the trigger circuit included in the odd stepper gate circuit is in the condition wherein tube 574 is conductive, a positive pulse applied to the cathode of tube 574 from the gate restorer restores this trigger circuit to the condition in which tube 574 is cut off.

The gate restorer 355, which will subsequently be described in more detail, includes a cathode follower tube 577. The control grid voltage for this tube is obtained over bus 615 from the cycle starter 177 shown in Fig. 6C. The positive, one-second trigger shown at line C of Fig. 7A is applied over bus 615 and through differentiating capacitor 616 to the control grid of tube 577 and causes this normally cut-off cathode follower tube to conduct momentarily. The positive pulse that results across cathode resistor 566 produces a cutoff grid-cathode voltage for tube 574, thereby ensuring at the beginning of each cycle that this trigger circuit is in the condition in which tube 574 is cut off and tube 573 is conductive. This clearout pulse is also applied for the same purpose to tube 617 included in the even stepper gate circuit 261.

As the odd registering mark selector 88 momentarily conducts in response to the station-registering mark from an odd-numbered field station, the resulting negative pulse at the plate of tube 569 supplies a negative pulse to the control grid of tube 573, thereby operating the trigger circuit to its opposite condition so that tube 573 becomes nonconductive and tube 574 conductive. The resulting decrease of potential at the plate of tube 574 decreases the cathode voltage of diode 579 included in blanker 254. The manner in which this reduction of cathode voltage of this diode controls the gating of tube 569 in the odd registering mark selector 88 will shortly be explained. The increase of potential at the plate of tube 573 also produces an increase of grid voltage for tube 548 included in the count source 57. As will later be described, during the interval that this increased potential is applied to tube 548, the count source supplies an output of pulses to the control grid of tube 591.

The increase of tube 573 plate potential also raises the screen grid voltage of tube 591. This tube 591 is connected in much the same manner as tube 569 with the exception that its suppressor grid is not subject to a gating action but is instead connected directly to the cathode. When tube 573 is in its normally conductive condition, its low plate voltage causes the potential supplied to the screen grid of tube 591 to be correspondingly low. Since the cathode of this tube is maintained at some voltage substantially above ground potential, the low screen grid voltage produces a negative screen grid-cathode voltage of sufficient magnitude to prevent this tube from conducting in response to positive pulses applied to its control grid. However, when tube 573 becomes nonconductive in response to the station-registering mark from an odd-numbered station, the screen grid potential of tube 591 is substantially increased so that this tube can conduct plate current in response to positive pulses applied to its control grid from the count source 57. During the time that the trigger circuit provides the proper gating potential for the screen grid of tube 591, the momentary conduction of plate current that results in response to each positive pulse applied to the control grid causes corresponding negative pulses of plate voltage of this tube. These negative pulses are applied through condenser 593 and resistor 594 to the control grid of tube 595.

Tube 595 is normally operated without bias so that it conducts a relatively large plate current and has a correspondingly low plate voltage. As each negative pulse is applied to the control grid of tube 595, this tube conducts less plate current. The resulting positive-going pulses at the plate of this tube are applied to the control grid of tube 597 included in the odd indication stepper 107 (see Fig. 6I).

The description thus far has been directed primarily toward the odd stepper gate circuit 89. The even stepper gate circuit operates in a similar manner, however. Each response of the associated even registering mark selector 260 causes the trigger circuit in this stepper gate circuit to be operated to the condition in which tube 617 is conductive and tube 620 cut off. The condition to which either of the stepper gate circuits 89 and 261 is operated in response to the pulse provided by its associated registering mark selector 88 or 260 respectively is maintained for a predetermined interval as measured by the gate restorer. More specifically, the output pulse of either selector 88 or 260 as it responds to a station-registering mark initiates the operation of a delay circuit. After the timed interval, which is of the order of 8.5 milliseconds, an output pulse is supplied by the gate restorer to both stepper gate circuits. The particular stepper gate circuit which had been operated from its normal condition is thus restored to the normal condition. A detailed description will presently be given concerning the manner in which this operation is performed. The output voltage of each of the trigger circuits included in the stepper gate circuits is as illustrated at lines C and D of Fig. 7C.

To summarize, the odd and even stepper gate circuits 89 and 261 respectively each include a trigger circuit that has a pulse applied to it at the beginning of each cycle to ensure its being in the condition wherein its right-hand tube is nonconductive and its left-hand tube conductive. The response of the odd registering mark selector 88, for example, to the first mark received from an odd-numbered station operates this trigger circuit to its opposite condition. As a result, the count source 57 is actuated so that it supplies pulses at one millisecond intervals to the control grid of tube 591. Another result is that a gating potential is applied to tube 591 so that it can respond to the counts applied to it. The counts then produce output pulses at the plate of tube 591 which are amplified and inverted by tube 595 and supplied to the input of cathode follower tube 597 included in the odd indication stepper 107. The operation of the trigger circuit to the condition in which tube 573 is nonconductive also causes blanker 254 to become effective, thereby preventing both the odd and the even registering mark selectors 88 and 260 from responding to the input pulses following the initial station-registering mark.

The even stepper gate circuit operates similarly in response to a station-registering mark from an even-numbered field station. Thus, the blanker again becomes effective to prevent both odd and even registering mark selectors from responding to the indication marks following the station-registering mark. Also, the count source again becomes active to supply pulses to the now gated tube 626. The resulting output pulses of this tube are repeated by cathode follower tube 629 included in the even indication stepper 108 so that corresponding positive pulses appear on bus 630. This condition of the trigger circuit included in either the odd or even stepper gate circuit is maintained only for a timed interval measured by the gate restorer. At the end of this interval, the stepper gate circuit is restored to its normal condition.

*Blanker*

The blanker 254 includes two diode tubes 579 and 625. The cathodes of these tubes are connected through respective resistors to ground and also to the plates of the right-hand tubes of the trigger circuits included in the odd and even stepper gates 89 and 261 respectively. The plates of both diodes are connected to the suppressor grids of tubes 569 and 570. The suppressor grids of these latter tubes are connected through a resistor, such as resistor 699 associated with tube 569, to the cathode of each of these tubes. The cathodes of these tubes 569 and 570 are at some positive potential with respect to ground as already described. This bias voltage places the plates of the diodes 579 and 625 also at substantially the same relatively low positive potential with respect to ground. When the trigger circuit including the tubes 573 and 574 is in its normal condition in which tube 574 is nonconductive, the plate voltage of this tube is substantially at the level of the (+) source so that the cathode of diode 579 is at a high potential with respect to ground. Consequently, if the trigger circuits included in both the odd and even stepper gate circuits 89 and 261 are in the condition in which their right-hand tubes are nonconductive, the cathode voltages of the diodes 579 and 625 are high with respect to their plate voltages so that they cannot conduct. For this reason, there can be substantially no current flow through the resistors connected between suppressor grid and cathode of tubes 569 and 570. The voltage at the suppressor grids of these tubes must then be substantially the same as at the cathode, and under this condition these tubes can conduct in response to positive pulses applied to their input, provided that their screen grid is at the same time supplied with a suitable positive gating potential from either bus 211 or 212.

When either of the trigger circuits included in the odd and even stepper gate circuits 89 and 261 respectively is operated to its opposite condition in response to a negative pulse supplied by its associated tube 569 or 570, the right-hand tube of the trigger circuit becomes conductive and the decrease of its plate voltage produces a substantial decrease in the cathode voltage of the associated diode tube 579 or 625. If tube 574 becomes conductive, for example, the cathode voltage of diode 579 is lowered to a value below the plate voltage of this diode. Diode 579 then conducts and the resulting flow of current through resistor 699 and the similar resistor 699 associated with diode 578 causes the voltage at the suppressor grids of these tubes to be lowered to a value below that at the cathode of these tubes. The result is that these tubes 569 and 570 cannot conduct in reponse to positive pulses applied to their control grids even if one or the other of them has its screen grid properly gated at such time. In this manner, the response of either the odd or even registering mark selector 88 or 260 respectively to a station-call mark from an odd or even-numbered station actuates the trigger circuit included in the associated stepper gate circuit, and the output of the trigger circuit then causes the blanker to render both registering mark selector circuits inactive.

These registering-mark selector circuits remain in this condition until the trigger circuits are again rendered to their normal condition with their right-hand tubes nonconductive. The resultant gating potential for the suppressor grids of tubes 569 and 570 is diagrammatically illustrated at line E of Fig. 7C. The manner in which the trigger circuits are restored has already been described in general terms and will be described in detail presently.

*Gate restorer*

The gate restorer 355 includes a phantastron delay circuit whose timing action is initiated by pulses applied to it from either the odd or even registering mark selectors 88 and 260 respectively. The purpose of the gate restorer is to provide, after a suitable delay time following the response to either registering mark selector to a station-registering mark, an output pulse which restores the trigger circuit in either the odd or even stepper gates circuits to its normal condition with its right-hand tube nonconductive.

The phantastron delay circuit includes diodes 599 and 600, and tubes 700 and 188. This delay circuit is similar to the phantastron delay circuit included in the field station apparatus. The constants of this delay circuit are preferably adjusted so that it provides an output pulse at substantially 8.5 milliseconds following each input pulse. The input pulses to this circuit are obtained from the plates of tubes 569 and 570 through condensers 598 and 701 respectively. The output pulse occurring 8.5 milliseconds later is applied through condenser 605 to the control grid of tube 606. Tube 606 is provided by substantially class A bias by means of cathode resistor 702. This tube amplifies and inverts the positive output pulses of the delay circuit so that negative pulses appear at the plate of this tube and are applied through condenser 607 to the control grid of tube 609. Tube 609 and its associated R-C differentiating circuit including condenser 607 and resistor 608 operate as a peaker circuit in the same manner as the similar peaker included in the cycle starter 177 shown in Fig. 6C. Each negative input pulse to tube 609 produces a positive pulse at its plate and these positive pulses are applied through condenser 610 to the control grid of tube 576.

Tubes 576 and 577 are cathode followers having a common cathode resistor 566. These tubes are normally biased to cutoff by reason of their control grids being connected through respective resistors to (−). When these tubes are cut off, their cathodes are at ground potential. Each positive pulse applied to their control grids causes them to conduct momentarily so that a positive pulse appears across their common cathode resistor and these positive pulses are then applied to the cathodes of tubes 574 and 617 included in the odd and even stepper gate circuits 89 and 261 respectively. If either of these tubes 574 or 617 is conducting at the time of occurrence of such a positive pulse, they will then become nonconductive.

Thus, the gate restorer 355 includes two cathode followers having a common cathode resistor 566. The inputs to these cathode followers cause a positive pulse to appear across resistor 566 for each occurrence of a synch mark or an output pulse of the phantastron delay circuit. These output pulses are applied to the trigger circuit included in both the odd and even stepper gate circuits to thereby cause these trigger circuits to be in the condition in which their right-hand tubes, 574 and 617 respectively are nonconductive. The synch mark pulse acts as a check to ensure that these trigger circuits are in their proper condition at the beginning of each cycle. Each registering mark selector operates the trigger circuit in its associated stepper gate circuit in response to a station-registering mark from a corresponding odd or even-number station. At the same time, a pulse is applied to the input of the phantastron delay circuit included in the gate restorer 355. After a measured time interval, preferably about 8.5 milliseconds, an output pulse is applied to both of the trigger circuits so that they are again in their normal condition with their right-hand tubes nonconductive.

*Count source*

The count source 57 includes a shock-excited oscillator which is gated by a voltage obtained from the trigger circuits included in the odd and even stepper gate circuits 89 and 261 respectively. Various pulse shaping circuits are also included in the count source and act upon the output of the shock-excited oscillator to provide output triggers which are of the proper shape and properly synchronized with respect to the oscillator sine wave output.

Tubes 548 and 549 are cathode follower tubes having a common cathode load resistor 550. The control grids of these tubes are supplied with a voltage from the plates of tubes 573 and 620 respectively. As either of these tubes 573 or 620 becomes nonconductive in response to a negative pulse supplied to it from its associated tube 569 or 570 the plate voltage increases and thereby raises the grid voltage of tube 548 or 549. When both tubes 573 and 620 are conductive, however, their low plate voltages cause the grid cathode voltages of tubes 549 and 548 to be at cutoff. The resultant output voltage of these tubes appearing across cathode resistor 550 is thus low and insufficient to overcome the negative voltage applied to the control grid of tube 551 from (—) and through resistor 710 so that tube 551 is cut off. However, when either tube 573 or 620 becomes nonconductive, the associated tube 548 or 549 will conduct a greater amount of plate current and the voltage across resistor 550 will increase so that the grid-cathode voltage of tube 551 will then be raised above the cutoff level. The result of these combined cathode followers is to provide, in a single output, the odd and even stepper gates separately provided by the odd and even stepper gate circuits and shown at lines C and D of Fig. 7C. This combined output is diagrammatically illustrated at line F of Fig. 7C.

When tube 551 is cut off, its plate voltage is high because there is then substantially no voltage drop across its plate resistor 552. Under these conditions, the grid-cathode voltage of tube 736 is raised above cutoff so that it can conduct plate current. The voltage at the control grid of tube 736 is determined by the voltage dividing network including resistors 552, 711, and 712 connected between (+) and (—). When tube 551 conducts, its plate voltage is reduced, and the grid-cathode voltage of tube 736 is correspondingly reduced so that this tube is cut off and cannot conduct. Thus, tube 736 is cut off only when a stepper gate is applied to the control grid of either tube 548 or 549.

Figure 9B:
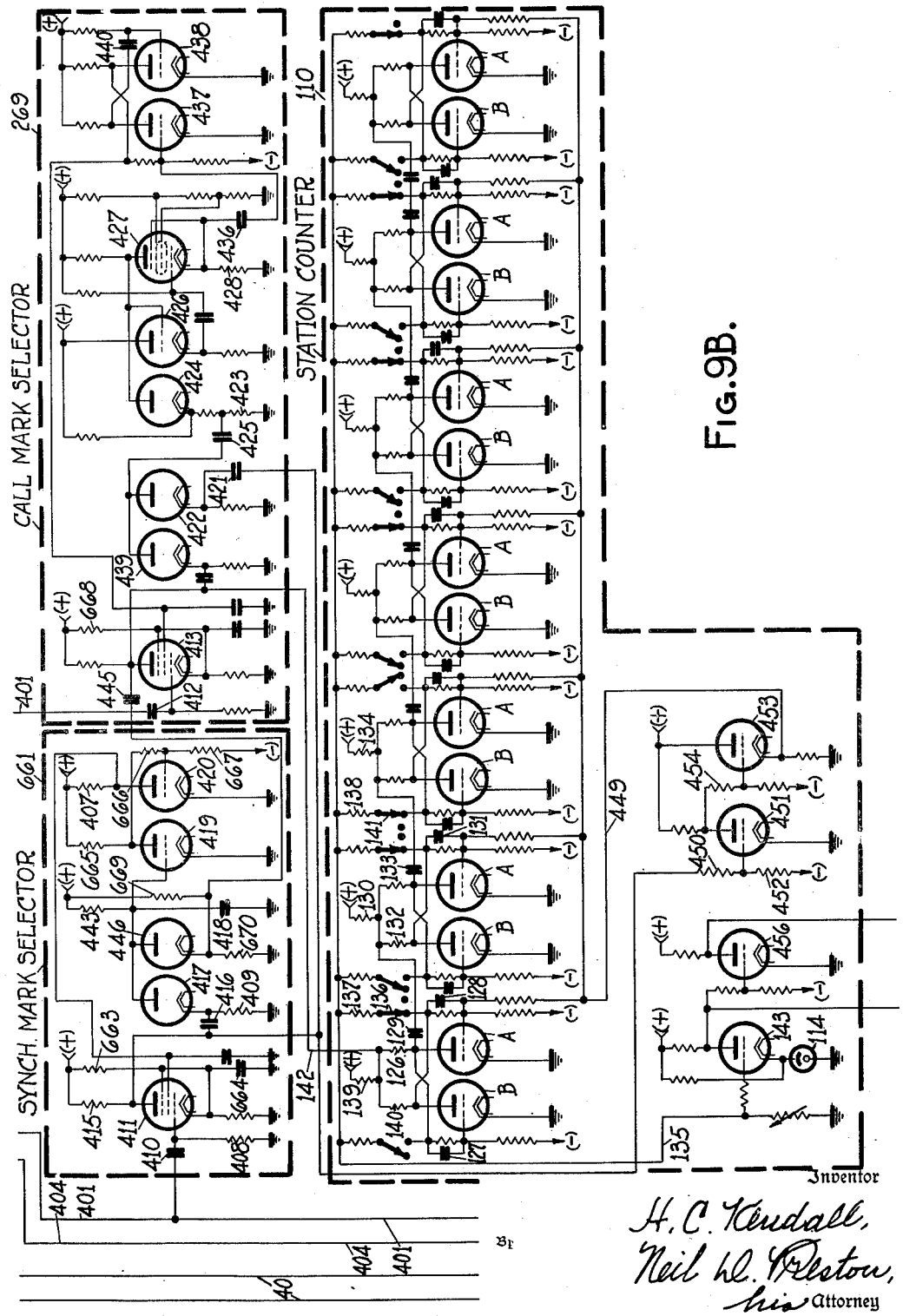

The shock-excited oscillator including tube 736, inductor 553, and condenser 554 operates in much the same manner as the similar oscillator included in the subcarrier modulator 54 shown in Fig. 9B. A diode 555 is here also provided to prevent the control grid of tube 736 from being driven positive with respect to its cathode potential. The values of inductance 553 and condenser 554 are chosen so that the output frequency of this oscillator will be substantially 1 kc. Thus, when the grid-cathode voltage of tube 736 is driven to cutoff as a result of the conduction of tube 551, an output of substantially sine wave form and having a frequency of 1 kc. is applied from the cathode of tube 736, through resistor 557, to the control grid of tube 585. This output of tube 736 is shown at line G of Fig. 7C.

Figure 7C:
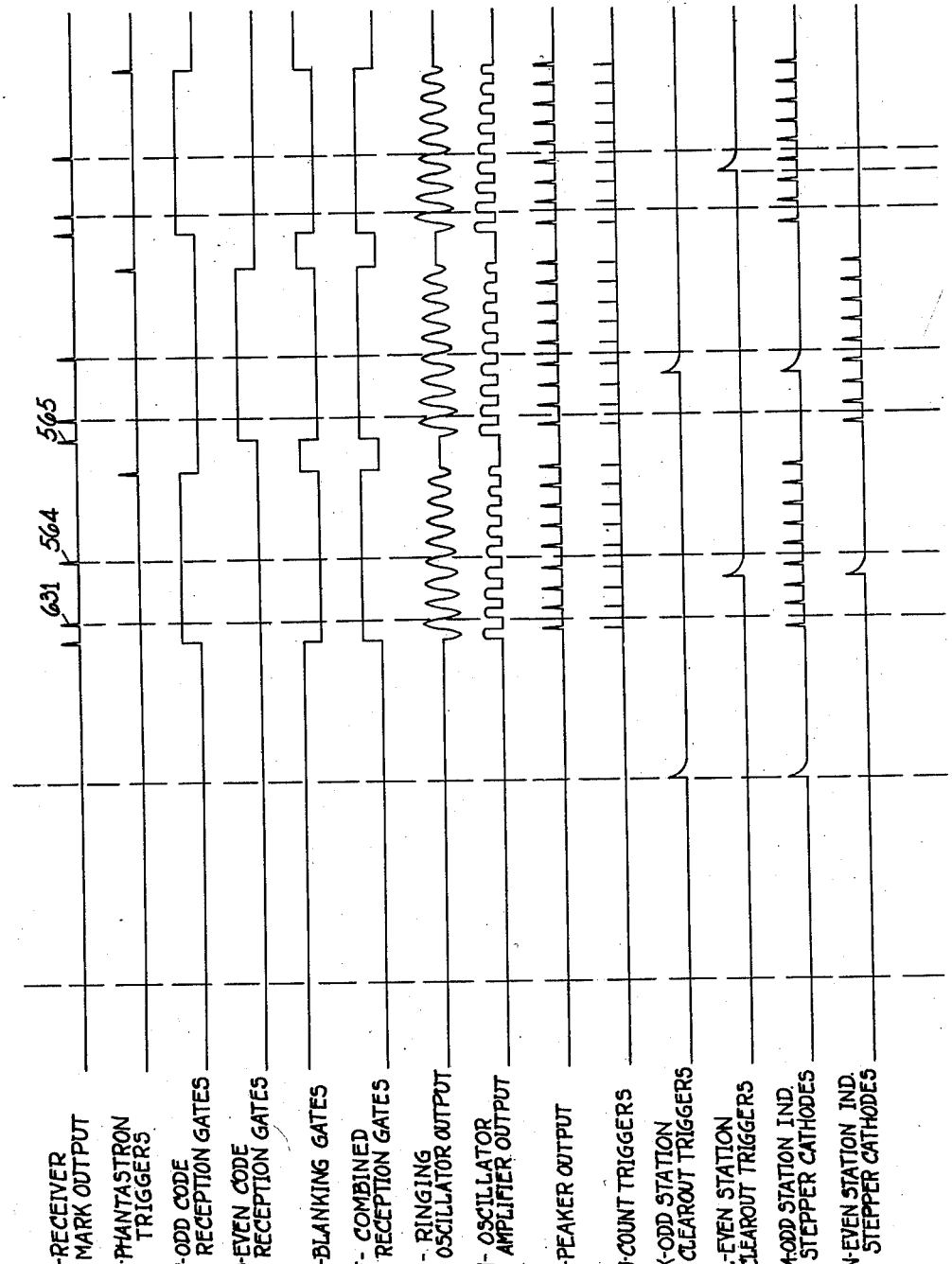
Figure 7E:
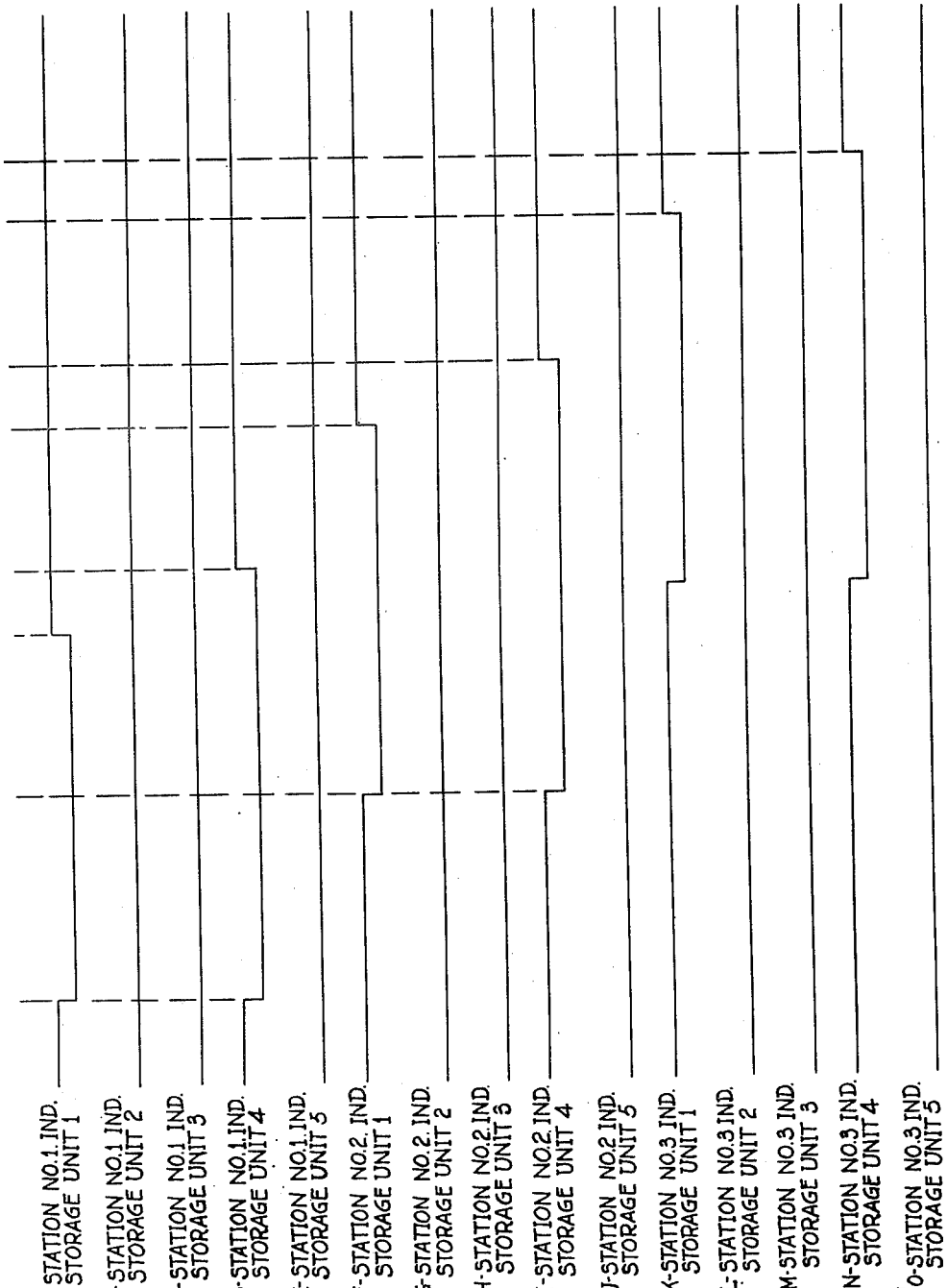

Tube 585 is operated without cathode or fixed bias. Saturation limiting, therefore, occurs on the positive half cycles of the input voltage to this tube. In other words, on the positive half cycles, the control grid tends to be driven positive with respect to the cathode so that grid current passes through resistor 557 and tends to maintain the voltage at the control grid at the same potential as the cathode voltage. On negative half cycles, the control grid is driven negatively with respect to the cathode, and the resulting decrease of plate current produces corresponding increases of plate voltage. Because this tube 585 is also substantially overdriven, the plate output pulses have somewhat a rectangular waveshape. Since successive cycles of the oscillator output are attenuated by the inherent resistance of the inductance 553 and condenser 554, the successive voltage variations at the plate of tube 736 are similarly attenuated. The resulting output pulses are shown at line H of Fig. 7C. These voltage variations are then applied through an R–C differentiating combination including condenser 584 and resistor 558 to the control grid of a peaker amplifier 559. This peaker operates in the same manner as the similar peakers already described. Thus, a positive-going pulse appears at the plate of tube 559 only at the trailing edge of each input pulse. The input to this amplifier is adjusted so that its control grid is driven substantially to cutoff even for the most attenuated voltage variations applied to it. The larger amplitude variations only drive the control grid more negatively beyond cutoff on their trailing edges and cannot, therefore, affect the plate current output of tube 559 any differently. The result, therefore, is that the positive output pulses at the plate of tube 559 are all of substantially equal amplitude as shown at line I of Fig. 7C. These output pulses are still relatively broad so they are applied to another peaker circuit which includes tube 562 and the R–C differentiating comprising condenser 560 and resistor 561. Tube 562 produces positive output pulses (see line J of Fig. 7C) in response to the decrease of voltage resulting at its control grid upon each trailing edge of the positive output pulse from tube 559. The sharply peaked positive pulses that appear at the plate of tube 562 are applied to the control grid of cathode follower 563. The output pulses of this cathode follower appear as shown at line J of Fig. 7C and are substantially coincident with the trailing edge of the pulses shown at line H of Fig. 7C. As a result, these pulses occur approximately at the end of the first half cycle and on subsequent cycles thereafter of the oscillator output. Since the oscillator output is at a frequency of 1 kc., these positive pulses occur at approximately 500 microseconds following the initiation of the oscillation of this shock-excited oscillator and at one millisecond intervals thereafter. Reference to Fig. 7C shows that the time of occurrence of these pulses is such that the indication mark pulses such as the pulses 631 and 564 at line A occur substantially half way between successive output pulses of the count source. As will later be explained, the output triggers of the count source are employed to operate the odd and even indication steppers 107 and 108. The leading and trailing edges of the pulse periods demarcated by the steppers will then occur at such times that they effectively overlap the time of occurrence of the indication marks. For this reason, a delay circuit need not be provided to shift the receiver mark output pulses so that they will occur within the time limits of the pulse periods as demarcated by the steppers.

*Odd and even station indication steppers*

The odd and even indication steppers 107 and 108 are very similar to the control and indication stepper 109 shown in Fig. 6C. The number of steps provided in each stepper included in these steppers equals the maximum number of indication marks that may be transmitted from any of the field stations. If, for example, indication marks may be transmitted on any of the five pulse periods following the station-registering marks, a total of five steps is included in the steppers 107 and 108.

The input pulse that operates step No. 0 of each stepper to the condition in which its left-hand tube is nonconductive is obtained, as previously described, from the output of the corresponding odd or even registering mark selector. Following this operation of step No. 0 to its opposite condition, the succeeding steps of the stepper are operated in response to the pulsing of the cathodes of the right-hand tubes of the various steps by positive pulses obtained from the output of either tube 591 or 626 included in the odd and even stepper gate circuits respectively.

During the time that either tube 591 or 626 has its screen grid suitably gated, positive pulses are applied to the control grids of both of these tubes from the count source 57. The gated tube responds by conducting momentarily as each pulse is applied so that corresponding negative-going pulses appear at its plate. These negative pulses are applied through the respective inverter tubes 595 and 627 to the control grid of the associated tube 597 or 629 included in the odd and even indication steppers 107 and 108 respectively.

Cathode follower tubes 597 and 587 included in the stepper 107 having common cathode resistor 588 so that the input pulses to each tube are repeated on the single output bus 589. The same situation holds true with respect to the cathode follower tubes 629 and 714 included in stepper 108. Each of these cathode follower tubes is normally biased to cutoff, and at such times the voltage at their cathodes is at ground potential. As the control grid of a cathode follower tube is driven positively by an input pulse, the tube momentarily conducts plate current, thereby causing a corresponding positive pulse to appear at its cathode and be supplied over either bus 589 or bus 630 associated with the odd and even indication steppers 107 and 108 respectively. As already described, positive output pulses are obtained from the tubes 595 and 627 included in odd and even stepper gate circuits 89 and 261 respectively.

These positive pulses are then applied to the control grids of the associated cathode follower tubes 597 and 629. Corresponding positive pulses appear, as a result, upon the buses 589 and 630.

The positive input pulses to cathode follower tubes 587 and 714 are obtained from the 100 cycle trigger 85. The 100 cycle trigger includes tube 583 and 716, and the input voltage to these tubes is obtained from buses 211 and 212. The control grid of tube 583 is connected through a condenser 585 to bus 212, and a similar connection is provided to connect the control grid of tube 716 to bus 211. The control grids of tube 583 and 716 are provided with a positive bias by a voltage dividing network connection between (+) and ground. The grid of each tube is maintained at the potential of its cathode by the flow of grid current through a voltage dividing resistor such as the resistor 715 associated with tube 583 and connected from its control grid to (+). Each increase of potential on either bus 211 or 212 produces positive pulses on the control grid of the associated tube 716 or 583 respectively. Similarly, a decrease of potential on either of these buses produces a negative pulse on the corresponding grid. The positive pulse on either control grid produces an increase of grid current and thus a greater voltage drop connected from the control grid to (+). As a result, the grid-cathode voltage tends to remain at substantially the same value. One each negative pulse, the grid-cathode voltage is increased negatively so that the tube conducts less plate current and the plate voltage increases. In this way, each decrease of potential on bus 211 or 212 causes a corresponding positive pulse to appear on bus 618 or 619 respectively. The R-C differentiating combination associated with tubes 583 and 716 are preferably chosen to be of the value that will cause the output pulse on bus 619 and 618 to be relatively broad for reasons which will presently be explained. These output pulses are shown at lines K and L of Fig. 7C where they are designated as the odd and even clear-out triggers respectively.

Each positive pulse applied to either cathode follower tube 587 or 714 included in the steppers 107 or 108 respectively causes its grid-cathode voltage to be momentarily raised above cutoff. The positive pulses on buses 618 and 619 cause cathode follower tubes 714 and 587 to conduct momentarily so that corresponding relative broad pulses appear on buses 630 and 589 respectively. The pulsing output that thus appears on bus 589 and 630 is as illustrated at lines M and N of Fig. 7C. More specifically, at the beginning of a station period for an odd-numbered field station, a relatively broad, positive pulse appears on bus 589 associated with the odd indication stepper 107; and when the indication code from such odd-numbered field station is received at the control office, a series of relatively narrow, positive pulses occurring at one millisecond intervals also appears on this bus 589. These pulses occurring at one-millisecond intervals are effective to produce the require stepping operation of the odd indication stepper 107 in a manner to be presently described. The relatively broad pulse preceding the series of narrow pulses acts as a clear-out pulse in that it ensures that each step of the odd indication stepper 107 is in its normal condition with its right-hand tube nonconductive prior to such stepper operation. The pulses appearing on bus 630 and illustrated at line N perform the same function with regard to the even indication stepper 108.

The odd and even indication steppers 107 and 108 are both similar to the control and indication stepper 109 shown in Fig. 9C. In the description of the operation of stepper 109, mention was made of the fact that the pulses applied to the cathodes of the right-hand tubes of each stepper must be relatively sharp as compared to the relative pulse applied to the control grid of the left-hand tube of each step from the preceding step. This condition must be met to prevent the positive pulse that restores any step of the stepper to its normal condition from similarly acting upon the succeeding step and thereby preventing such next step from being operated to the condition in which its right-hand tube becomes conductive. For this reason, the pulses appearing on bus 589 and 630 for the purpose of producing a stepping operation of the steppers 107 and 108 respectively are preferably of short duration; and the R-C differentiating combination associated with the control grid of the left-hand tube of each step is so adjusted that each negative pulse applied to these control grids is of relatively long duration. In this way, positive pulses on bus 589 and 630 may simultaneously be applied to the cathodes of the right-hand tubes of all the steps of the stepper without interfering with the progressive operation of each step to the condition in which its right-hand tube is conductive.

The clear-out pulses also appearing on bus 589 and 630 must be of substantially longer duration than even the negative pulses applied to the control grids of the left-hand tubes of the various steps. More specifically, if any step of a stepper is in the condition in which its right-hand tube is conductive, the occurrence of the clear-out pulse will raise the cathode voltage of such tube to a sufficiently high level to produce a cut off grid-cathode voltage, thereby restoring such step to its normal condition. The relatively long negative pulse that is then applied to the control grid of the left-hand tube of the next step tends to make such tube nonconductive and its associated right-hand tube conductive. By maintaining the clear-out pulse for a relatively long time on either the bus 589 or 630, the right-hand tube will be prevented from becoming conductive. As a result, the clear-out pulse causes all the steps of a stepper to be restored to their normal conditions.

The positive pulses that appear on bus 589 in response to the output triggers of the count source 57 produce a stepping operation of the odd indication stepper 107 provided that the required negative input pulse has been applied to step No. 0 to operate this step to the condition wherein its left-hand tube is nonconductive. This negative pulse is obtained, as previously described from the associated odd or even registering mark selector 88 or 260. On successive milliseconds, the various steps of the stepper are operated and during the time that each step has its left-hand tube nonconductive, the increase of plate voltage of such nonconductive tube increases the grid-cathode voltage of a corresponding cathode follower tube included in the odd cathode followers 405. As the even indication stepper 108 is similarly operated during the time of reception of an indication code from an even-numbered field station, the successive increases of voltage at the plates of the left-hand tubes as the various steps are operated from their normal condition cause an increase of the grid-cathode voltage of the corresponding cathode follower tubes included in the even cathode followers 406. The time-spaced, one millisecond, positive-going pulses provided by the various steps of the steppers 107 and 108 are shown at lines A-L of Fig. 7D.

The step No. 0 of both steppers 107 and 108 is in the condition in which its left-hand tube is nonconductive for a smaller period of time than the remaining steps of the steppers. Step No. 0 of each stepper is operated from its normal condition as has been described by an output pulse supplied by the corresponding tube 569 or 570 as these tubes respond to the station-registering marks. The output triggers of the count source are so delayed that the first of these triggers occurs approximately 500 microseconds following the occurrence of the station registering-mark and such first trigger restores step No. 0 to its normal condition. Although this step No. 0 is, as a result, only in its condition wherein its left-hand tube is nonconductive for only approximately 500 microseconds, the remaining steps of each stepper are in such condition for approximately a full millisecond because successive output triggers of the count source occur at the 1 kc. rate.

Each of the cathode follower tubes included in the odd and even cathode followers 405 and 406 is normally biased to cutoff by a voltage dividing network connected from (+) to (—), i. e., each tube is biased to cutoff provided that the left-hand tube of the step of a stepper associated with such cathode follower is then conductive. However, when the left-hand tube of the associated step is nonconductive, the grid-cathode voltage of the cathode follower rises above cutoff. The plates of all the cathode followers are supplied with the receiver mark pulse output over bus 546. Bus 546 is energized by the output of cathode follower tube 545 included in receiver 56 (see Fig. 6H). The normal cutoff bias for this tube causes the voltage on bus 546 to be at ground potential except when the occurrence of a mark momentarily raises the voltage above ground. Thus, a cathode follower tube can only conduct if a mark appears on bus 546 during the time that its grid-cathode voltage has been raised above cutoff. As shown in Figs. 7C and 7D, the pulses appearing on bus 546 (see line A of Fig. 7C) occur within the limits of the respective pulse periods as demarcated by the steppers 107 and 108 (see lines A-L of Fig. 7D). The receiver mark output pulse 631 for example, occurs on the first pulse period following the station-registering mark from station No. 1. This mark pulse now occurs within the limits of the one-millisecond pulse provided by step No. 1 of the stepper 107 as shown at line B of Fig. 7D. The receiver mark output pulse 564 similarly occurs during the one-millisecond pulse period demarcated by step No. 4 of stepper 107. The application of these mark output pulses to the plates of the cathode follower tubes 613 and 644 at the time that the grid-cathode voltages of these tubes are above cutoff permits these tubes to conduct momentarily. The resulting positive pulses at their cathodes are then applied to corresponding steps of all the indication storage banks for the odd-numbered field stations. The indication mark pulses from the even-numbered field station similarly occur during the time limits of corresponding time-spaced pulses demarcated by the steps of the stepper 108. The application of these mark output pulses from the even-numbered stations to the plates of all the cathode followers at a time when the corresponding cathode follower tubes have their grid-cathode voltages above cutoff similarly permits these tubes to conduct. The resulting positive output pulses of the cathode follower tubes 406 are supplied to corresponding steps of the indication storage banks for all even-numbered stations.

*Indication storage banks*

An indication storage bank is provided for each field station included within the system. Each of these indication storage banks includes an indication storage unit for each pulse period in the indication code upon which indication marks may be transmitted to the control office. All of the indication storage banks for the odd-numbered field stations receive their input from the odd cathode followers 405 which are associated with the odd indication stepper 107; similarly, all the indication storage banks for the even-numbered field stations receive an input from the even cathode followers 406 which are associated with the even indication stepper 108. Although all of the indication storage banks for the odd-numbered stations are simultaneously energized by the cathode followers 405, only one of these indication storage banks can respond at any one time because these storage banks are selectively gated in a manner that will presently be described. The same is true of the indication storage banks for the even-numbered field stations.

Each indication storage unit in one of the indication storage banks for a field station includes an Eccles-Jordan type trigger circuit such as that comprising tubes 635 and 636 in the first step of the indication storage bank for station No. 1. Each trigger circuit may be operated to one or the other of its two stable conditions by a positive pulse applied respectively to the control grid of either the right-hand or left-hand tube of each step.

The control grid of the left-hand tube of each step in a storage bank for a particular field station is connected to a bus which has applied to it the station gate pulse for the preceding station. For example, the first step of the indication storage bank for station No. 3 includes tubes 720 and 721. The control grid of tube 720 is connected through a decoupling resistor 722 to a bus 725 which has applied to it the station gate for station No. 2 obtained from the output of cathode follower tube 303 included in the cathode followers 351 of Fig. 6D. The control grids of the left-hand tubes of each step of this indication storage bank for station No. 3 are similarly connected to bus 725. The increase of potential occurring at the beginning of the station period for station No. 2 ensures that all the left-hand tubes of the trigger circuits included in the indication storage bank for station No. 3 are in the conductive condition at such time. In other words, prior to the reception of an indication code from a particular field station, all the steps of the indication storage bank for that station are restored to their normal condition and, as will be seen, the operation of any step to its normal condition tends to deenergize the indication lamp associated with that step. Where the indication code from a field station is not altered on successive cycles, the steps which are restored to their normal condition as a result of this reset feature are quickly returned to their former condition. Under these circumstances, the short length of time that any of the steps is in its normal condition prior to its being operated to its former condition is so short a time that the indication lamp associated with such step remains illuminated as will be described.

The various indication storage banks are successively gated by the station gate pulses obtained from the cathode followers 429 shown in Fig. 6F. These cathode follower tubes are paired so that their common output represents the input applied to each. The pair of cathode follower tubes 243 and 695 derive their input voltages from steps No. 0 and No. 1 of the station gate stepper 106. Both tubes are provided with a cutoff bias by a connection from their control grids to (—). During the time that step No. 0 of the station gate stepper 106 is in the condition wherein its tube 220 is nonconductive, the increased input to tube 243 causes this tube to conduct. Similarly, tube 695 conducts during the station No. 1 gate period as demarcated by step No. 1 of the station gate stepper. Thus, during the time that either step No. 0 or step No. 1 supplies an increased output voltage, the common cathodes of tubes 243 and 695 are at a positive potential with respect to ground. The resulting indication storage gate provided by these cathode follower tubes to the indication storage bank for station No. 1 is as shown at line M of Fig. 7D. A similar indication storage gate is provided for each indication storage bank. Each such gate extends for a period of time from the beginning of the station period for the transmission of controls to such stations to the end of the similar station gate for the next field station in sequence. These remaining indication storage gates are as shown at lines N and O of Fig. 7D. These gates are applied over buses 726, 727, and 728 to the grids of the right-hand tubes of each step of the indication storage banks for stations 1–3, respectively. These positive gates not only gate the various steps of an indication storage bank during the station period allotted to the transmission of controls to the corresponding station, but also gate the steps of such indication storage bank during the station gate corresponding to the next field station in sequence. In this way, a portion of the indication code from any field station may be received during the station period allotted to the transmission of controls to the next field station in sequence and yet be properly registered upon the proper indication storage bank. The indication storage bank for the next successive field station will also be gated at such time but since its input is not derived from the same group of cathode followers, such next indication storage bank cannot respond to the indication code from the preceding field station.

When any step of an indication storage bank has been restored by the clear-out gate applied to the control grid of its left-hand tube, its right-hand tube becomes nonconductive. A positive pulse applied to the control grid of the right-hand tube of a step from one of the associated cathode followers 405 or 406 cannot by itself cause such tube to become conductive unless an indication storage gate is simultaneously applied to such control grid. As explained, positive output pulses are selectively applied by the odd cathode followers 405 to the corresponding steps of the indication storage banks for the odd-numbered field stations. These positive output pulses correspond to the occurrence of indication marks in the received indication codes from the various odd-numbered field stations. The respective pulse period on which such indication mark occurs with respect to the station-registering mark for such station determines which of the cathode follower tubes 405 will supply an output. If, for example, an indication mark occurs in the code from some odd-numbered field station on the first pulse period following the station-registering mark, a positive pulse is applied from the output of cathode follower tube 613 to the first steps of all the indication storage banks for the odd-numbered field stations. If such indication mark is a portion of the indication code from station No. 3, for example, an indication storage gate will at that time appear on bus 728 and the combination of this combined gate with the occurrence of a positive pulse upon the control grid of tube 721 at such time will drive the grid-cathode voltage of this tube above cutoff and permit to conduct. The tube 720 will simultaneously become nonconductive and this trigger circuit will remain in this condition until the next cycle when it will again be restored to the opposite condition by the clear-out gate applied to it over bus 725. All the remaining steps of the various indication storage banks are selectively controlled in a similar manner in response to the indication marks.

*Indication lamps*

The indication lamps 59 are controlled by corresponding steps of the various indication storage banks. Each indication lamp is controlled by a circuit including a saturable inductor, a transformer, a condenser, and a source of alternating current. A winding of a saturable inductor is included in the plate-cathode circuit of the right-hand tube of each step included in the various indication storage banks. A winding of a saturable inductor 647, for example, is included in the plate-cathode circuit of tube 635 included in the indication storage bank for station No. 1. This winding is shunted by a condenser 730. The remaining winding of this saturable inductor is included in series therewith a secondary winding of a transformer 646 and an indication lamp 637. The primary winding of transformer 646 is connected to a source of alternating current. When the current through the winding of the saturable inductor 647 that is included in the plate circuit of tube 635 has a relatively large amount of tube 635 plate current passing through it, the inductance of this saturable inductor is at a very low value so that it presents only a small impedance in the secondary circuit of transformer 646. This relatively low impedance permits a relatively large current flow in this secondary circuit so that the indication lamp 637 may be illuminated. However, when the current through the primary winding of the saturable inductor 647 is low as when tube 635 is cut off, the inductor presents a relatively large impedance and thereby limits the current in the secondary circuit to such an extent that lamp 637 is unilluminated. In this way, the lamp 637 is controlled to be illuminated only when tube 635 is conductive.

According to the previous description, the right-hand tube of any step of an indication storage bank becomes conductive in response to the occurrence of an indication mark upon the corresponding indication pulse period of the code from the associated field station. As a result, the indication lamps for each field station are selectively illuminated according to the nature of the indication code from such station.

Even though the indication code from any field station may be unchanged in successive cycles of operation, each step of an indication storage bank is reset, as already described, prior to the reception of such indication code. In that event, it is desirable that an indication lamp which is controlled to be illuminated on successive cycles be steadily energized despite the intermittent control exercised by the associated step of the indication storage bank. For this reason, a condenser is shunted across the primary winding of each saturable reactor. The energy storage properties of such a condenser cause it to maintain a current through the winding of the saturable reactor during the time that the associated tube is not conductive. As a result, the indication lamp remains illuminated during such time.

*Operation of complete control office receiving apparatus*

The various field stations included in this communications system each transmit an indication code to the control office in the same order that they respond to the control code transmitted from the control office. Since the field stations transmit these indication codes only during the time that they are responsive to the portion of the control code respectively allotted to them, substantially the only delay involved in the reception of the indication codes at the control office is that caused by propagation time. Therefore, although the indication codes are received in order at the control office, their reception may be variously delayed depending upon the magnitude of the propagation time. However, the receiving apparatus at the control office is constructed so that these delayed indication codes may be properly received and the station of origin readily identified.

The indication codes contain only marks, and the control office receiver 56 responds to these indication codes by suppling an output pulse over bus 546 for each such occurrence of a mark. This output of the receiver 56 is shown at line A of Fig. 7C. Two registering mark selector circuits 88 and 260 are provided at the control office, and all the output pulses supplied by the receiver 56 are supplied to both of these selector circuits. These registering mark selector circuits are selectively gated and are also subject to the control exercised by a blanker 254. The action of this blanker in rendering the selector circuits inactive is in turn subject to a control supplied by the stepper gate circuits 89 and 261. However, at the beginning of each new cycle of operation, a control is supplied by the cycle starter 177 which is effective, through both stepper gate circuits, to prevent the blanker from holding the registering mark selector circuits inactive. The effect of this blanker may thus be discussed later.

The gating provided for the selector circuits is effective on the odd registering mark selector only during those times designated as the station periods for the transmission of controls to the odd-numbered field stations. Similarly, the gating is effective on the even registering mark selector only during those times designated as the station periods for the transmission of controls to the even-numbered field stations. Thus, a requirement for the proper reception of indications at the control office is that the station-registering mark from any station be received at the control office before the end of the station period provided for the transmission of controls to such station.

At the beginning of each cycle of operation, the first indication code received at the control office is that originating at station No. 1. Each mark occurring in such indication code causes a pulse to be applied to both the odd and even registering mark selectors. The first or station-registering mark occurs before the end of the station period that has been allotted to the transmission of controls to station No. 1 so that only the odd registering mark selector is gated at that time. As a result, this selector circuit is capable of responding to this first pulse by supplying an output to the apparatus associated with it. One result of the output provided by this selector circuit is the actuation of a trigger circuit in the associated odd stepper gate circuit to the condition wherein its left-hand tube is nonconductive and its right-hand tube conductive. At the same time, a control is supplied by the odd registering mark selector to the gate restorer 355 for the purpose of initiating the action of a timing circuit. At the end of the interval timed by this timing circuit, an output supplied by the gate restorer acts upon the odd stepper gate circuit to restore the trigger circuit to its normal condition. While this trigger circuit is operated from its normal condition, the odd stepper gate circuit is effective to exercise several functions concerned with the proper decoding of the indication code from this field station. For this reason, the control from the gate restorer that restores this trigger circuit to its normal condition must not be provided until sufficient time has elapsed to permit all of the indication code from this field station to be received at the control office.

One result of the actuation of the trigger circuit in the odd stepper gate circuit from its normal condition is that the blanker is made effective to act upon both the registering mark selectors so that they cannot respond to the input pulses applied to them, which input pulses correspond to the indication marks following the station-registering mark. This blanking action must be effective on both of the registering mark selectors because a portion of the indication code from station No. 1 may be so delayed as to occur during the station period for the transmission of controls to station No. 2 at which time the even registering mark selector will be gated.

Also during the time that the trigger circuit in the odd stepper gate circuit is operated from its normal condition, a gating control is applied to the count source 57 with the result that output pulses occurring at one millisecond intervals are supplied by the count source to both tubes 591 and 626 included in the odd and even stepper gate circuits respectively. During this time, however, only tube 591 is properly gated by the associated trigger circuit so that only this tube can respond to these count pulses. As a result, corresponding pulses are applied to the odd indication stepper 107 and are effective, as will be seen, to produce a stepping operation of this stepper.

After the entire indication code from field station No. 1 has been received at the control office and the timing circuit included at the gate restorer has been effective to restore the trigger circuit in the odd stepper gate to its normal condition, the next code pulse received at the control office and applied to both selector circuits is the station-registering mark from station No. 2. Since both trigger circuits included respectively in the odd and even stepper gate circuits are now in their normal condition, the blanker is no longer effective to prevent a response of either registering mark selector. However, although this first mark from station No. 2 is applied to both the odd and even registering mark selector, only the even registering mark selector can now respond since it is now suitably gated whereas the odd registering mark selector is now not gated. The response of the even registering mark selector to this station-registering mark from station No. 2 produces the same effect upon the associated even stepper gate circuit as that just described with respect to the odd stepper gate circuit. Thus, the blanker again becomes effective to make both registering mark selectors ineffective to the pulses following the station-registering mark from station No. 2, and the count source 57 is also made active to supply pulses to both tubes 591 and 626. Since only tube 626 is gated at this time, only this tube can respond to these count pulses by supplying corresponding pulses to the even indication stepper 108. By analogy with this description it can be seen that the indication codes from the various field stations are effective on the proper registering mark selector, stepper gate circuit, and indication stepper depending upon whether such indication code originates at an odd or even-numbered field station respectively.

As either of the registering mark selector 88 or 269 responds to a station-registering mark, an output pulse is applied to step No. 0 of the associated stepper 107 or 108 respectively. As a result, this step No. 0 is operated to its opposite condition. Following this actuation of step No. 0 positive pulses at one millisecond intervals are supplied by the count source 57, through the respective stepper gate circuit, to the cathodes of the right-hand tubes of each step. The first of such pulses restores step No. 0 to its original condition. Each successive pulse in the group of pulses as shown at lines M and N of Fig. 7C produces an advance in a step of such stepper. In addition to these count pulses which produce the stepping operation of the steppers, a clear-out pulse is also applied to the cathodes of the right-hand tubes of each stepper to ensure that each step of such stepper is in its proper condition just prior to the stepping operation. During the time that each step, after step No. 0, is operated to the condition wherein its left-hand tube is nonconductive, the grid-cathode potential of an associated cathode follower tube is raised above its normal value. The cathode follower tubes associated with the various steps of the stepper 107 are included in the block designated cathode followers 405. A similar group of cathode followers 406 is associated with the stepper 108.

Because the steppers 107 and 108 are operated in response to the count triggers which are delayed with respect to the indication marks as has been explained, each indication mark occurs within the limits of a corresponding step of an indication stepper depending upon the time of occurrence of such indication mark with respect to the corresponding station-registering mark. These indication mark pulses provided by the receiver 56 are applied to the plates of all the cathode follower tubes included in the cathode followers 405 and 406. However, only the particular cathode follower tube supplied with a high potential to its control grid from a step of either of the indication steppers at the time of occurrence of a mark pulse can respond by producing an output pulse across its cathode resistor. In this way, the time of occurrence of an indication mark originating at an odd-numbered field station with respect to the station-registering mark from such station determines which of the cathode follower tubes included in the cathode followers 405 will conduct since each of these cathode follower tubes is gated in sequence during the time that an indication code is received from an odd-numbered field station. The same situation prevails with respect to the cathode followers 406.

The resulting output pulses of the cathode followers 405 and 406 are applied to the various steps of the indication storage banks for the odd and even-numbered field stations respectively. Even though all the indication storage banks for the even-numbered field stations will receive output pulses from selected ones of the cathode followers 406 when an indication code is received from field station No. 2, for example, only the indication storage bank for this station No. 2 will then be properly gated out of all of the indication storage banks for the even-numbered field stations. Consequently, only this indication storage bank can respond to the indication code from station No. 2.

Just prior to the reception of indications from any station each step of the indication storage bank for such station is re-set to its normal condition, i. e., with its left-hand tube conductive. Where the indications from any station are not changed on successive cycles, the steps which have been restored are again quickly operated to their opposite conditions and means is provided for each step of an indication storage bank to ensure that the visual indications as provided by the indication lamps are continuous despite the intermittent control provided by the various steps of these indication storage banks.

The indication lamps 59 include a single lamp for each step of each indication storage bank. Since a step is provided in an indication storage bank for each pulse period upon which an indication mark may be transmitted from the corresponding field station, the organization provides for the illumination of a lamp only when an indication mark is transmitted upon the corresponding pulse period. These lamps thus provide a visual indication of the intelligence transmitted from the various field stations to the control office.

Throughout a complete cycle of operation, each field station is transmitted to in turn, and each station period or interval set aside for the transmission of controls to a station is demarcated by a corresponding step of the station gate stepper. When the step of this station gate stepper corresponding associated with the last field station is operated from its normal condition upon the occurrence of the trailing edge of the synch pulse for this last station, the operation of the control stepper is once more initiated. Fig. 8 illustrates the operation of certain of the control office apparatus at the end of a cycle and shows this operation of the last step to provide the station gate for the last station.

The control stepper is once again operated throughout its various steps, thereby demarcating the pulse periods for the transmission of controls to the last field station. As the last step of this control stepper is restored to its normal condition, a control is again transmitted to from such last step to the synch and station-call pulse source. As a result, another station-call pulse is produced as shown at line B of Fig. 8. At the trailing edge of the station-call pulse, the step of the station gate stepper corresponding to the last station is restored to normal. A check step follows this step for the last station, and this check step is in many ways similar to the preceding steps of the stepper so that, as the step for the last station is restored to normal, the check step is operated from its normal condition as diagrammatically illustrated at line D of Fig. 8.

The check step has the cathode of its right-hand tube connected directly to ground instead of to the control stepper starter 36. Consequently, the operation of the check step from its normal condition does not initiate the operation of the control stepper. And, since the control stepper is not operated, no control can be divided from the last step of the control stepper to cause another station-call pulse to be produced. Therefore, the check step remains in the same condition throughout the remainder of the cycle which ends with the occurrence of the next synch pulse as shown at line A of Fig. 8. With the control stepper not being operated while the check step is operated from its normal condition, no control marks can be transmitted, and thus this interval corresponds to the waiting or rest period required at the end of each cycle. As indicated in Fig. 8, this rest period must exceed some minimum length to permit certain apparatus at each field station to time out as has been explained.

When the check step is thus operated from its normal condition, a relatively high voltage is applied to the control grid of tube 650. The cathode of tube 650 (see Fig. 6D) is normally maintained at a potential below ground by being connected through resistor 652 to (−). Ordinarily, this tube is cut off by the large bias voltage applied to it through resistor 651 from the (−) source. With tube 650 cut off, the negative voltage at the cathode of this tube applied to the control grid of tube 653 causes this tube to be cut off also. However, when the check step is actuated, the control grid of tube 650 is driven above cut off and the flow of plate current of this tube which then occurs through cathode resistor 652 causes the voltage applied to the control grid of tube 653 to become less negative. The plate current which then passes through this tube and through its cathode circuit then actuates relay 654.

Relay 654 is provided with slow releasing characteristic as indicated by the heavy base line of the symbol for this relay. Thus, although the check step is actuated only once during each cycle of operation, thereby causing an increased current flow through the windings of relay 654, this relay remains picked up even though it is only temporarily energized during each cycle. If, however, relay 654 is not energized during several consecutive code cycles, it will drop away. When relay 654 drops away, it closes its back contact 655, thereby energizing the check lamp 656. Consequently, when this check lamp 656 is illuminated, the operator at the control office is informed that the system is not operating properly. However, if the check lamp is not illuminated, this is an indication that the check step is being intermittently energized. The fact that the check step is so energized during each cycle provides a relatively thorough check on the operation of the system. Obviously, the check step can be energized only by the restoration of the step preceding it to its original condition. In a similar manner, each step of the station gate stepper can be actuated only by the restoration of the preceding step. Also, of course, each step of the station gate stepper 106 can be restored to its original condition only after all of the steps of the control stepper 105 have been actuated since the operation of the station gate driver 37 is dependent upon the restoration of the last step of the control stepper.

As shown in Fig. 3A, the check step is actuated by the restoration of the last step of the station gate stepper and the station check remains in this actuated condition until a new cycle of operation is begun. In connection with the description of the operation of the indication storage banks, the gate applied to the storage bank for any one field station was explained as comprising the station gate for that field station and the station gate for the next station in sequence. The indication storage bank for the last station in the system is provided with a gate which comprises the station gate for such last station combined with the gate provided by the check step. Thus, in Figs. 6D and 6F, the station gate as obtained from the plate of the A tube of step No. 3 (for the last station) is combined with the gating potential provided by the plate of the A tube of the check step. These gates are combined by the cathode follower tubes 632 and 633 shown as included in the cathode followers 429. The gate provided by the check step has a duration corresponding to the length of the rest period and thus in this way a relatively long gate is provided for the indication storage bank for this last station as shown in Fig. 8 at line E.

CONCLUSION

For the purpose of making a specific and definite disclosure of the principles of the present invention, this communications system has been shown as adapted for use in a C. T. C. system. Obviously, a communications system of this type may equally well be used in a variety of applications and should not, therefore, be understood to be limited to a C. T. C. application.

To aid in making a specific disclosure of this invention, the duration of a complete cycle of operation has been chosen to be one second. This time may be either increased or decreased as desired to meet the requirements of the system. Where fewer stations are to be included than the maximum as determined by the cycle time of one second, a cycle duration of one second may still be satisfactorily used. In that event, the unused time in each cycle when controls are not transmitted and indications are not being received merely adds to the rest period at the end of each cycle. Where a greater number of stations are to be included within the system, the duration of each cycle must necessarily be increased.

A total of nine steps is shown in Figs. 6C and 6D as having been included in the control stepper 105. Although only the first five steps of this stepper have been shown as being utilized, all nine of the pulse periods demarcated by the nine steps of this stepper may be used as required. Even more than the nine steps of the stepper shown may be included in the control stepper if the requirements of the system should demand that control marks or indication marks be transmitted on a greater number of pulse periods than can be provided by there being only nine steps included in the control stepper 105. The addition of more steps to this stepper 105 would not require any other changes in the transmitting equipment for the control office because the continued operation of the station gate stepper 106 is always dependent upon the restoration of the last step of the control stepper 105 to its normal condition. Of course, the various timing circuits at the field stations and those associated with the receiving apparatus for the control office would have to be altered to provide for satisfactory operation under these conditions. More specifically, the time gating as measured by the call mark selector would have to measure a greater interval between successive station-call pulses. Similarly, the time measured at the control office by the gate restorer would have to be increased to permit a longer indication code to be received from each field station.

At each field station, the first pulse period demarcated by the control and indication stepper 109 is not utilized, thereby permitting transient disturbances in the control office receiver to subside prior to the reception of indication marks from the various field stations as has been explained. Where such transient effects are not troublesome, such first pulse period could be used for the transmission of the station-registering mark. In that event, the number of indication marks that could be transmitted would equal the number of control marks received at each field station.

Having described a pulse communication system as one specific embodiment of the present invention, this form of the invention has been selected to facilitate the disclosure of the invention rather than to limit the number of forms it may assume. Various modifications, adaptations, and alterations may be applied to the specific form shown to meet the requirements of practice without in any manner departing from the spirit or scope of the present invention.

What I claim is:

1. In an electrical wave signal transmission system, an oscillator for generating carrier waves, a modulating wave source of a particular frequency and having a normal amplitude, electronic means governed by said modulating wave source for producing repetitive electrical pulses having a rate of recurrence corresponding to said frequency, an electronic stepper operated by said electrical pulses to mark off a series of control periods, contact means associated with each step of said electronic stepper operable to different positions dependent upon the control to be transmitted for the corresponding control period, circuit means effective during each control period to modify the amplitude of said modulating wave in accordance with the position of said contact means for the corresponding step, circuit means for subjecting said carrier waves to frequency modulation in accordance with the instantaneous amplitude of said modulating wave both under normal and modified conditions, and means for impressing the resultant modulating carrier waves upon a transmission medium.

2. In a communication system of the code type connecting a control office with a plurality of field stations, code transmitting means at the control office for transmitting successive series of code elements to said field stations, each series including groups of elements respectively allotted to said field stations, and each series beginning with a synchronizing element, code receiving means at each field station including station selecting for rendering its station responsive to only the code elements allotted to it, said station selecting means including timing means for time gating said code receiving means at the proper time in each series for the reception of its code elements, and synchronizing means at each field station responsive to said synchronizing code element at the beginning of each series for initiating the associated timing means at that field station, whereby said timing means at all of the field stations are set into operation at the beginning of each series of code elements.

3. In a communication system of the code type, a source of alternating current frequency of a relatively high rate, electronic means controlled by said alternating current for giving output pulses one for each cycle, a timer for measuring relatively long periods, and means controlled jointly by said timer and said electronic means for causing a synchronizing output at the end of any period measured by said timer only upon the occurrence of the next output pulse of said electronic means.

4. In a communication system of the code type, a source of alternating current frequency of a relatively high rate, electronic means controlled by said alternating current for giving output pulses one for each cycle, a timer for measuring relatively long periods, means controlled jointly by said timer and said electronic means for causing a synchronizing output pulse at the end of any period measured by said timer only upon the occurrence of the next output pulse of said electronic means, an electronic stepper having a plurality of units operable step by step in response to successive pulses following its initiation, and circuit means for causing initiation of said electronic stepper following said synchronizing output pulse and thereafter supplying said output pulses from said electronic means to said stepper for causing its step by step operation.

5. In a code type communication system, an oscillator for generating carrier waves, a source of alternating current of a relatively low frequency compared to said carrier frequency, electronic means connected to said source of alternating current and operating to produce repetitive electrical pulses at a rate corresponding to said relatively low frequency, an electronic stepper connected to said electronic means and operated by said pulses to mark off a series of control periods, code selecting contacts associated with said stepper and acting to selectively open and close circuits for each step of said electronic stepper in accordance with the code element to be transmitted for the corresponding control period, modulating circuit means supplied with a voltage from said alternating current source for normally modulating said carrier waves, delay circuit means acting on said circuits selectively controlled by said code selecting contacts to delay the effectiveness on said modulating circuit means to cause each control period to coincide with one full cycle of said modulating voltage, said circuits acting on said modulating circuit means when rendered effective to modify said modulating voltage on selected control periods to effect a distinctive modulation of said carrier waves for those periods, and transmitting means governed by said modulating means for impressing the resultant modulated waves upon a transmitting medium to constitute a series of code elements.

6. In a communication system of the code type, transmitting means at a central office for transmitting different series of distinctive code elements each series including a plurality of groups of code elements, receiving means at each of a plurality of field stations comprising timing means set into operation by the first code element of each series and the first code element of each group in such series, said timing means being capable of measuring a time corresponding to the time interval between the first code elements of the successive groups of any series, an electronic gate controlled by said timing means and opened for a limited time at the end of each time interval measured by said timing means, an electronic counter having a number of distinctive conditions corresponding to said plurality of field stations, and means including said electronic gate for causing the operation of said electronic counter in response to each code element occurring at the beginning of each of said groups of code elements, whereby the other code elements of each series are ineffective to operate said counter.

7. In a code type communication system connecting a control office with a plurality of field stations, code transmitting means at the control office for transmitting successive series of distinctive code elements to said field stations, certain elements occurring at particular spaced intervals within each series constituting station call elements respectively allotted to the field stations, a station call element selector means at each field station including a timer for measuring time periods corresponding to said particular spaced intervals and providing that said station call element selector shall be only momentarily responsive to a station call element at the end of each such measured interval, station selecting means at each field station including an electronic counter governed by said station call element selector means so as to be operated to a different condition for each of said station call elements, said station selecting means at each field station rendering that station receiving apparatus responsive to the distinctive code elements received immediately following the reception of the station call element identifying that station, and code receiving means at each field station acting when rendered effective by its station selecting means to be distinctively controlled in accordance with the distinctive characters of the code elements immediately following the station call element assigned to that station.

8. In a communication system of the code type, transmitting means at a central office for transmitting different series of distinctive code elements each series including a plurality of groups of code elements, receiving means at each of a plurality of groups of code elements, receiving means at each of a plurality of field stations comprising timing means set into operation by the first code element of each series and the first code element of each group in such series, said timing means being capable of measuring a time substantially the same as the time interval between the first element of any two successive groups of elements for any series, an electronic gate controlled by said timing means and opened for a limited time at the end of each interval measured by said timing means, and means including an electronic counter responsive only to said elements which are received when said electronic gate is opened and acting to render the associated receiving apparatus effective to receive the successive code elements of that particular group assigned to the corresponding field station, whereby said electronic counter is operated by the first code element of each group of any series to count off the stations to render each effective in turn.

9. In a communication system of the code type, code transmitting means at a control office for transmitting code elements of either of two distinctive characters, an electronic station stepper, an electronic control stepper, circuit means for causing said control stepper to completely operate for each step of said station stepper, a plurality of multiple position control levers for each station, circuit means connecting the different positions of said levers for each station to corresponding output circuits of said control steppers, other circuit means including a switch tube for each station for connecting said levers for each station together to said transmitting means, each of said connections being effective only when its respective switch tube is rendered active, circuit means controlled by said station stepper for rendering said switch tubes effective one at a time in turn, said output connections controlled by said levers acting on said code transmitting means to transmit one character of code element in preference to the other.

10. In an electronic communication system of the code type, transmitting means at a central office for transmitting successive series of distinctive code elements including a plurality of groups of elements, receiving means at a field station comprising timing means set into operation by the first element of each series and the first element of each group in such series, said timing means being capable of measuring a time corresponding to the time interval between the first elements of successive groups, an electronic gate controlled by said timing means and opened for a limited time at the end of each time interval measured by said timing means, an electronic tube having its grid governed by said code elements, circuit means including a resistance-condenser combination with a relatively long discharge time constant for supplying a blanking voltage to said electron tube when said condenser is charged, circuit means for quickly charging said condenser for each code element received by said tube when said condenser is discharged, and other circuit means for quickly charging said condenser each time a code element is received when said electronic gate is opened.

11. In an electronic code type communication system wherein different series of code characters are transmitted, receiving means including an electron tube having a pulse applied to its control grid for each code character received, circuit means including a resistance-condenser combination with a relatively long discharge time constant connected to said electron tube to supply a blanking voltage to one of its electrodes, circuit means connected to the output of said electron tube and to said resistance-condenser combination for quickly charging said condenser upon the reception of a pulse while said condenser is discharged and said electron tube is not blanked, and decoding means controlled by said electron tube so as to be responsive to successive code characters of the series only if such series are received at spaced intervals with a period of rest between successive series.

12. In an electronic code type communication system having successive series of code elements transmitted, receiving means including an electronic tube having pulses applied to its control grid for the code characters of each series, circuit means including a resistance-condenser combination with a relatively long discharge time constant for supplying a blanking voltage to an electrode of said electron tube when said condenser is charged, and circuit means for quickly charging said condenser for each input pulse supplied to said electron tube when said condenser is discharged.

13. In a code type communication system connecting a control office with a plurality of field stations, code transmitting means at the control office for transmitting different series of distinctive code elements to said field stations, each series including a plurality of groups of code elements respectively allotted to the different field stations, and each group beginning with a code element assigned as a station call to the corresponding station, station counting means at each field station including an electronic binary counter responsive to the reception of a series of code elements to take one step for each station call element received in that series, and code receiving means at each field station acting when rendered effective by said binary counter on the particular step assigned to that field station for distinctively responding to the code elements received following the reception of its station call.

14. In a communication system connecting a control office with a plurality of field stations, electronic code transmitting means at the control office for transmitting different series of distinctive code elements to said field stations, each series including a plurality of groups of code elements respectively allotted to the different field stations, and each group beginning with a station call element, a station call selector at each field station including a timer for measuring the time intervals between successive station call elements in each series, said station call selector being effective to provide an output only upon the reception of a station call element during a limited time following each interval measured by said timer, station counting means including electronic binary counter connected to receive the output pulses from said station call selector and operable to take one step for each such output pulse, code receiving means at each field station acting when rendered effective by its station counting means to be distinctively controlled in accordance with the remaining code elements of the group in the series allotted to that field station, said code receiving means at the different field stations each being rendered effective on a different step of the binary counters at such field stations.

15. In a system for receiving indication codes in which different stations transmit indication codes in sequence, a station stepper operated step by step to designate the sequence of station indication reception, an odd indication stepper, an even indication stepper, means controlled by said station stepper for alternately rendering said odd and even indication steppers effective to operate in response to indication code elements, a bank of indication storage devices associated with each station, and circuit means controlled by said station stepper to render said bank of storage devices initially effective to receive indications when said station stepper is in a position for its corresponding station by continuing its operation while the station stepper is in a position for the next station, and timing means for allowing either bank of indication steppers to be operated only for a limited time corresponding to the regular transmission time.

16. In a system for receiving indication codes from a plurality of different field station one at a time in turn, a station stepper operated step by step to designate the sequence in which indications from the stations are to be received but not necessarily in phase with the indication reception of the station, an odd indication stepper, an even indication stepper, an odd registration selector rendered active in response to an indication registering code element while said station stepper is conditioned for an odd station to condition said odd indication stepper for response to subsequent indication code elements from that station, an even registration selector rendered active in response to an indication registering code element while said station stepper is conditioned for an even station to condition said even indication stepper for response to subsequent indication code elements from that station, a bank of storage devices for each of said stations, and circuit means rendering any given bank of storage devices responsive to indication code elements received by the appropriate indication stepper when the station stepper is in a position for that station and also in position for the next subsequent station, whereby the delay in the reception of indication code elements may vary for the different stations without effecting the reception and storage of such elements.

17. An electronic stepping organization, two control buses alternately receiving control pulse energy at spaced intervals, an electronic stepper including a series of dual-triode trigger circuit units each being operable to either of two stable conditions and each having operating and restoration input terminals, said restoration input terminals for successive units being connected to an alternate one of said two control buses, and each of said operating input terminals being connected to the output of the next preceding unit except in the case of the first unit, an external circuit means for at times supplying an initiating pulse to the operating input terminal of the first unit, and electronic means associated with said electronic stepper distinctively conditioned during the operation of the successive units of said electronic stepper, whereby the step by step operation of said electronic stepper is effective to provide distinctive control on each step and such step by step operation is accomplished in response to the alternate energization of said two control buses, each such energization acting to restore the then operated trigger circuit unit which in turn effects the operation of the next unit.

18. An electronic stepping organization, a source of short trigger pulses recurring at regularly spaced intervals, a gate pulse source including a dual-triode trigger circuit connected to said source of trigger pulses to be operated to its opposite conditions at correspondingly spaced intervals, two control buses connected to said gate source to respectively receive opposite control energy alternately such that a rise in potential on one bus is accompanied by a drop in potential on the other bus, an electronic stepper including a series of interconnected dual-triode trigger circuit units, each successive unit of the series having its restoration input control connected to an alternate one of said two control buses, and each of said units having its operating input control connected to the next preceding unit except the first, and an initiating input control circuit connected to the operating input control of the first unit of said series, whereby step by step operation of said electronic stepper is effected following its initiation by the application of energy to said two control buses alternately in a manner to avoid any adverse effect on the next trigger circuit unit to be operated.

19. In an electronic stepping organization, a plurality of dual-triode trigger circuit units, coupling circuit means interconnecting successive units, two stepping buses alternately energized so that the application of a voltage to one of said buses occurs at a time when the other of said buses is not energized, circuit means connecting alternate of said trigger circuit units to one of said stepping buses and the remaining of said trigger circuit units to the other of said buses, whereby the operation of one of said trigger circuit units in response to a rise of potential on one of said buses is not affected by the potential on the other of said buses.

20. In an indicating system, a dual-triode trigger circuit operable to either of two stable conditions and having operating and restoration input terminals to which control pulses are applied for operating said trigger circuit to the desired one of its two stable conditions, an indicator lamp, a transformer having primary and secondary windings its primary winding being connected to a source of alternating current, a saturable reactor having primary and secondary windings, a circuit connecting said lamp in series with the secondary winding of said transformer and the secondary winding of said saturable reactor, and circuit means connecting a direct current load circuit for one of said triodes through the primary windings of said saturable reactor.

HUGH C. KENDALL.

REFERENCES CITED

The following references are of record in the file of this patent:

UNITED STATES PATENTS

| Number | Name | Date |
|---|---|---|
| 2,037,565 | Dozler | Apr. 14, 1936 |
| 2,094,733 | Byrnes | Oct. 5, 1937 |
| 2,405,096 | Mumma | July 30, 1946 |
| 2,409,696 | Lewis | Oct. 22, 1946 |
| 2,409,697 | Lewis | Oct. 22, 1946 |
| 2,409,698 | Lewis | Oct. 22, 1946 |
| 2,444,078 | Weaver | June 29, 1948 |
| 2,448,487 | Field | Aug. 31, 1948 |
| 2,504,999 | McWhirter | Apr. 25, 1950 |
| 2,554,886 | Stedman | May 29, 1951 |
| 2,578,653 | Hayslett | Dec. 11, 1951 |
| 2,592,737 | Reynolds | Apr. 15, 1952 |
| 2,609,451 | Hansen | Sept. 2, 1952 |
| 2,609,452 | Hansen | Sept. 2, 1952 |